United States Patent
Park et al.

(10) Patent No.: US 12,113,618 B2
(45) Date of Patent: Oct. 8, 2024

(54) METHOD AND APPARATUS FOR RECEIVING PPDU OVER BROADBAND IN WIRELESS LAN SYSTEM

(71) Applicant: LG Electronics Inc., Seoul (KR)

(72) Inventors: Eunsung Park, Seoul (KR); Jeongki Kim, Seoul (KR); Jinsoo Choi, Seoul (KR)

(73) Assignee: LG Electronics Inc., Seoul (KR)

( * ) Notice: Subject to any disclaimer, the term of this patent is extended or adjusted under 35 U.S.C. 154(b) by 335 days.

(21) Appl. No.: 17/617,448

(22) PCT Filed: Jun. 16, 2020

(86) PCT No.: PCT/KR2020/007786
§ 371 (c)(1),
(2) Date: Dec. 8, 2021

(87) PCT Pub. No.: WO2020/262872
PCT Pub. Date: Dec. 30, 2020

(65) Prior Publication Data
US 2022/0311543 A1 Sep. 29, 2022

(30) Foreign Application Priority Data

Jun. 24, 2019 (KR) .................. 10-2019-0075233
Oct. 14, 2019 (KR) .................. 10-2019-0127246
Oct. 21, 2019 (KR) .................. 10-2019-0130960

(51) Int. Cl.
*H04L 1/00* (2006.01)
*H04L 5/00* (2006.01)
(Continued)

(52) U.S. Cl.
CPC .......... *H04L 1/0069* (2013.01); *H04L 5/0092* (2013.01); *H04W 74/0808* (2013.01); *H04W 84/12* (2013.01)

(58) Field of Classification Search
CPC . H04W 74/0808; H04W 74/08; H04W 84/12; H04W 84/105; H04L 1/0069;
(Continued)

(56) References Cited

U.S. PATENT DOCUMENTS 10,939,476 B1 * 3/2021 Chu .................. H04W 74/0816
11,160,119 B2 * 10/2021 Lee .................. H04W 72/1268
(Continued)

FOREIGN PATENT DOCUMENTS

JP  2023179724 A * 12/2023 ......... H04L 27/2603
KR  20170078726    7/2017
(Continued)

OTHER PUBLICATIONS

Choi et al, "View on EHT Objectives and Technologies," IEEE 802.11-18/1171r0, Jul. 2018, 13 pages.

*Primary Examiner* — Phong La
(74) *Attorney, Agent, or Firm* — Fish & Richardson P.C.

(57) ABSTRACT

Proposed are a method and an apparatus for receiving a PPDU over a broadband in a wireless LAN system. Specifically, a receiving STA receives the PPDU from a transmitting STA through a broadband. The receiving STA decodes the PPDU. The broadband is a 320 MHz band or a 160+160 MHz band. The PPDU includes first and second SIG fields. The first SIG field includes information on a broadband bandwidth. The information on the broadband bandwidth consists of 3 bits or 4 bits.

13 Claims, 26 Drawing Sheets

(51) Int. Cl.
  *H04W 74/08*      (2024.01)
  *H04W 74/0808*    (2024.01)
  *H04W 84/12*      (2009.01)

(58) Field of Classification Search
  CPC ... H04L 1/0045; H04L 1/0059; H04L 1/0041;
  H04L 1/0057; H04L 1/0075; H04L
  5/0092; H04L 5/0091; H04L 5/0094;
  H04L 5/0096; H04L 5/0007; H04L
  5/0048; H04L 5/0044; H04L 5/0037
  See application file for complete search history.

(56) References Cited

U.S. PATENT DOCUMENTS

| | | | |
|---|---|---|---|
| 2018/0160429 A1* | 6/2018 | Seok | H04L 1/0075 |
| 2018/0213568 A1 | 7/2018 | Gong et al. | |
| 2019/0082390 A1* | 3/2019 | Azizi | H04L 5/0007 |
| 2019/0116513 A1* | 4/2019 | Verma | H04W 74/002 |
| 2019/0116545 A1 | 4/2019 | Verma et al. | |
| 2019/0238301 A1* | 8/2019 | Verma | H04L 5/0046 |
| 2019/0349997 A1* | 11/2019 | Park | H04W 74/0816 |
| 2020/0112408 A1* | 4/2020 | Verma | H04B 7/0452 |
| 2020/0177425 A1* | 6/2020 | Chen | H04L 27/2602 |
| 2020/0229214 A1* | 7/2020 | Zhang | H04W 72/0453 |
| 2020/0305164 A1* | 9/2020 | Yang | H04L 5/0042 |
| 2021/0368350 A1* | 11/2021 | Cariou | H04W 16/14 |
| 2023/0189065 A1* | 6/2023 | Alpert | H04L 1/06 370/230 |

FOREIGN PATENT DOCUMENTS

| | | | | |
|---|---|---|---|---|
| RU | 2696297 C1 | * | 8/2019 | H04L 27/26 |
| SG | 10201904787 R | * | 5/2019 | |
| WO | WO-2019139019 A1 | * | 7/2019 | H04L 27/26 |

* cited by examiner (a)

| L-LTF | L-STF | L-SIG | Data |

PPDU Format (IEEE 802.11a/g)

| L-LTF | L-STF | L-SIG | SIG A | HT-SFT | HT-LFT | ... | HT-LFT | Data |

HT PPDU Format (IEEE 802.11n)

| L-LTF | L-STF | L-SIG | VHT-SIG A | VHT-SFT | VHT-LFT | VHT-SIG B | Data |

VHT PPDU Format (IEEE 802.11ac)

| 8μs | 4μs | 4μs | 8μs | 4μs per symbol | 4μs | Variable durations per HE-LTF symbol | | |
|---|---|---|---|---|---|---|---|---|
| L-LTF | L-STF | L-SIG | RL-SIG | HE-SIG A | HE-SIG B | HE-STF | HE-LTF | ... | HE-LTF | Data | PE |

METHOD AND APPARATUS FOR RECEIVING PPDU OVER BROADBAND IN WIRELESS LAN SYSTEM

CROSS-REFERENCE TO RELATED APPLICATIONS

This application is a National Stage application under 35 U.S.C. § 371 of International Application No. PCT/KR2020/007786, filed on Jun. 16, 2020, which claims the benefit of Korean Patent Application No. 10-2019-0075233, filed on Jun. 24, 2019, Korean Patent Application No. 10-2019-0127246, filed on Oct. 14, 2019, and Korean Patent Application No. 10-2019-0130960, filed on Oct. 21, 2019. The disclosures of the prior applications are incorporated by reference in their entirety.

BACKGROUND OF THE DISCLOSURE

Field of the Disclosure

The present specification relates to a method for receiving a physical layer protocol data unit (PPDU) in a wideband in a wireless local area network (WLAN) system and, most particularly, to a channel access method for receiving a PPDU in a wideband and a method and device for signaling a bandwidth of a wideband.

Related Art

A wireless local area network (WLAN) has been improved in various ways. For example, the IEEE 802.11ax standard proposed an improved communication environment using orthogonal frequency division multiple access (OFDMA) and downlink multi-user multiple input multiple output (DL MU MIMO) techniques.

The present specification proposes a technical feature that can be utilized in a new communication standard. For example, the new communication standard may be an extreme high throughput (EHT) standard which is currently being discussed. The EHT standard may use an increased bandwidth, an enhanced PHY layer protocol data unit (PPDU) structure, an enhanced sequence, a hybrid automatic repeat request (HARQ) scheme, or the like, which is newly proposed. The EHT standard may be called the IEEE 802.11be standard.

In a new WLAN standard, an increased number of spatial streams may be used. In this case, in order to properly use the increased number of spatial streams, a signaling technique in the WLAN system may need to be improved.

SUMMARY OF THE DISCLOSURE

Technical Objects

The present specification proposes a method and device for receiving a PPDU in a wideband in a WLAN system.
Technical Solutions An example of the present specification proposes a method for receiving a PPDU in a wideband.

The present embodiment proposes a channel access method for transmitting a PPDU and a signaling method for a transmission bandwidth (240 MHz, 320 MHz bandwidth) in a wideband that is supported by an EHT WLAN system. At this point, a tone plan of the wideband may be designed by repeating (or iterating) an 80 MHz tone plan of 802.11ax or may be designed by repeating (or iterating) an 80 MHz tone plan of 802.11be. Herein, the 80 MHz tone plan of 802.11be may be designed by repeating a 40 MHz tone plan of 802.11ax (or RU alignment for 40 MHz of 802.11ax) two times.

An example of the present embodiment may be performed by a receiving station (STA), and the receiving STA may correspond to an STA that supports an Extremely High Throughput (EHT) WLAN system. A transmitting STA of the present embodiment may correspond to an access point (AP).

A receiving STA receives a Physical Protocol Data Unit (PPDU) from a transmitting STA through a wideband.

The receiving STA decodes the PPDU.

The wideband is a 320 MHz band or a 160+160 MHz band.

The PPDU includes first and second Signal (SIG) fields. The first SIG field includes information on a bandwidth of the wideband. The information on the bandwidth of the wideband is configured of 3 bits or 4 bits. That is, the transmitting STA may signal information on a transmission bandwidth through the first SIG field.

Effects of the Disclosure

According to the embodiment proposed in the present specification, by implementing a channel access method for transmitting a PPDU by using a contiguous or non-contiguous 160 MHz, 240 MHz, or 320 MHz band, and by designing a PHY signaling method for the transmission bandwidth, a new effect of increasing data transmission efficiency and overall throughput in a wideband may be achieved.

BRIEF DESCRIPTION OF THE DRAWINGS

FIG. 4 illustrates an example of a PPDU used in an IEEE standard.

DESCRIPTION OF EXEMPLARY EMBODIMENTS

Figure 1:
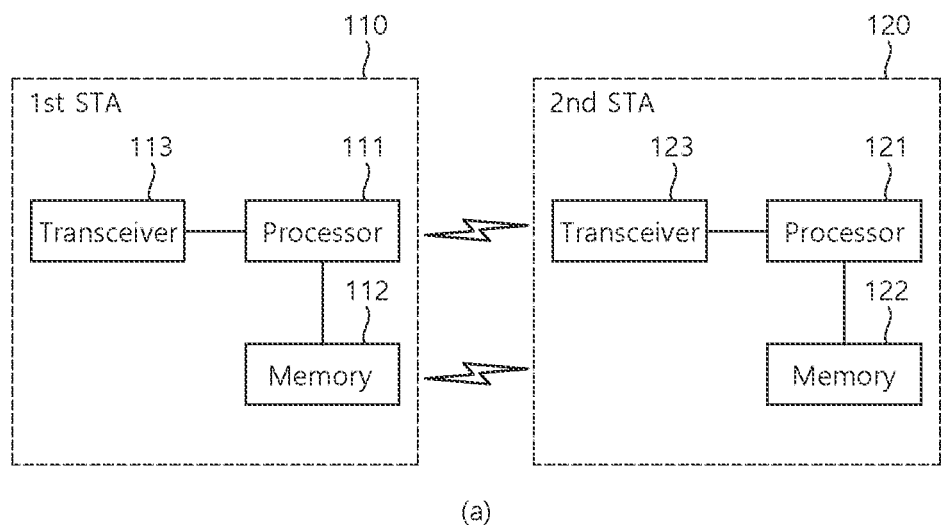
FIG. 1 shows an example of a transmitting apparatus and/or receiving apparatus of the present specification.
Figure 1:
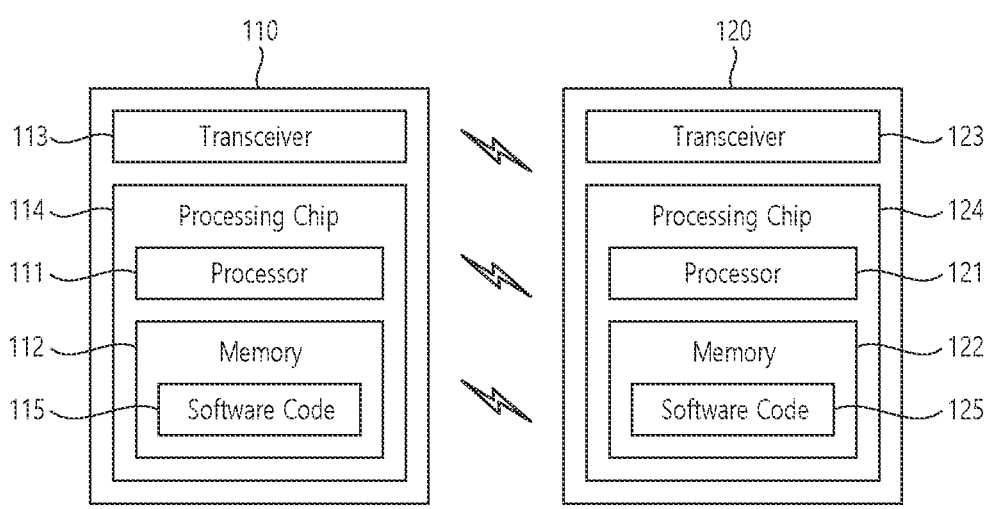

In the present specification, "A or B" may mean "only A", "only B" or "both A and B". In other words, in the present specification, "A or B" may be interpreted as "A and/or B". For example, in the present specification, "A, B, or C" may mean "only A", "only B", "only C", or "any combination of A, B, C".

A slash (/) or comma used in the present specification may mean "and/or". For example, "A/B" may mean "A and/or B". Accordingly, "A/B" may mean "only A", "only B", or "both A and B". For example, "A, B, C" may mean "A, B, or C".

In the present specification, "at least one of A and B" may mean "only A", "only B", or "both A and B". In addition, in the present specification, the expression "at least one of A or B" or "at least one of A and/or B" may be interpreted as "at least one of A and B".

In addition, in the present specification, "at least one of A, B, and C" may mean "only A", "only B", "only C", or "any combination of A, B, and C". In addition, "at least one of A, B, or C" or "at least one of A, B, and/or C" may mean "at least one of A, B, and C".

In addition, a parenthesis used in the present specification may mean "for example". Specifically, when indicated as "control information (EHT-signal)", it may mean that "EHT-signal" is proposed as an example of the "control information". In other words, the "control information" of the present specification is not limited to "EHT-signal", and "EHT-signal" may be proposed as an example of the "control information". In addition, when indicated as "control information (i.e., EHT-signal)", it may also mean that "EHT-signal" is proposed as an example of the "control information".

Technical features described individually in one figure in the present specification may be individually implemented, or may be simultaneously implemented.

The following example of the present specification may be applied to various wireless communication systems. For example, the following example of the present specification may be applied to a wireless local area network (WLAN) system. For example, the present specification may be applied to the IEEE 802.11a/g/n/ac standard or the IEEE 802.11ax standard. In addition, the present specification may also be applied to the newly proposed EHT standard or IEEE 802.11be standard. In addition, the example of the present specification may also be applied to a new WLAN standard enhanced from the EHT standard or the IEEE 802.11be standard. In addition, the example of the present specification may be applied to a mobile communication system. For example, it may be applied to a mobile communication system based on long term evolution (LTE) depending on a 3rd generation partnership project (3GPP) standard and based on evolution of the LTE. In addition, the example of the present specification may be applied to a communication system of a 5G NR standard based on the 3GPP standard.

Hereinafter, in order to describe a technical feature of the present specification, a technical feature applicable to the present specification will be described.

FIG. 1 shows an example of a transmitting apparatus and/or receiving apparatus of the present specification.

In the example of FIG. 1, various technical features described below may be performed. FIG. 1 relates to at least one station (STA). For example, STAs 110 and 120 of the present specification may also be called in various terms such as a mobile terminal, a wireless device, a wireless transmit/receive unit (WTRU), a user equipment (UE), a mobile station (MS), a mobile subscriber unit, or simply a user. The STAs 110 and 120 of the present specification may also be called in various terms such as a network, a base station, a node-B, an access point (AP), a repeater, a router, a relay, or the like. The STAs 110 and 120 of the present specification may also be referred to as various names such as a receiving apparatus, a transmitting apparatus, a receiving STA, a transmitting STA, a receiving device, a transmitting device, or the like.

For example, the STAs 110 and 120 may serve as an AP or a non-AP. That is, the STAs 110 and 120 of the present specification may serve as the AP and/or the non-AP.

STAs 110 and 120 of the present specification may support various communication standards together in addition to the IEEE 802.11 standard. For example, a communication standard (e.g., LTE, LTE-A, 5G NR standard) or the like based on the 3GPP standard may be supported. In addition, the STA of the present specification may be implemented as various devices such as a mobile phone, a vehicle, a personal computer, or the like. In addition, the STA of the present specification may support communication for various communication services such as voice calls, video calls, data communication, and self-driving (autonomous-driving), or the like.

The STAs 110 and 120 of the present specification may include a medium access control (MAC) conforming to the IEEE 802.11 standard and a physical layer interface for a radio medium.

The STAs 110 and 120 will be described below with reference to a sub-figure (a) of FIG. 1.

The first STA 110 may include a processor 111, a memory 112, and a transceiver 113. The illustrated process, memory, and transceiver may be implemented individually as separate chips, or at least two blocks/functions may be implemented through a single chip.

The transceiver 113 of the first STA performs a signal transmission/reception operation. Specifically, an IEEE 802.11 packet (e.g., IEEE 802.11a/b/g/n/ac/ax/be, etc.) may be transmitted/received.

For example, the first STA 110 may perform an operation intended by an AP. For example, the processor 111 of the AP may receive a signal through the transceiver 113, process a reception (RX) signal, generate a transmission (TX) signal, and provide control for signal transmission. The memory 112 of the AP may store a signal (e.g., RX signal) received through the transceiver 113, and may store a signal (e.g., TX signal) to be transmitted through the transceiver.

For example, the second STA 120 may perform an operation intended by a non-AP STA. For example, a transceiver 123 of a non-AP performs a signal transmission/reception operation. Specifically, an IEEE 802.11 packet (e.g., IEEE 802.11a/b/g/n/ac/ax/be packet, etc.) may be transmitted/received.

For example, a processor 121 of the non-AP STA may receive a signal through the transceiver 123, process an RX signal, generate a TX signal, and provide control for signal transmission. A memory 122 of the non-AP STA may store a signal (e.g., RX signal) received through the transceiver 123, and may store a signal (e.g., TX signal) to be transmitted through the transceiver.

For example, an operation of a device indicated as an AP in the specification described below may be performed in the first STA 110 or the second STA 120. For example, if the first STA 110 is the AP, the operation of the device indicated as the AP may be controlled by the processor 111 of the first STA 110, and a related signal may be transmitted or received through the transceiver 113 controlled by the processor 111 of the first STA 110. In addition, control information related to the operation of the AP or a TX/RX signal of the AP may be stored in the memory 112 of the first STA 110. In addition, if the second STA 120 is the AP, the operation of the device indicated as the AP may be controlled by the processor 121 of the second STA 120, and a related signal may be transmitted or received through the transceiver 123 controlled by the processor 121 of the second STA 120. In addition, control information related to the operation of the AP or a TX/RX signal of the AP may be stored in the memory 122 of the second STA 120.

For example, in the specification described below, an operation of a device indicated as a non-AP (or user-STA) may be performed in the first STA 110 or the second STA 120. For example, if the second STA 120 is the non-AP, the operation of the device indicated as the non-AP may be controlled by the processor 121 of the second STA 120, and a related signal may be transmitted or received through the transceiver 123 controlled by the processor 121 of the second STA 120. In addition, control information related to the operation of the non-AP or a TX/RX signal of the non-AP may be stored in the memory 122 of the second STA 120. For example, if the first STA 110 is the non-AP, the operation of the device indicated as the non-AP may be controlled by the processor 111 of the first STA 110, and a related signal may be transmitted or received through the transceiver 113 controlled by the processor 111 of the first STA 110. In addition, control information related to the operation of the non-AP or a TX/RX signal of the non-AP may be stored in the memory 112 of the first STA 110.

In the specification described below, a device called a (transmitting/receiving) STA, a first STA, a second STA, a STA1, a STA2, an AP, a first AP, a second AP, an AP1, an AP2, a (transmitting/receiving) terminal, a (transmitting/receiving) device, a (transmitting/receiving) apparatus, a network, or the like may imply the STAs 110 and 120 of FIG. 1. For example, a device indicated as, without a specific reference numeral, the (transmitting/receiving) STA, the first STA, the second STA, the STA1, the STA2, the AP, the first AP, the second AP, the AP1, the AP2, the (transmitting/receiving) terminal, the (transmitting/receiving) device, the (transmitting/receiving) apparatus, the network, or the like may imply the STAs 110 and 120 of FIG. 1. For example, in the following example, an operation in which various STAs transmit/receive a signal (e.g., a PPDU) may be performed in the transceivers 113 and 123 of FIG. 1. In addition, in the following example, an operation in which various STAs generate a TX/RX signal or perform data processing and computation in advance for the TX/RX signal may be performed in the processors 111 and 121 of FIG. 1. For example, an example of an operation for generating the TX/RX signal or performing the data processing and computation in advance may include: 1) an operation of determining/obtaining/configuring/computing/decoding/encoding bit information of a sub-field (SIG, STF, LTF, Data) included in a PPDU; 2) an operation of determining/configuring/obtaining a time resource or frequency resource (e.g., a subcarrier resource) or the like used for the sub-field (SIG, STF, LTF, Data) included the PPDU; 3) an operation of determining/configuring/obtaining a specific sequence (e.g., a pilot sequence, an STF/LTF sequence, an extra sequence applied to SIG) or the like used for the sub-field (SIG, STF, LTF, Data) field included in the PPDU; 4) a power control operation and/or power saving operation applied for the STA; and 5) an operation related to determining/obtaining/configuring/decoding/encoding or the like of an ACK signal. In addition, in the following example, a variety of information used by various STAs for determining/obtaining/configuring/computing/decoding/decoding a TX/RX signal (e.g., information related to a field/subfield/control field/parameter/power or the like) may be stored in the memories 112 and 122 of FIG. 1.

The aforementioned device/STA of the sub-figure (a) of FIG. 1 may be modified as shown in the sub-figure (b) of FIG. 1. Hereinafter, the STAs 110 and 120 of the present specification will be described based on the sub-figure (b) of FIG. 1.

For example, the transceivers 113 and 123 illustrated in the sub-figure (b) of FIG. 1 may perform the same function as the aforementioned transceiver illustrated in the sub-figure (a) of FIG. 1. For example, processing chips 114 and 124 illustrated in the sub-figure (b) of FIG. 1 may include the processors 111 and 121 and the memories 112 and 122. The processors 111 and 121 and memories 112 and 122 illustrated in the sub-figure (b) of FIG. 1 may perform the same function as the aforementioned processors 111 and 121 and memories 112 and 122 illustrated in the sub-figure (a) of FIG. 1.

A mobile terminal, a wireless device, a wireless transmit/receive unit (WTRU), a user equipment (UE), a mobile station (MS), a mobile subscriber unit, a user, a user STA, a network, a base station, a Node-B, an access point (AP), a repeater, a router, a relay, a receiving unit, a transmitting unit, a receiving STA, a transmitting STA, a receiving device, a transmitting device, a receiving apparatus, and/or a transmitting apparatus, which are described below, may imply the STAs 110 and 120 illustrated in the sub-figure (a)/(b) of FIG. 1, or may imply the processing chips 114 and 124 illustrated in the sub-figure (b) of FIG. 1. That is, a technical feature of the present specification may be performed in the STAs 110 and 120 illustrated in the sub-figure (a)/(b) of FIG. 1, or may be performed only in the processing chips 114 and 124 illustrated in the sub-figure (b) of FIG. 1. For example, a technical feature in which the transmitting STA transmits a control signal may be understood as a technical feature in which a control signal generated in the processors 111 and 121 illustrated in the sub-figure (a)/(b) of FIG. 1 is transmitted through the transceivers 113 and 123 illustrated in the sub-figure (a)/(b) of FIG. 1. Alternatively, the technical feature in which the transmitting STA transmits the control signal may be understood as a technical feature in which the control signal to be transferred to the transceivers 113 and 123 is generated in the processing chips 114 and 124 illustrated in the sub-figure (b) of FIG. 1.

For example, a technical feature in which the receiving STA receives the control signal may be understood as a technical feature in which the control signal is received by means of the transceivers 113 and 123 illustrated in the sub-figure (a) of FIG. 1. Alternatively, the technical feature in which the receiving STA receives the control signal may be understood as the technical feature in which the control signal received in the transceivers 113 and 123 illustrated in the sub-figure (a) of FIG. 1 is obtained by the processors 111 and 121 illustrated in the sub-figure (a) of FIG. 1. Alternatively, the technical feature in which the receiving STA receives the control signal may be understood as the technical feature in which the control signal received in the transceivers 113 and 123 illustrated in the sub-figure (b) of FIG. 1 is obtained by the processing chips 114 and 124 illustrated in the sub-figure (b) of FIG. 1.

Referring to the sub-figure (b) of FIG. 1, software codes 115 and 125 may be included in the memories 112 and 122. The software codes 115 and 126 may include instructions for controlling an operation of the processors 111 and 121. The software codes 115 and 125 may be included as various programming languages.

The processors 111 and 121 or processing chips 114 and 124 of FIG. 1 may include an application-specific integrated circuit (ASIC), other chipsets, a logic circuit and/or a data processing device. The processor may be an application processor (AP). For example, the processors 111 and 121 or processing chips 114 and 124 of FIG. 1 may include at least one of a digital signal processor (DSP), a central processing unit (CPU), a graphics processing unit (GPU), and a modulator and demodulator (modem). For example, the processors 111 and 121 or processing chips 114 and 124 of FIG. 1 may be SNAPDRAGON™ series of processors made by Qualcomm®, EXYNOS™ series of processors made by Samsung®, A series of processors made by Apple®, HELIO™ series of processors made by MediaTek®, ATOM™ series of processors made by Intel® or processors enhanced from these processors.

In the present specification, an uplink may imply a link for communication from a non-AP STA to an SP STA, and an uplink PPDU/packet/signal or the like may be transmitted through the uplink. In addition, in the present specification, a downlink may imply a link for communication from the AP STA to the non-AP STA, and a downlink PPDU/packet/signal or the like may be transmitted through the downlink.

Figure 2:
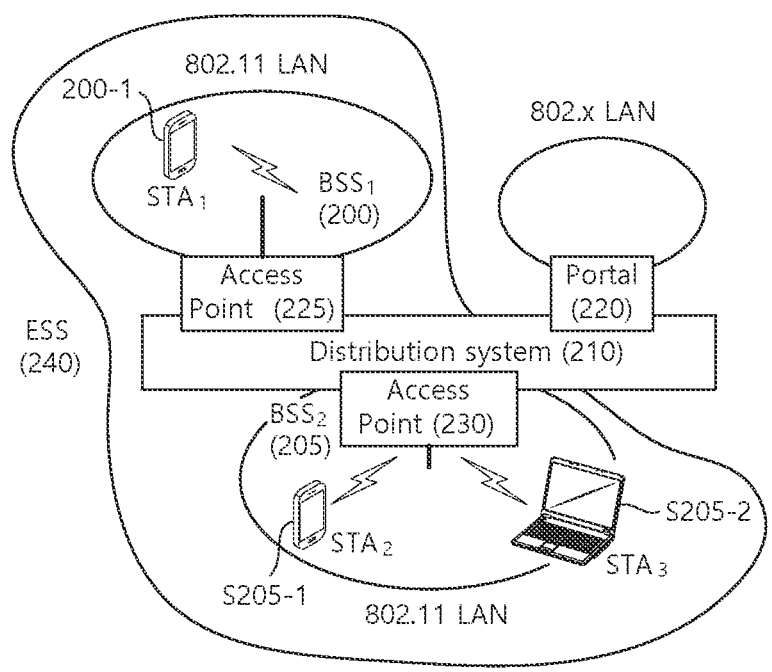
FIG. 2 is a conceptual view illustrating the structure of a wireless local area network (WLAN).
Figure 2:
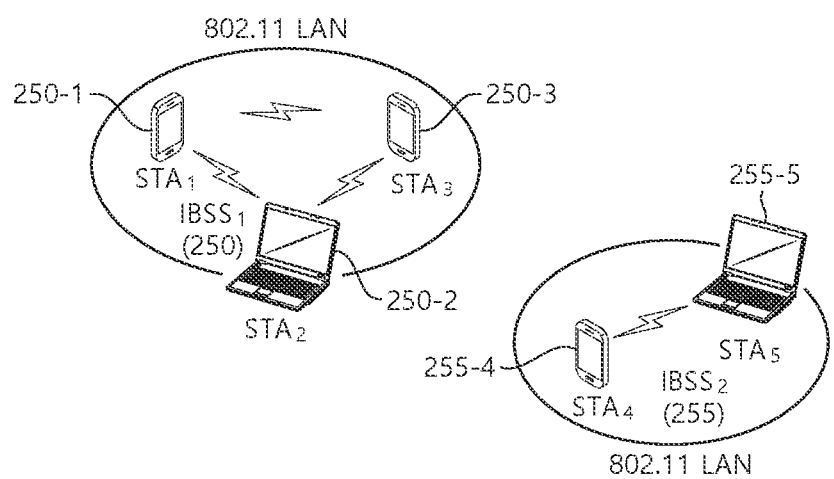

FIG. 2 is a conceptual view illustrating the structure of a wireless local area network (WLAN).

An upper part of FIG. 2 illustrates the structure of an infrastructure basic service set (BSS) of institute of electrical and electronic engineers (i.e. EE) 802.11.

Referring the upper part of FIG. 2, the wireless LAN system may include one or more infrastructure BSSs 200 and 205 (hereinafter, referred to as BSS). The BSSs 200 and 205 as a set of an AP and a STA such as an access point (AP) 225 and a station (STA1) 200-1 which are successfully synchronized to communicate with each other are not concepts indicating a specific region. The BSS 205 may include one or more STAs 205-1 and 205-2 which may be joined to one AP 230.

The BSS may include at least one STA, APs providing a distribution service, and a distribution system (DS) 210 connecting multiple APs.

The distribution system 210 may implement an extended service set (ESS) 240 extended by connecting the multiple BSSs 200 and 205. The ESS 240 may be used as a term indicating one network configured by connecting one or more APs 225 or 230 through the distribution system 210. The AP included in one ESS 240 may have the same service set identification (SSID).

A portal 220 may serve as a bridge which connects the wireless LAN network (i.e. EE 802.11) and another network (e.g., 802.X).

In the BSS illustrated in the upper part of FIG. 2, a network between the APs 225 and 230 and a network between the APs 225 and 230 and the STAs 200-1, 205-1, and 205-2 may be implemented. However, the network is configured even between the STAs without the APs 225 and 230 to perform communication. A network in which the communication is performed by configuring the network even between the STAs without the APs 225 and 230 is defined as an Ad-Hoc network or an independent basic service set (IBSS).

A lower part of FIG. 2 illustrates a conceptual view illustrating the IBSS.

Referring to the lower part of FIG. 2, the IBSS is a BSS that operates in an Ad-Hoc mode. Since the IBSS does not include the access point (AP), a centralized management entity that performs a management function at the center does not exist. That is, in the IBSS, STAs 250-1, 250-2, 250-3, 255-4, and 255-5 are managed by a distributed manner. In the IBSS, all STAs 250-1, 250-2, 250-3, 255-4, and 255-5 may be constituted by movable STAs and are not permitted to access the DS to constitute a self-contained network.

Figure 3:
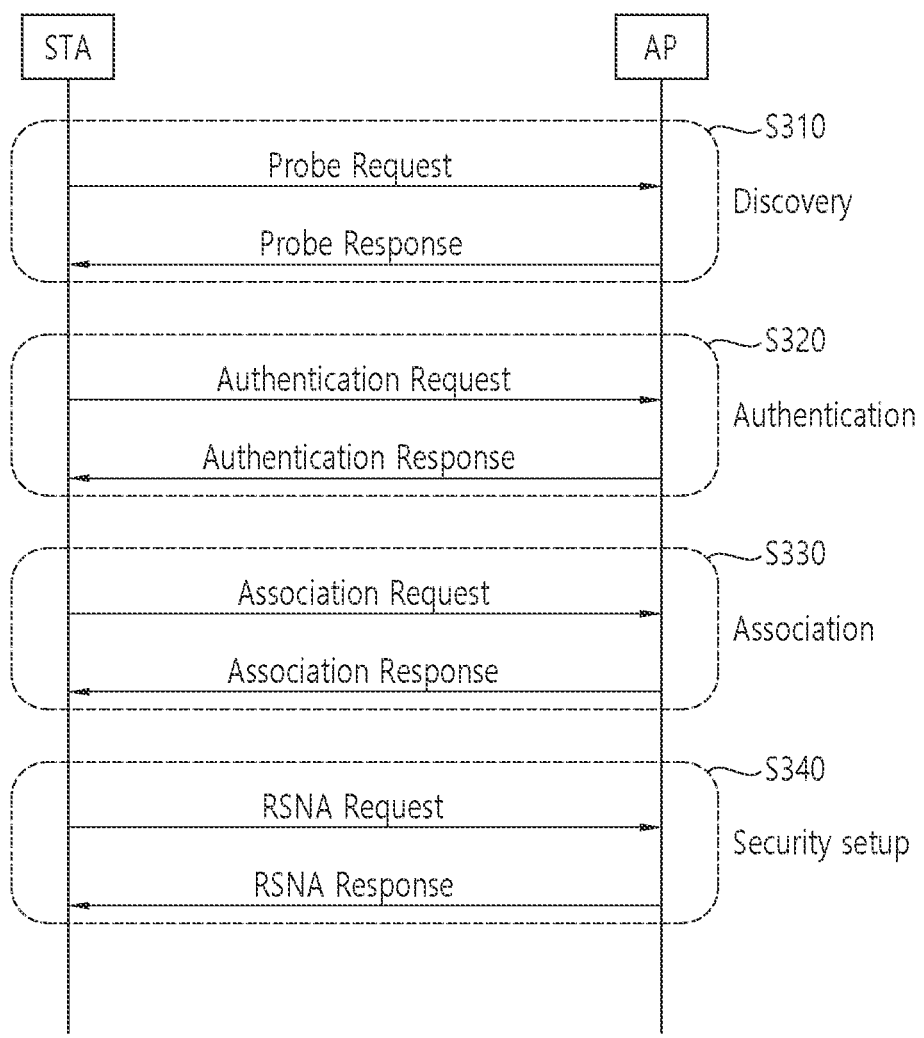
FIG. 3 illustrates a general link setup process.

FIG. 3 illustrates a general link setup process.

In S310, a STA may perform a network discovery operation. The network discovery operation may include a scanning operation of the STA. That is, to access a network, the STA needs to discover a participating network. The STA needs to identify a compatible network before participating in a wireless network, and a process of identifying a network present in a particular area is referred to as scanning. Scanning methods include active scanning and passive scanning.

FIG. 3 illustrates a network discovery operation including an active scanning process. In active scanning, a STA performing scanning transmits a probe request frame and waits for a response to the probe request frame in order to identify which AP is present around while moving to channels. A responder transmits a probe response frame as a response to the probe request frame to the STA having transmitted the probe request frame. Here, the responder may be a STA that transmits the last beacon frame in a BSS of a channel being scanned. In the BSS, since an AP transmits a beacon frame, the AP is the responder. In an IBSS, since STAs in the IBSS transmit a beacon frame in turns, the responder is not fixed. For example, when the STA transmits a probe request frame via channel 1 and receives a probe response frame via channel 1, the STA may store BSS-related information included in the received probe response frame, may move to the next channel (e.g., channel 2), and may perform scanning (e.g., transmits a probe request and receives a probe response via channel 2) by the same method.

Although not shown in FIG. 3, scanning may be performed by a passive scanning method. In passive scanning, a STA performing scanning may wait for a beacon frame while moving to channels. A beacon frame is one of management frames in IEEE 802.11 and is periodically transmitted to indicate the presence of a wireless network and to enable the STA performing scanning to find the wireless network and to participate in the wireless network. In a BSS, an AP serves to periodically transmit a beacon frame. In an IBSS, STAs in the IBSS transmit a beacon frame in turns. Upon receiving the beacon frame, the STA performing scanning stores information about a BSS included in the beacon frame and records beacon frame information in each channel while moving to another channel. The STA having received the beacon frame may store BSS-related information included in the received beacon frame, may move to the next channel, and may perform scanning in the next channel by the same method.

After discovering the network, the STA may perform an authentication process in S320. The authentication process may be referred to as a first authentication process to be clearly distinguished from the following security setup operation in S340. The authentication process in S320 may include a process in which the STA transmits an authentication request frame to the AP and the AP transmits an authentication response frame to the STA in response. The authentication frames used for an authentication request/response are management frames.

The authentication frames may include information about an authentication algorithm number, an authentication transaction sequence number, a status code, a challenge text, a robust security network (RSN), and a finite cyclic group.

The STA may transmit the authentication request frame to the AP. The AP may determine whether to allow the authentication of the STA based on the information included in the received authentication request frame. The AP may provide the authentication processing result to the STA via the authentication response frame.

When the STA is successfully authenticated, the STA may perform an association process in S330. The association process includes a process in which the STA transmits an association request frame to the AP and the AP transmits an association response frame to the STA in response. The association request frame may include, for example, information about various capabilities, a beacon listen interval, a service set identifier (SSID), a supported rate, a supported channel, RSN, a mobility domain, a supported operating class, a traffic indication map (TIM) broadcast request, and an interworking service capability. The association response frame may include, for example, information about various capabilities, a status code, an association ID (AID), a supported rate, an enhanced distributed channel access (EDCA) parameter set, a received channel power indicator (RCPI), a received signal-to-noise indicator (RSNI), a mobility domain, a timeout interval (association comeback time), an overlapping BSS scanning parameter, a TIM broadcast response, and a QoS map.

In S340, the STA may perform a security setup process. The security setup process in S340 may include a process of setting up a private key through four-way handshaking, for example, through an extensible authentication protocol over LAN (EAPOL) frame.

FIG. 4 illustrates an example of a PPDU used in an IEEE standard.

As illustrated, various types of PHY protocol data units (PPDUs) are used in IEEE a/g/n/ac standards. Specifically, an LTF and a STF include a training signal, a SIG-A and a SIG-B include control information for a receiving STA, and a data field includes user data corresponding to a PSDU (MAC PDU/aggregated MAC PDU).

FIG. 4 also includes an example of an HE PPDU according to IEEE 802.11ax. The HE PPDU according to FIG. 4 is an illustrative PPDU for multiple users. An HE-SIG-B may be included only in a PPDU for multiple users, and an HE-SIG-B may be omitted in a PPDU for a single user.

As illustrated in FIG. 4, the HE-PPDU for multiple users (MUs) may include a legacy-short training field (L-STF), a legacy-long training field (L-LTF), a legacy-signal (L-SIG), a high efficiency-signal A (HE-SIG A), a high efficiency-signal-B (HE-SIG B), a high efficiency-short training field (HE-STF), a high efficiency-long training field (HE-LTF), a data field (alternatively, an MAC payload), and a packet extension (PE) field. The respective fields may be transmitted for illustrated time periods (i.e., 4 or 8 µs).

Hereinafter, a resource unit (RU) used for a PPDU is described. An RU may include a plurality of subcarriers (or tones). An RU may be used to transmit a signal to a plurality of STAs according to OFDMA. Further, an RU may also be defined to transmit a signal to one STA. An RU may be used for an STF, an LTF, a data field, or the like.

Figure 5:
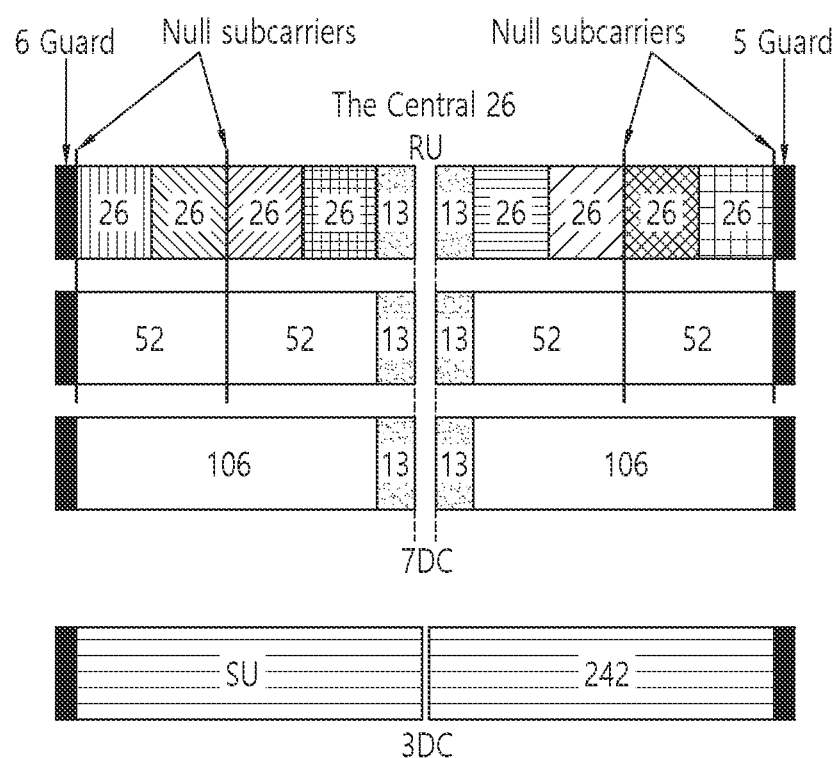
FIG. 5 illustrates a layout of resource units (RUs) used in a band of 20 MHz.

FIG. 5 illustrates a layout of resource units (RUs) used in a band of 20 MHz.

As illustrated in FIG. 5, resource units (RUs) corresponding to different numbers of tones (i.e., subcarriers) may be used to form some fields of an HE-PPDU. For example, resources may be allocated in illustrated RUs for an HE-STF, an HE-LTF, and a data field.

As illustrated in the uppermost part of FIG. 5, a 26-unit (i.e., a unit corresponding to 26 tones) may be disposed. Six tones may be used for a guard band in the leftmost band of the 20 MHz band, and five tones may be used for a guard band in the rightmost band of the 20 MHz band. Further, seven DC tones may be inserted in a center band, that is, a DC band, and a 26-unit corresponding to 13 tones on each of the left and right sides of the DC band may be disposed. A 26-unit, a 52-unit, and a 106-unit may be allocated to other bands. Each unit may be allocated for a receiving STA, that is, a user.

The layout of the RUs in FIG. 5 may be used not only for multiple users (MUs) but also for a single user (SU), in which case one 242-unit may be used and three DC tones may be inserted as illustrated in the lowermost part of FIG. 5.

Although FIG. 5 proposes RUs having various sizes, that is, a 26-RU, a 52-RU, a 106-RU, and a 242-RU, specific sizes of RUs may be extended or increased. Therefore, the present embodiment is not limited to the specific size of each RU (i.e., the number of corresponding tones).

Figure 6:
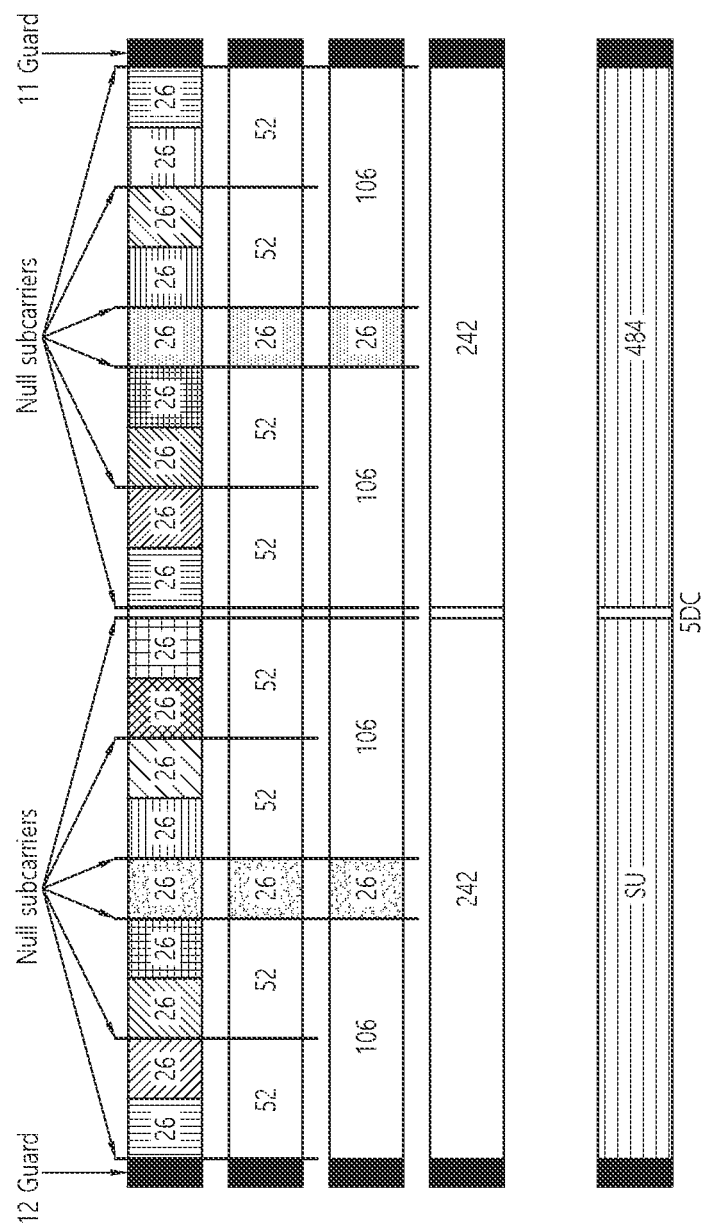
FIG. 6 illustrates a layout of RUs used in a band of 40 MHz.

FIG. 6 illustrates a layout of RUs used in a band of 40 MHz.

Similarly to FIG. 5 in which RUs having various sizes are used, a 26-RU, a 52-RU, a 106-RU, a 242-RU, a 484-RU, and the like may be used in an example of FIG. 6. Further, five DC tones may be inserted in a center frequency, 12 tones may be used for a guard band in the leftmost band of the 40 MHz band, and 11 tones may be used for a guard band in the rightmost band of the 40 MHz band.

As illustrated in FIG. 6, when the layout of the RUs is used for a single user, a 484-RU may be used. The specific number of RUs may be changed similarly to FIG. 5.

Figure 7:
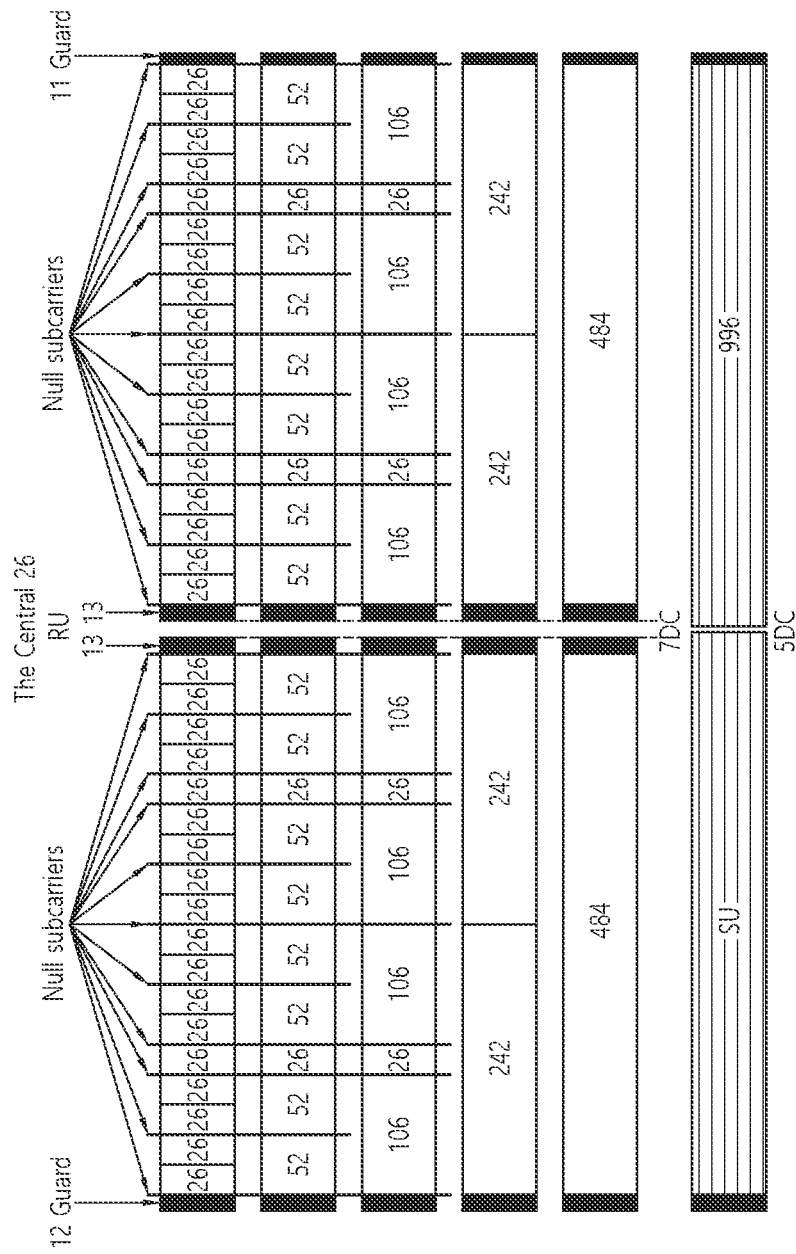
FIG. 7 illustrates a layout of RUs used in a band of 80 MHz.

FIG. 7 illustrates a layout of RUs used in a band of 80 MHz.

Similarly to FIG. 5 and FIG. 6 in which RUs having various sizes are used, a 26-RU, a 52-RU, a 106-RU, a 242-RU, a 484-RU, a 996-RU, and the like may be used in an example of FIG. 7. Further, seven DC tones may be inserted in the center frequency, 12 tones may be used for a guard band in the leftmost band of the 80 MHz band, and 11 tones may be used for a guard band in the rightmost band of the 80 MHz band. In addition, a 26-RU corresponding to 13 tones on each of the left and right sides of the DC band may be used.

As illustrated in FIG. 7, when the layout of the RUs is used for a single user, a 996-RU may be used, in which case five DC tones may be inserted.

The RU described in the present specification may be used in uplink (UL) communication and downlink (DL) communication. For example, when UL-MU communication which is solicited by a trigger frame is performed, a transmitting STA (e.g., an AP) may allocate a first RU (e.g., 26/52/106/242-RU, etc.) to a first STA through the trigger frame, and may allocate a second RU (e.g., 26/52/106/242-RU, etc.) to a second STA. Thereafter, the first STA may transmit a first trigger-based PPDU based on the first RU, and the second STA may transmit a second trigger-based PPDU based on the second RU. The first/second trigger-based PPDU is transmitted to the AP at the same (or overlapped) time period.

For example, when a DL MU PPDU is configured, the transmitting STA (e.g., AP) may allocate the first RU (e.g., 26/52/106/242-RU. etc.) to the first STA, and may allocate the second RU (e.g., 26/52/106/242-RU, etc.) to the second STA. That is, the transmitting STA (e.g., AP) may transmit HE-STF, HE-LTF, and Data fields for the first STA through the first RU in one MU PPDU, and may transmit HE-STF, HE-LTF, and Data fields for the second STA through the second RU.

Information related to a layout of the RU may be signaled through HE-SIG-B.

Figure 8:
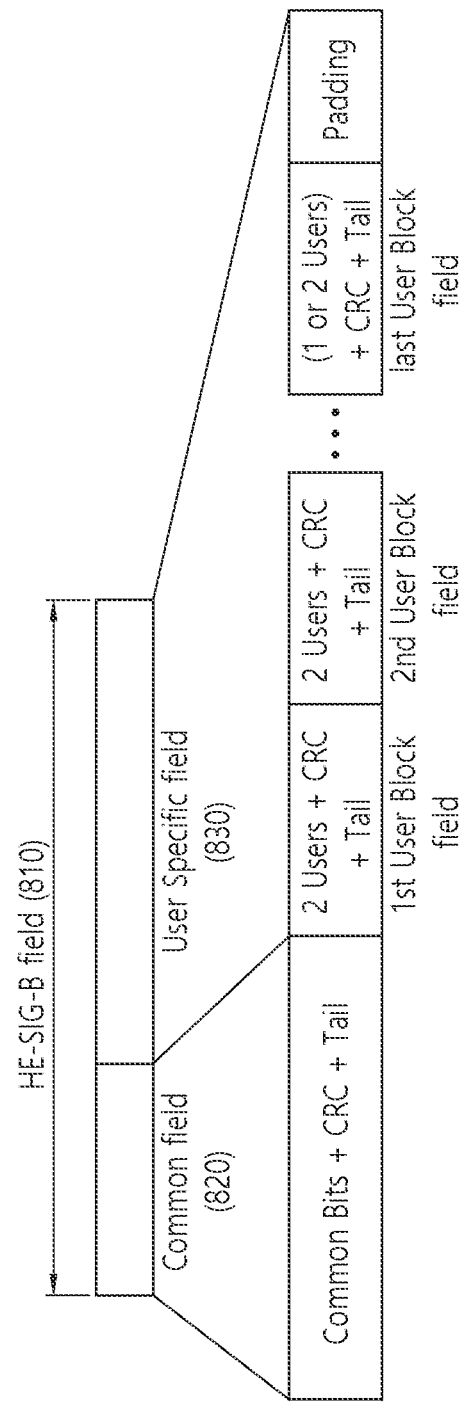
FIG. 8 illustrates a structure of an HE-SIG-B field.

FIG. 8 illustrates a structure of an HE-SIG-B field.

As illustrated, an HE-SIG-B field 810 includes a common field 820 and a user-specific field 830. The common field 820 may include information commonly applied to all users (i.e., user STAs) which receive SIG-B. The user-specific field 830 may be called a user-specific control field. When the SIG-B is transferred to a plurality of users, the user-specific field 830 may be applied only any one of the plurality of users.

As illustrated in FIG. 8, the common field 820 and the user-specific field 830 may be separately encoded.

The common field 820 may include RU allocation information of N*8 bits. For example, the RU allocation information may include information related to a location of an RU. For example, when a 20 MHz channel is used as shown in FIG. 5, the RU allocation information may include information related to a specific frequency band to which a specific RU (26-RU/52-RU/106-RU) is arranged.

An example of a case in which the RU allocation information consists of 8 bits is as follows.

TABLE 1

| RU Allocation subfield (B7 B6 B5 B4 B3 B2 B1 B0) | #1 | #2 | #3 | #4 | #5 | #6 | #7 | #8 | #9 | Number of entries |
|---|---|---|---|---|---|---|---|---|---|---|
| 00000000 | 26 | 26 | 26 | 26 | 26 | 26 | 26 | 26 | 26 | 1 |
| 00000001 | 26 | 26 | 26 | 26 | 26 | 26 | 26 | 52 | | 1 |
| 00000010 | 26 | 26 | 26 | 26 | 26 | 52 | | 26 | 26 | 1 |
| 00000011 | 26 | 26 | 26 | 26 | 26 | 52 | | 52 | | 1 |
| 00000100 | 26 | 26 | 52 | | 26 | 26 | 26 | 26 | 26 | 1 |
| 00000101 | 26 | 26 | 52 | | 26 | 26 | 26 | 52 | | 1 |
| 00000110 | 26 | 26 | 52 | | 26 | 52 | | 26 | 26 | 1 |
| 00000111 | 26 | 26 | 52 | | 26 | 52 | | 52 | | 1 |
| 00001000 | 52 | | 26 | 26 | 26 | 26 | 26 | 26 | 26 | 1 |
| 00001001 | 52 | | 26 | 26 | 26 | 26 | 26 | 52 | | 1 |
| 00001010 | 52 | | 26 | 26 | 26 | 52 | | 26 | 26 | 1 |

As shown the example of FIG. 5, up to nine 26-RUs may be allocated to the 20 MHz channel. When the RU allocation information of the common field 820 is set to "00000000" as shown in Table 1, the nine 26-RUs may be allocated to a corresponding channel (i.e., 20 MHz). In addition, when the RU allocation information of the common field 820 is set to "00000001" as shown in Table 1, seven 26-RUs and one 52-RU are arranged in a corresponding channel. That is, in the example of FIG. 5, the 52-RU may be allocated to the rightmost side, and the seven 26-RUs may be allocated to the left thereof.

The example of Table 1 shows only some of RU locations capable of displaying the RU allocation information.

For example, the RU allocation information may include an example of Table 2 below.

TABLE 2

| 8 bits indices (B7 B6 B5 B4 B3 B2 B1 B0) | #1 | #2 | #3 | #4 | #5 | #6 | #7 | #8 | #9 | Number of entries |
|---|---|---|---|---|---|---|---|---|---|---|
| 01000$y_2y_1y_0$ | 106 | | | | 26 | 26 | 26 | 26 | 26 | 8 |
| 01001$y_2y_1y_0$ | 106 | | | | 26 | 26 | 26 | 52 | | 8 |

"01000$y_2y_1y_0$" relates to an example in which a 106-RU is allocated to the leftmost side of the 20 MHz channel, and five 26-RUs are allocated to the right side thereof. In this case, a plurality of STAs (e.g., user-STAs) may be allocated to the 106-RU, based on a MU-MIMO scheme. Specifically, up to 8 STAs (e.g., user-STAs) may be allocated to the 106-RU, and the number of STAs (e.g., user-STAs) allocated to the 106-RU is determined based on 3-bit information ($y_2y_1y_0$). For example, when the 3-bit information ($y_2y_1y_0$) is set to N, the number of STAs (e.g., user-STAs) allocated to the 106-RU based on the MU-MIMO scheme may be N+1.

In general, a plurality of STAs (e.g., user STAs) different from each other may be allocated to a plurality of RUs. However, the plurality of STAs (e.g., user STAs) may be allocated to one or more RUs having at least a specific size (e.g., 106 subcarriers), based on the MU-MIMO scheme.

As shown in FIG. 8, the user-specific field 830 may include a plurality of user fields. As described above, the number of STAs (e.g., user STAs) allocated to a specific channel may be determined based on the RU allocation information of the common field 820. For example, when the RU allocation information of the common field 820 is "00000000", one user STA may be allocated to each of nine 26-RUs (e.g., nine user STAs may be allocated). That is, up to 9 user STAs may be allocated to a specific channel through an OFDMA scheme. In other words, up to 9 user STAs may be allocated to a specific channel through a non-MU-MIMO scheme.

For example, when RU allocation is set to "01000$y_2y_1y_0$", a plurality of STAs may be allocated to the 106-RU arranged at the leftmost side through the MU-MIMO scheme, and five user STAs may be allocated to five 26-RUs arranged to the right side thereof through the non-MU MIMO scheme. This case is specified through an example of FIG. 9.

Figure 9:
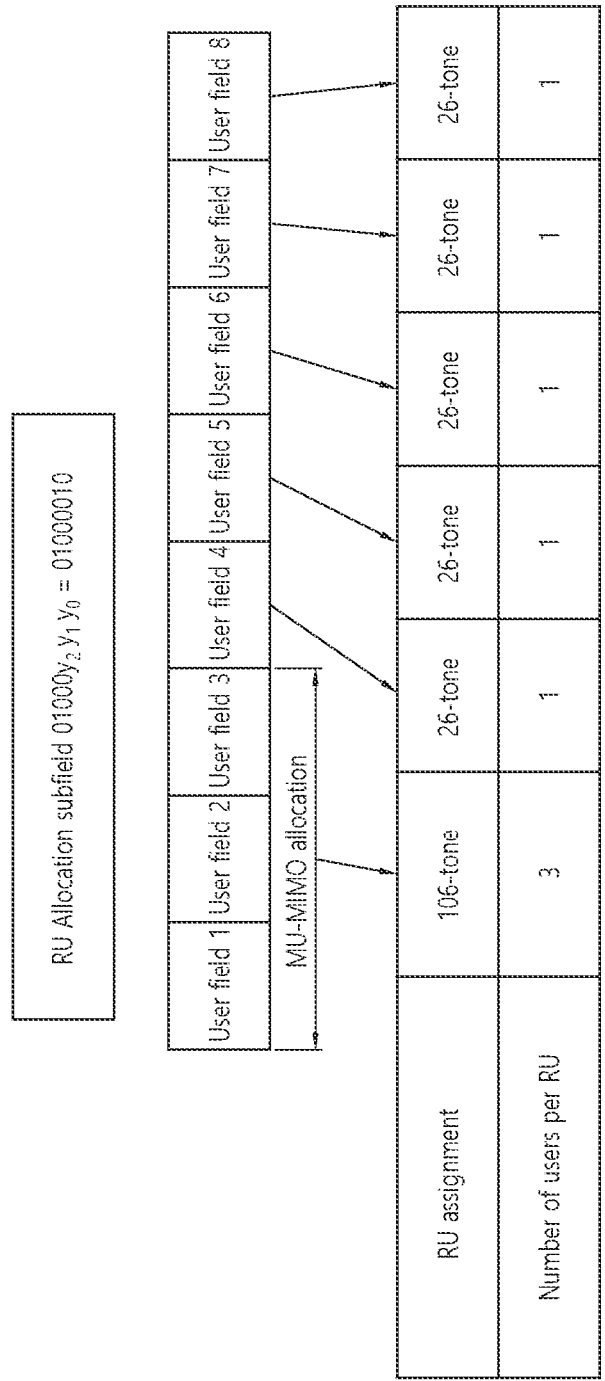
FIG. 9 illustrates an example in which a plurality of user STAs are allocated to the same RU through a MU-MIMO scheme.

FIG. 9 illustrates an example in which a plurality of user STAs are allocated to the same RU through a MU-MIMO scheme.

For example, when RU allocation is set to "01000010" as shown in FIG. 9, a 106-RU may be allocated to the leftmost side of a specific channel, and five 26-RUs may be allocated to the right side thereof. In addition, three user STAs may be allocated to the 106-RU through the MU-MIMO scheme. As a result, since eight user STAs are allocated, the user-specific field 830 of HE-SIG-B may include eight user fields.

The eight user fields may be expressed in the order shown in FIG. 9. In addition, as shown in FIG. 8, two user fields may be implemented with one user block field.

The user fields shown in FIG. 8 and FIG. 9 may be configured based on two formats. That is, a user field related to a MU-MIMO scheme may be configured in a first format, and a user field related to a non-MIMO scheme may be configured in a second format. Referring to the example of FIG. 9, a user field 1 to a user field 3 may be based on the first format, and a user field 4 to a user field 8 may be based on the second format. The first format or the second format may include bit information of the same length (e.g., 21 bits).

Each user field may have the same size (e.g., 21 bits). For example, the user field of the first format (the first of the MU-MIMO scheme) may be configured as follows.

For example, a first bit (i.e., B0-B10) in the user field (i.e., 21 bits) may include identification information (e.g., STA-ID, partial AID, etc.) of a user STA to which a corresponding user field is allocated. In addition, a second bit (i.e., B11-B14) in the user field (i.e., 21 bits) may include information related to a spatial configuration. Specifically, an example of the second bit (i.e., B11-B14) may be as shown in Table 3 and Table 4 below.

allocated to the user field 1, one spatial stream may be allocated to the user field 1, and one spatial stream may be allocated to the user field 3.

As shown in the example of Table 3 and/or Table 4, information (i.e., the second bit, B11-B14) related to the number of spatial streams for the user STA may consist of 4 bits. In addition, the information (i.e., the second bit, B11-B14) on the number of spatial streams for the user STA may support up to eight spatial streams. In addition, the information (i.e., the second bit, B11-B14) on the number of spatial streams for the user STA may support up to four spatial streams for one user STA.

In addition, a third bit (i.e., B15-18) in the user field (i.e., 21 bits) may include modulation and coding scheme (MCS) information. The MCS information may be applied to a data field in a PPDU including corresponding SIG-B.

An MCS, MCS information, an MCS index, an MCS field, or the like used in the present specification may be indicated by an index value. For example, the MCS information may be indicated by an index 0 to an index 11. The MCS information may include information related to a constellation modulation type (e.g., BPSK, QPSK, 16-QAM, 64-QAM, 256-QAM, 1024-QAM, etc.) and information related to a coding rate (e.g., ½, ⅔, ¾, ⅚e, etc.).

TABLE 3

| $N_{user}$ | B3...B0 | $N_{STS}$[1] | $N_{STS}$[2] | $N_{STS}$[3] | $N_{STS}$[4] | $N_{STS}$[5] | $N_{STS}$[6] | $N_{STS}$[7] | $N_{STS}$[8] | Total $N_{STS}$ | Number of entries |
|---|---|---|---|---|---|---|---|---|---|---|---|
| 2 | 0000-0011 | 1-4 | 1 | | | | | | | 2-5 | 10 |
|   | 0100-0110 | 2-4 | 2 | | | | | | | 4-6 | |
|   | 0111-1000 | 3-4 | 3 | | | | | | | 6-7 | |
|   | 1001 | 4 | 4 | | | | | | | 8 | |
| 3 | 0000-0011 | 1-4 | 1 | 1 | | | | | | 3-6 | 13 |
|   | 0100-0110 | 2-4 | 2 | 1 | | | | | | 5-7 | |
|   | 0111-1000 | 3-4 | 3 | 1 | | | | | | 7-8 | |
|   | 1001-1011 | 2-4 | 2 | 2 | | | | | | 6-8 | |
|   | 1100 | 3 | 3 | 2 | | | | | | 8 | |
| 4 | 0000-0011 | 1-4 | 1 | 1 | 1 | | | | | 4-7 | 11 |
|   | 0100-0110 | 2-4 | 2 | 1 | 1 | | | | | 6-8 | |
|   | 0111 | 3 | 3 | 1 | 1 | | | | | 8 | |
|   | 1000-1001 | 2-3 | 2 | 2 | 1 | | | | | 7-8 | |
|   | 1010 | 2 | 2 | 2 | 2 | | | | | 8 | |

TABLE 4

| $N_{user}$ | B3...B0 | $N_{STS}$[1] | $N_{STS}$[2] | $N_{STS}$[3] | $N_{STS}$[4] | $N_{STS}$[5] | $N_{STS}$[6] | $N_{STS}$[7] | $N_{STS}$[8] | Total $N_{STS}$ | Number of entries |
|---|---|---|---|---|---|---|---|---|---|---|---|
| 5 | 0000-0011 | 1-4 | 1 | 1 | 1 | 1 | | | | 5-8 | 7 |
|   | 0100-0101 | 2-3 | 2 | 1 | 1 | 1 | | | | 7-8 | |
|   | 0110 | 2 | 2 | 2 | 1 | 1 | | | | 8 | |
| 6 | 0000-0010 | 1-3 | 1 | 1 | 1 | 1 | 1 | | | 6-8 | 4 |
|   | 0011 | 2 | 2 | 1 | 1 | 1 | 1 | | | 8 | |
| 7 | 0000-0001 | 1-2 | 1 | 1 | 1 | 1 | 1 | 1 | | 7-8 | 2 |
| 8 | 0000 | 1 | 1 | 1 | 1 | 1 | 1 | 1 | 1 | 8 | 1 |

As shown in Table 3 and/or Table 4, the second bit (e.g., B11-B14) may include information related to the number of spatial streams allocated to the plurality of user STAs which are allocated based on the MU-MIMO scheme. For example, when three user STAs are allocated to the 106-RU based on the MU-MIMO scheme as shown in FIG. 9, N_user is set to "3". Therefore, values of N_STS[1], N_STS[2], and N_STS[3] may be determined as shown in Table 3. For example, when a value of the second bit (B11-B14) is "0011", it may be set to N_STS[1]=4, N_STS[2]=1, N_STS[3]=1. That is, in the example of FIG. 9, four spatial streams may be Information related to a channel coding type (e.g., LCC or LDPC) may be excluded in the MCS information.

In addition, a fourth bit (i.e., B19) in the user field (i.e., 21 bits) may be a reserved field.

In addition, a fifth bit (i.e., B20) in the user field (i.e., 21 bits) may include information related to a coding type (e.g., BCC or LDPC). That is, the fifth bit (i.e., B20) may include information related to a type (e.g., BCC or LDPC) of channel coding applied to the data field in the PPDU including the corresponding SIG-B.

The aforementioned example relates to the user field of the first format (the format of the MU-MIMO scheme). An example of the user field of the second format (the format of the non-MU-MIMO scheme) is as follows.

A first bit (e.g., B0-B10) in the user field of the second format may include identification information of a user STA. In addition, a second bit (e.g., B11-B13) in the user field of the second format may include information related to the number of spatial streams applied to a corresponding RU. In addition, a third bit (e.g., B14) in the user field of the second format may include information related to whether a beamforming steering matrix is applied. A fourth bit (e.g., B15-B18) in the user field of the second format may include modulation and coding scheme (MCS) information. In addition, a fifth bit (e.g., B19) in the user field of the second format may include information related to whether dual carrier modulation (DCM) is applied. In addition, a sixth bit (i.e., B20) in the user field of the second format may include information related to a coding type (e.g., BCC or LDPC).

Figure 10:
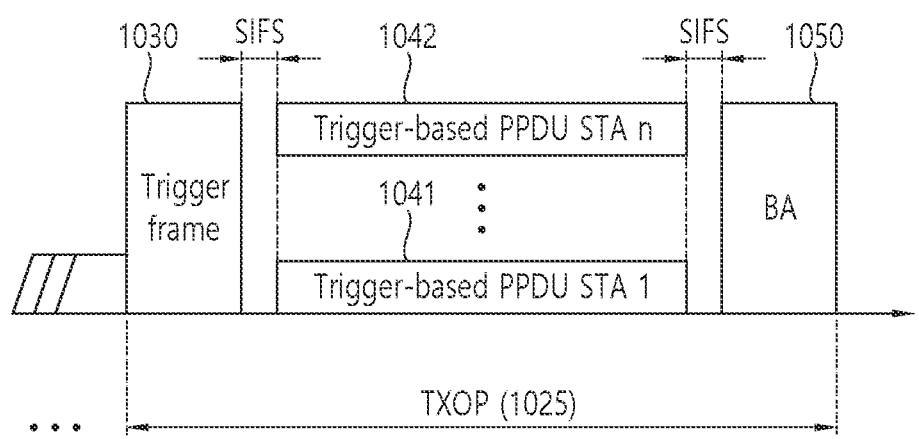
FIG. 10 illustrates an operation based on UL-MU.

FIG. 10 illustrates an operation based on UL-MU. As illustrated, a transmitting STA (e.g., an AP) may perform channel access through contending (e.g., a backoff operation), and may transmit a trigger frame 1030. That is, the transmitting STA may transmit a PPDU including the trigger frame 1030. Upon receiving the PPDU including the trigger frame, a trigger-based (TB) PPDU is transmitted after a delay corresponding to SIFS.

TB PPDUs 1041 and 1042 may be transmitted at the same time period, and may be transmitted from a plurality of STAs (e.g., user STAs) having AIDs indicated in the trigger frame 1030. An ACK frame 1050 for the TB PPDU may be implemented in various forms.

A specific feature of the trigger frame is described with reference to FIG. 11 to FIG. 13. Even if UL-MU communication is used, an orthogonal frequency division multiple access (OFDMA) scheme or a MU MIMO scheme may be used, and the OFDMA and MU-MIMO schemes may be simultaneously used.

Figure 11:
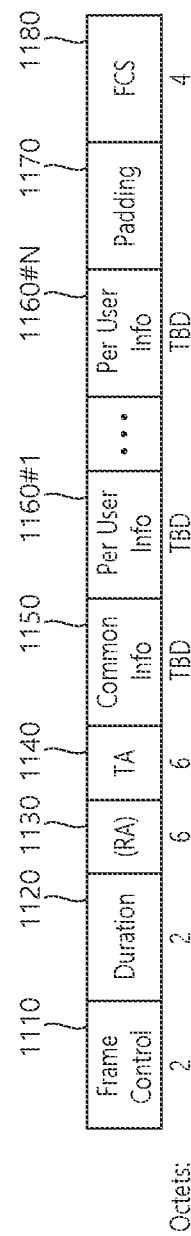
FIG. 11 illustrates an example of a trigger frame.

FIG. 11 illustrates an example of a trigger frame. The trigger frame of FIG. 11 allocates a resource for uplink multiple-user (MU) transmission, and may be transmitted, for example, from an AP. The trigger frame may be configured of a MAC frame, and may be included in a PPDU.

Each field shown in FIG. 11 may be partially omitted, and another field may be added. In addition, a length of each field may be changed to be different from that shown in the figure.

A frame control field 1110 of FIG. 11 may include information related to a MAC protocol version and extra additional control information. A duration field 1120 may include time information for NAV configuration or information related to an identifier (e.g., AID) of a STA.

In addition, an RA field 1130 may include address information of a receiving STA of a corresponding trigger frame, and may be optionally omitted. A TA field 1140 may include address information of a STA (e.g., an AP) which transmits the corresponding trigger frame. A common information field 1150 includes common control information applied to the receiving STA which receives the corresponding trigger frame. For example, a field indicating a length of an L-SIG field of an uplink PPDU transmitted in response to the corresponding trigger frame or information for controlling content of a SIG-A field (i.e., HE-SIG-A field) of the uplink PPDU transmitted in response to the corresponding trigger frame may be included. In addition, as common information, information related to a length of a CP of the uplink PPDU transmitted in response to the corresponding trigger frame or information related to a length of an LTF field may be included.

In addition, per user information fields 1160 #1 to 1160 #N corresponding to the number of receiving STAs which receive the trigger frame of FIG. 11 are preferably included. The per user information field may also be called an "allocation field".

In addition, the trigger frame of FIG. 11 may include a padding field 1170 and a frame check sequence field 1180.

Each of the per user information fields 1160 #1 to 1160 #N shown in FIG. 11 may include a plurality of subfields.

Figure 12:
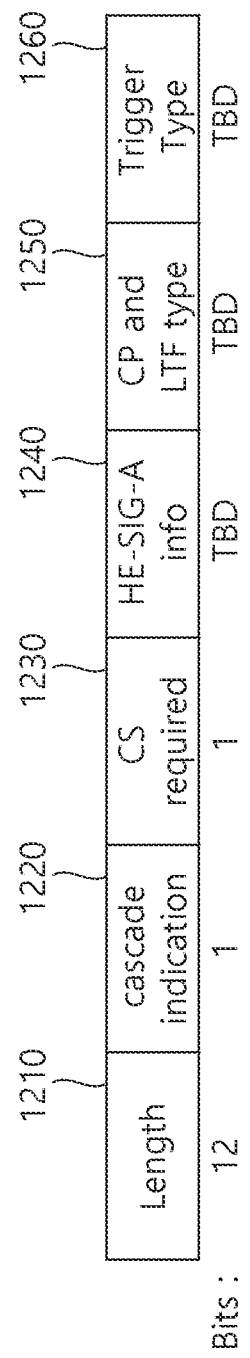
FIG. 12 illustrates an example of a common information field of a trigger frame.

FIG. 12 illustrates an example of a common information field of a trigger frame. A subfield of FIG. 12 may be partially omitted, and an extra subfield may be added. In addition, a length of each subfield illustrated may be changed.

A length field 1210 illustrated has the same value as a length field of an L-SIG field of an uplink PPDU transmitted in response to a corresponding trigger frame, and a length field of the L-SIG field of the uplink PPDU indicates a length of the uplink PPDU. As a result, the length field 1210 of the trigger frame may be used to indicate the length of the corresponding uplink PPDU.

In addition, a cascade identifier field 1220 indicates whether a cascade operation is performed. The cascade operation implies that downlink MU transmission and uplink MU transmission are performed together in the same TXOP. That is, it implies that downlink MU transmission is performed and thereafter uplink MU transmission is performed after a pre-set time (e.g., SIFS). During the cascade operation, only one transmitting device (e.g., AP) may perform downlink communication, and a plurality of transmitting devices (e.g., non-APs) may perform uplink communication.

A CS request field 1230 indicates whether a wireless medium state or a NAV or the like is necessarily considered in a situation where a receiving device which has received a corresponding trigger frame transmits a corresponding uplink PPDU.

An HE-SIG-A information field 1240 may include information for controlling content of a SIG-A field (i.e., HE-SIG-A field) of the uplink PPDU in response to the corresponding trigger frame.

A CP and LTF type field 1250 may include information related to a CP length and LTF length of the uplink PPDU transmitted in response to the corresponding trigger frame. A trigger type field 1260 may indicate a purpose of using the corresponding trigger frame, for example, typical triggering, triggering for beamforming, a request for block ACK/NACK, or the like.

It may be assumed that the trigger type field 1260 of the trigger frame in the present specification indicates a trigger frame of a basic type for typical triggering. For example, the trigger frame of the basic type may be referred to as a basic trigger frame.

Figure 13:
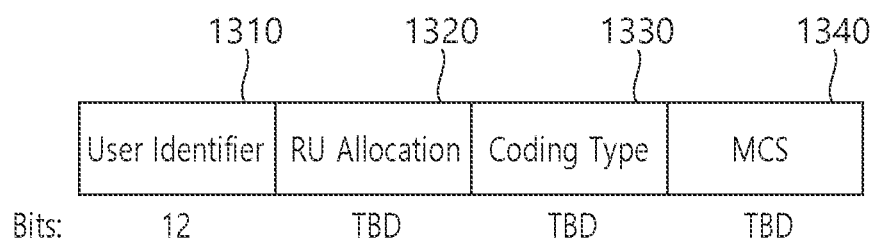
FIG. 13 illustrates an example of a subfield included in a per user information field.

FIG. 13 illustrates an example of a subfield included in a per user information field. A user information field 1300 of FIG. 13 may be understood as any one of the per user information fields 1160 #1 to 1160 #N mentioned above with reference to FIG. 11. A subfield included in the user information field 1300 of FIG. 13 may be partially omitted, and an extra subfield may be added. In addition, a length of each subfield illustrated may be changed.

A user identifier field 1310 of FIG. 13 indicates an identifier of a STA (i.e., receiving STA) corresponding to per user information. An example of the identifier may be the entirety or part of an association identifier (AID) value of the receiving STA.

In addition, an RU allocation field 1320 may be included. That is, when the receiving STA identified through the user identifier field 1310 transmits a TB PPDU in response to the trigger frame, the TB PPDU is transmitted through an RU indicated by the RU allocation field 1320. In this case, the RU indicated by the RU allocation field 1320 may be an RU shown in FIG. 5, FIG. 6, and FIG. 7.

The subfield of FIG. 13 may include a coding type field 1330. The coding type field 1330 may indicate a coding type of the TB PPDU. For example, when BCC coding is applied to the TB PPDU, the coding type field 1330 may be set to '1', and when LDPC coding is applied, the coding type field 1330 may be set to '0'.

In addition, the subfield of FIG. 13 may include an MCS field 1340. The MCS field 1340 may indicate an MCS scheme applied to the TB PPDU. For example, when BCC coding is applied to the TB PPDU, the coding type field 1330 may be set to '1', and when LDPC coding is applied, the coding type field 1330 may be set to '0'.

Hereinafter, a UL OFDMA-based random access (UORA) scheme will be described.

Figure 14:
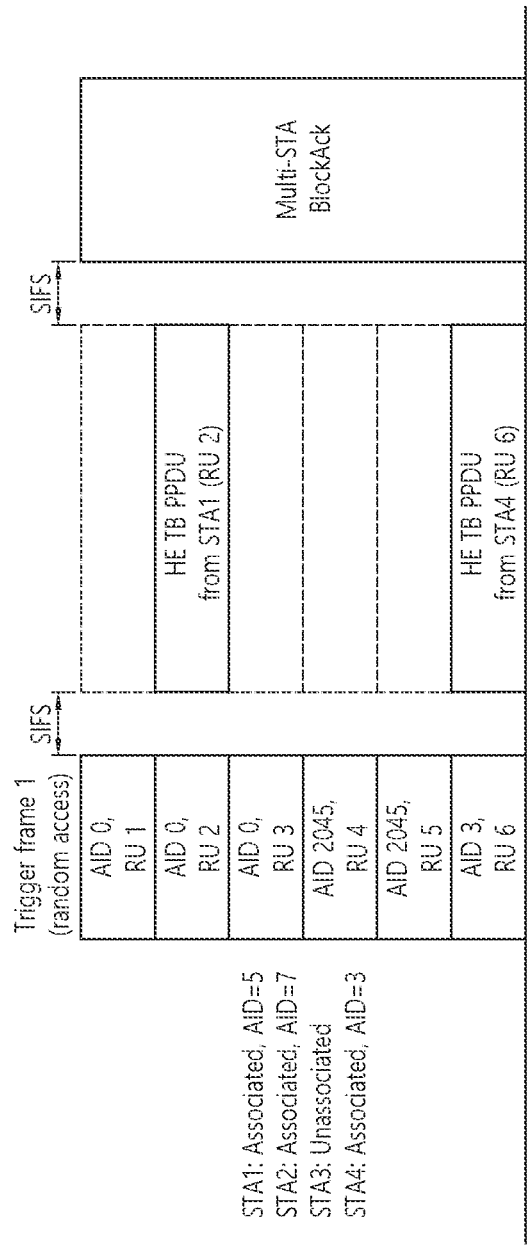
FIG. 14 describes a technical feature of the UORA scheme.

FIG. 14 describes a technical feature of the UORA scheme.

A transmitting STA (e.g., an AP) may allocate six RU resources through a trigger frame as shown in FIG. 14. Specifically, the AP may allocate a 1st RU resource (AID 0, RU 1), a 2nd RU resource (AID 0, RU 2), a 3rd RU resource (AID 0, RU 3), a 4th RU resource (AID 2045, RU 4), a 5th RU resource (AID 2045, RU 5), and a 6th RU resource (AID 3, RU 6). Information related to the AID 0, AID 3, or AID 2045 may be included, for example, in the user identifier field 1310 of FIG. 13. Information related to the RU 1 to RU 6 may be included, for example, in the RU allocation field 1320 of FIG. 13. AID=0 may imply a UORA resource for an associated STA, and AID=2045 may imply a UORA resource for an un-associated STA. Accordingly, the 1st to 3rd RU resources of FIG. 14 may be used as a UORA resource for the associated STA, the 4th and 5th RU resources of FIG. 14 may be used as a UORA resource for the un-associated STA, and the 6th RU resource of FIG. 14 may be used as a typical resource for UL MU.

In the example of FIG. 14, an OFDMA random access backoff (OBO) of a STA1 is decreased to 0, and the STA1 randomly selects the 2nd RU resource (AID 0, RU 2). In addition, since an OBO counter of a STA2/3 is greater than 0, an uplink resource is not allocated to the STA2/3. In addition, regarding a STA4 in FIG. 14, since an AID (e.g., AID=3) of the STA4 is included in a trigger frame, a resource of the RU 6 is allocated without backoff.

Specifically, since the STA1 of FIG. 14 is an associated STA, the total number of eligible RA RUs for the STA1 is 3 (RU 1, RU 2, and RU 3), and thus the STA1 decreases an OBO counter by 3 so that the OBO counter becomes 0. In addition, since the STA2 of FIG. 14 is an associated STA, the total number of eligible RA RUs for the STA2 is 3 (RU 1, RU 2, and RU 3), and thus the STA2 decreases the OBO counter by 3 but the OBO counter is greater than 0. In addition, since the STA3 of FIG. 14 is an un-associated STA, the total number of eligible RA RUs for the STA3 is 2 (RU 4, RU 5), and thus the STA3 decreases the OBO counter by 2 but the OBO counter is greater than 0.

Figure 15:
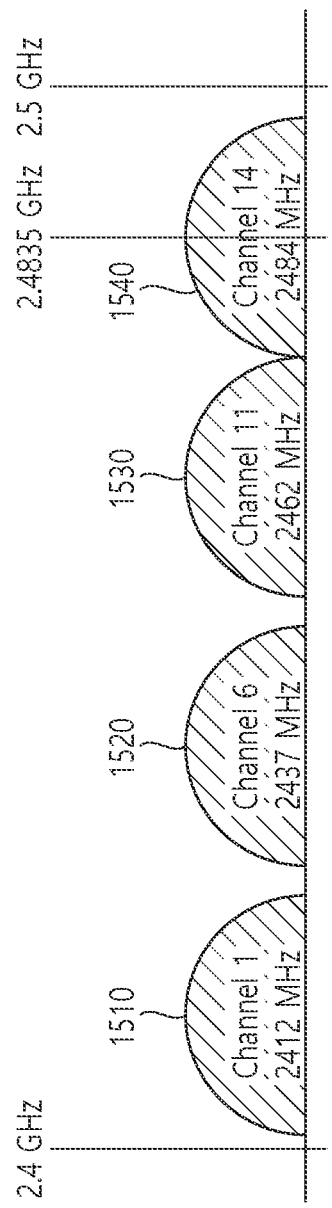
FIG. 15 illustrates an example of a channel used/supported/defined within a 2.4 GHz band.

FIG. 15 illustrates an example of a channel used/supported/defined within a 2.4 GHz band.

The 2.4 GHz band may be called in other terms such as a first band. In addition, the 2.4 GHz band may imply a frequency domain in which channels of which a center frequency is close to 2.4 GHz (e.g., channels of which a center frequency is located within 2.4 to 2.5 GHz) are used/supported/defined.

A plurality of 20 MHz channels may be included in the 2.4 GHz band. 20 MHz within the 2.4 GHz may have a plurality of channel indices (e.g., an index 1 to an index 14). For example, a center frequency of a 20 MHz channel to which a channel index 1 is allocated may be 2.412 GHz, a center frequency of a 20 MHz channel to which a channel index 2 is allocated may be 2.417 GHz, and a center frequency of a 20 MHz channel to which a channel index N is allocated may be (2.407+0.005*N) GHz. The channel index may be called in various terms such as a channel number or the like. Specific numerical values of the channel index and center frequency may be changed.

FIG. 15 exemplifies 4 channels within a 2.4 GHz band. Each of 1st to 4th frequency domains 1510 to 1540 shown herein may include one channel. For example, the 1st frequency domain 1510 may include a channel 1 (a 20 MHz channel having an index 1). In this case, a center frequency of the channel 1 may be set to 2412 MHz. The 2nd frequency domain 1520 may include a channel 6. In this case, a center frequency of the channel 6 may be set to 2437 MHz. The 3rd frequency domain 1530 may include a channel 11. In this case, a center frequency of the channel 11 may be set to 2462 MHz. The 4th frequency domain 1540 may include a channel 14. In this case, a center frequency of the channel 14 may be set to 2484 MHz.

Figure 16:
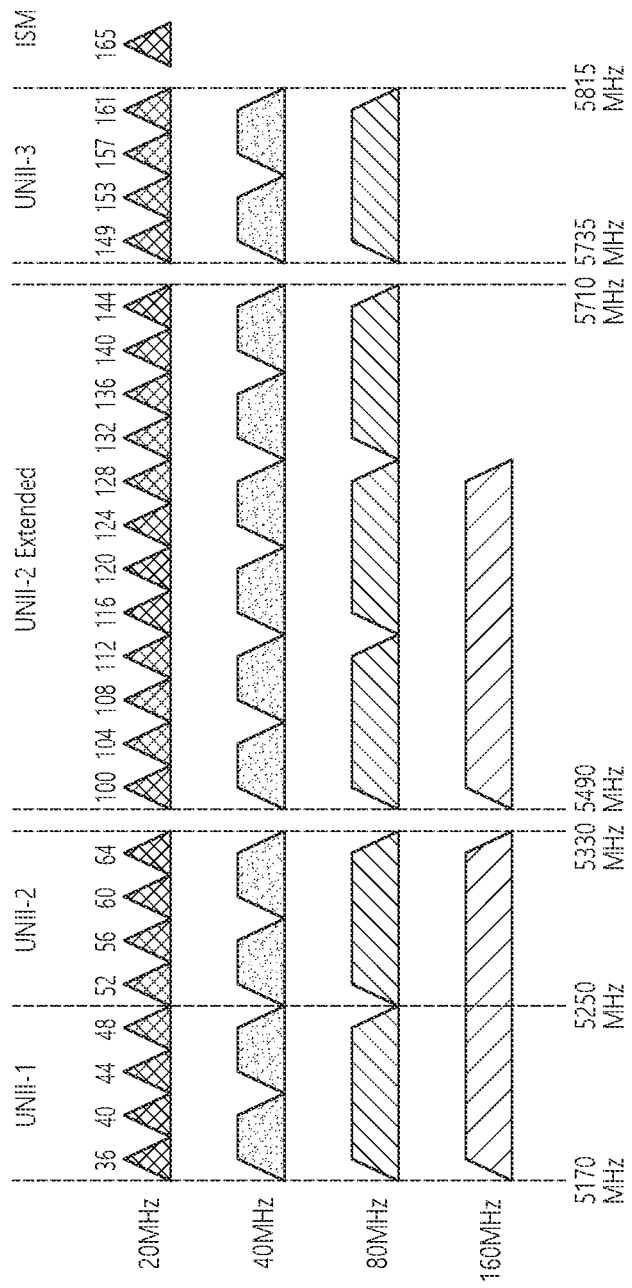
FIG. 16 illustrates an example of a channel used/supported/defined within a 5 GHz band.

FIG. 16 illustrates an example of a channel used/supported/defined within a 5 GHz band.

The 5 GHz band may be called in other terms such as a second band or the like. The 5 GHz band may imply a frequency domain in which channels of which a center frequency is greater than or equal to 5 GHz and less than 6 GHz (or less than 5.9 GHz) are used/supported/defined. Alternatively, the 5 GHz band may include a plurality of channels between 4.5 GHz and 5.5 GHz. A specific numerical value shown in FIG. 16 may be changed.

A plurality of channels within the 5 GHz band include an unlicensed national information infrastructure (UNII)-1, a UNII-2, a UNII-3, and an ISM. The INII-1 may be called UNII Low. The UNII-2 may include a frequency domain called UNII Mid and UNII-2Extended. The UNII-3 may be called UNII-Upper.

A plurality of channels may be configured within the 5 GHz band, and a bandwidth of each channel may be variously set to, for example, 20 MHz, 40 MHz, 80 MHz, 160 MHz, or the like. For example, 5170 MHz to 5330 MHz frequency domains/ranges within the UNII-1 and UNII-2 may be divided into eight 20 MHz channels. The 5170 MHz to 5330 MHz frequency domains/ranges may be divided into four channels through a 40 MHz frequency domain. The 5170 MHz to 5330 MHz frequency domains/ranges may be divided into two channels through an 80 MHz frequency domain. Alternatively, the 5170 MHz to 5330 MHz frequency domains/ranges may be divided into one channel through a 160 MHz frequency domain.

Figure 17:
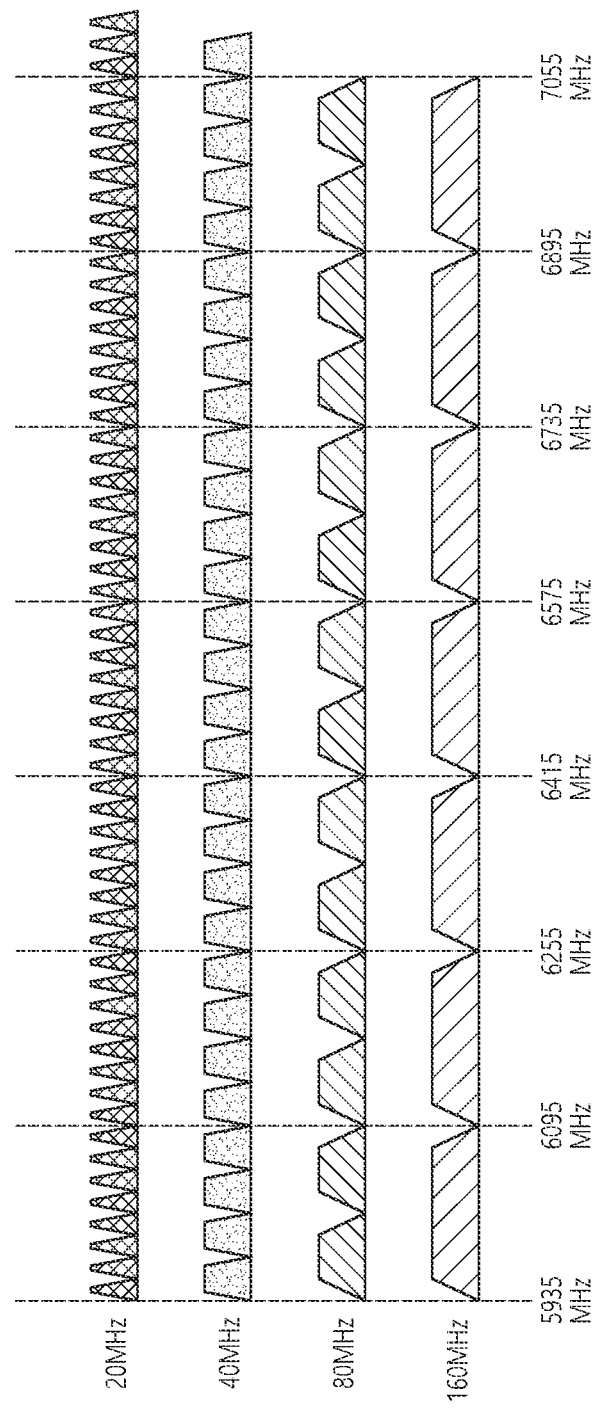
FIG. 17 illustrates an example of a channel used/supported/defined within a 6 GHz band.

FIG. 17 illustrates an example of a channel used/supported/defined within a 6 GHz band.

The 6 GHz band may be called in other terms such as a third band or the like. The 6 GHz band may imply a frequency domain in which channels of which a center frequency is greater than or equal to 5.9 GHz are used/supported/defined. A specific numerical value shown in FIG. 17 may be changed.

For example, the 20 MHz channel of FIG. 17 may be defined starting from 5.940 GHz. Specifically, among 20 MHz channels of FIG. 17, the leftmost channel may have an index 1 (or a channel index, a channel number, etc.), and 5.945 GHz may be assigned as a center frequency. That is, a center frequency of a channel of an index N may be determined as (5.940+0.005*N) GHz.

Accordingly, an index (or channel number) of the 2 MHz channel of FIG. 17 may be 1, 5, 9, 13, 17, 21, 25, 29, 33, 37, 41, 45, 49, 53, 57, 61, 65, 69, 73, 77, 81, 85, 89, 93, 97, 101, 105, 109, 113, 117, 121, 125, 129, 133, 137, 141, 145, 149, 153, 157, 161, 165, 169, 173, 177, 181, 185, 189, 193, 197, 201, 205, 209, 213, 217, 221, 225, 229, 233. In addition, according to the aforementioned (5.940+0.005*N) GHz rule, an index of the 40 MHz channel of FIG. 17 may be 3, 11, 19, 27, 35, 43, 51, 59, 67, 75, 83, 91, 99, 107, 115, 123, 131, 139, 147, 155, 163, 171, 179, 187, 195, 203, 211, 219, 227.

Although 20, 40, 80, and 160 MHz channels are illustrated in the example of FIG. 17, a 240 MHz channel or a 320 MHz channel may be additionally added.

Hereinafter, a PPDU transmitted/received in a STA of the present specification will be described.

Figure 18:
FIG. 18 illustrates an example of a PPDU used in the present specification.

FIG. 18 illustrates an example of a PPDU used in the present specification.

The PPDU of FIG. 18 may be referred to as various terms, such as EHT PPDU, transmitting PPDU, receiving PPDU, first type or Nth type PPDU, and so on. For example, in the present specification, PPDU or EHT PPDU may be referred to by using various terms, such as transmission PPDU, reception PPDU, first type or Nth type PPDU, and so on. Additionally, the EHT PPDU may be used in an EHT system and/or a new WLAN system, which is an enhanced version of the EHT system.

The PPDU of FIG. 18 may represent part or all of a PPDU type that is used in an EHT system. For example, the example of FIG. 18 may be used for both single-user (SU) mode and multi-user (MU) mode, or may be used only for the SU mode, or may be used only for the MU mode. For example, in the EHT system, a trigger-based (TB) PPDU may be separately defined or may be configured based on an example of FIG. 18. A trigger frame and UL-MU operations that are started by the trigger frame (e.g., transmitting operations of the TB PPDU), which are described by at least one of FIG. 10 to FIG. 14, may be directly applied to the EHT system without modification.

In FIG. 18, L-STF to EHT-LTF may be referred to as a preamble or physical preamble, and the L-STF to EHT-LTF may be generated/transmitted/received/obtained/decoded in a physical layer.

Subcarrier spacing of the L-LTF, L-STF, L-SIG, RL-SIG, U-SIG, and EHT-SIG fields of FIG. 18 may be determined as 312.5 kHz, and subcarrier spacing of the EHT-STF, EHT-LTF, Data fields may be determined as 78.125 kHz. That is, tone indexes (or subcarrier indexes) of the L-STF, L-LTF, L-SIG, RL-SIG, U-SIG, and EHT-SIG fields may be indicated in 312.5 kHz units, and tone indexes (or subcarrier indexes) of the EHT-STF, EHT-LTF, Data fields may be indicated in 78.125 kHz units.

In the PPDU of FIG. 18, L-LTF and L-STF may be the same as the fields of the prior art (or related art).

The L-SIG field of FIG. 18 may, for example, include 24 bits of bit information. For example, the 24-bit information may include a 4-bit Rate field, 1 Reserved bit, a 12-bit Length field, 1 Parity bit, and 6 Tail bits. For example, the 12-bit Length field may include information related to a PPDU length or time duration. For example, a value of the 12-bit Length field may be determined based on a type of the PPDU. For example, in case the PPDU is a non-HT PPDU, an HT PPDU, a VHT PPDU, or an EHT PPDU, the value of the Length field may be determined as a multiple of 3. For example, in case the PPDU is an HE PPDU, the value of the Length field may be determined as "a multiple of 3+1" or "a multiple of 3+2". In other words, a value of the Length field for a non-HT PPDU, an HT PPDU, a VHT PPDU, or an EHT PPDU may be determined as a multiple of 3, and a value of the Length field for an HE PPDU may be determined as "a multiple of 3+1" or "a multiple of 3+2".

For example, a transmitting STA may apply BCC encoding, which is based on a ½-code rate for 24-bit information of the L-SIG field. Afterwards, the transmitting STA may obtain 48 bits of BCC encoding bits. Then, BPSK modulation may be applied to the 48 encoding bits so as to generate 48 BPSK symbols. The transmitting STA may map the 48 BPSK symbols to positions excluding a pilot subcarrier {Subcarrier indexes −21, −7, +7, +21} and a DC subcarrier {Subcarrier index 0}. As a result, the 48 BPSK symbols may be mapped to subcarrier indexes −26 to −22, −20 to −8, −6 to −1, +1 to +6, +8 to +20, and +22 to +26. The transmitting STA may additionally map a signal of {−1, −1, −1, 1} to subcarrier indexes {−28, −27, +27, +28}. The aforementioned signal may be used for channel estimation for a frequency domain corresponding to {−28, −27, +27, +28}.

The transmitting STA may generate an RL-SIG, which is generated identically as the L-SIG. The receiving STA may know that the reception PPDU is an HE PPDU or EHT PPDU based on the presence (or existence) of an RL-SIG.

A Universal SIG (U-SIG) may be inserted after the RL-SIG of FIG. 18. The U-SIG may also be referred to by using various terms, such as a first SIG field, a first SIG, a first-type SIG, a control signal, a control signal field, a first (type) control signal, and so on.

The U-SIG may include N-bit information and may also include information for identifying the EHT PPDU type. For example, the U-SIG may be configured based on 2 symbols (e.g., two contiguous OFDM symbols). Each symbol (e.g., OFDM symbol) for the U-SIG may have a duration of 4 us. Each symbol of the U-SIG may be used for transmitting 26-bit information. For example, each symbol of the U-SIG may be transmitted/received based on 52 data tones and 4 pilot tones.

For example, A-bit information (e.g., 52 un-coded bits) may be transmitted through the U-SIG (or U-SIG field), and a first symbol of the U-SIG may transmit first X-bit information (e.g., 26 un-coded bits) among the total of A bits of the corresponding information, and a second symbol of the U-SIG may transmit remaining Y-bit information (e.g., 26 un-coded bits) of the A-bit information. For example, the transmitting STA may obtain 26 un-coded bits that are included in each U-SIG symbol. The transmitting STA may perform convolutional encoding (i.e., BCC encoding) based on a rate of R=½ so as to generate 52-coded bits, and, then, the transmitting STA may perform interleaving on the 52-coded bits. The transmitting STA may perform BPSK modulation on the interleaved 52-coded bits, so as to generate 52 BPSK symbols that are allocated to each U-SIG symbol. One U-SIG symbol may be transmitted based on 56 tones (subcarriers) starting from subcarrier index −28 to subcarrier index+28, with the exception for DC index 0. The 52 BPSK symbols that are generated by the transmitting STA may be transmitted based on the remaining tones (subcarriers) excluding the pilot tones −21, −7, +7, +21 tones.

For example, the A-bit information (e.g., 52 un-coded bits) may include a CRC field (e.g., 4-bit length field) and a Tail field (e.g., 6-bit length field). The CRC field and the Tail field may be transmitted through the second symbol of the U-SIG. The CRC field may be generated based on the 26 bits being allocated to the first symbol of the U-SIG and the remaining 16 bits excluding the CRC/Tail fields from the second symbol. And, the CRC field may be generated based on the related art CRC calculation algorithm. Additionally, the Tail field may be used for terminating a trellis of a convolutional decoder and may, for example, be configured as "000000".

The A-bit information (e.g., 52 un-coded bits) being transmitted by the U-SIG (or U-SIG field) may be divided into version-independent bits and version-dependent bits. For example, a size of the version-independent bits may be fixed or variable. For example, the version-independent bits may be allocated only to the first symbol of the U-SIG or may be allocated to both the first and second symbols of the U-SIG. For example, the version-independent bits and the version-dependent bits may be referred to by using various terms, such as a first control bit and a second control bit.

For example, the version-independent bits of the U-SIG may include a 3-bit PHY version identifier. For example, the 3-bit PHY version identifier may include information related to the PHY version of the transmission/reception PPDU. For example, a first value of the 3-bit PHY version identifier may indicate that the transmission/reception PPDU is an EHT PPDU. In other words, when the transmitting STA transmits the EHT PPDU, the transmitting STA may set the 3-bit PHY version identifier to the first value. In other words, based on the PHY version identifier having the first value, the receiving STA may determine that the reception PPDU is an EHT PPDU.

For example, the version-independent bits of the U-SIG may include a 1-bit UL/DL flag field. A first value of the 1-bit UL/DL flag field is related to UL communication, and a second value of the 1-bit UL/DL flag field is related to DL communication.

For example, the version-independent bits of the U-SIG may include information related to the length of a TXOP, and information related to BSS color ID.

For example, in case the EHT PPDU is divided into various types (e.g., EHT PPDU related to SU mode, EHT PPDU related to MU mode, EHT PPDU related to a Trigger Frame, EHT PPDU related to Extended Range transmission, and so on), information related to the EHT PPDU type may be included in the version-dependent bits of the U-SIG.

For example, the U-SIG may include information related to 1) a bandwidth field including information related to a bandwidth, 2) a field including information related to an MCS scheme being applied to the EHT-SIG, 3) an indication field including information related to whether or not a dual subcarrier modulation (DCM) scheme is applied to the EHT-SIG, 4) a field including information related to a number of symbols being used for the EHT-SIG, 5) a field including information related to whether or not the EHT-SIG is generated throughout the whole band, 6) a field including information related to an EHT-LTF/STF type, 7) a field indicating an EHT-LTF length and a CP length.

Preamble puncturing may be applied to the PPDU of FIG. 18. Preamble puncturing means applying puncturing to a partial band (e.g., a Secondary 20 MHz band) of the whole band of a PPDU. For example, when an 80 MHz PPDU is transmitted, the STA may apply puncturing to a secondary 20 MHz band of the 80 MHz band and may transmit the PPDU only through a primary 20 MHz band and a secondary 40 MHz band.

For example, a pattern of preamble puncturing may be preset (or predetermined). For example, when a first puncturing pattern is applied, the puncturing may be applied only for a secondary 20 MHz band within the 80 MHz band. For example, when a second puncturing pattern is applied, the puncturing may be applied to only one of the two secondary 20 MHz bands that are included in the secondary 40 MHz band within the 80 MHz band. For example, when a third puncturing pattern is applied, the puncturing may be applied only to a secondary 20 MHz band that is included in a primary 80 MHz band within a 160 MHz band (or 80+80 MHz band). For example, when a fourth puncturing pattern is applied, and when a primary 40 MHz band that is included in a primary 80 MHz band within a 160 MHz band (or 80+80 MHz band) is present, the puncturing may be applied to at least one 20 MHz channel that does not belong to the primary 40 MHz band.

Information related to the preamble puncturing that is applied to the PPDU may be included in the U-SIG and/or EHT-SIG. For example, a first field of the U-SIG may include information related to a contiguous bandwidth of the PPDU, and a second field of the U-SIG may include information related to preamble puncturing that is applied to the PPDU.

For example, the U-SIG and EHT-SIG may include information related to preamble puncturing based on the following method. When the bandwidth of a PPDU exceeds 80 MHz, the U-SIG may be separately configured in 80 MHz units. For example, when the bandwidth of a PPDU is 160 MHz, a first U-SIG for a first 80 MHz band and a second U-SIG for a second 80 MHz band may be included in the corresponding PPDU. In this case, a first field of the first U-SIG may include information related to the 160 MHz bandwidth, and a second field of the first U-SIG may include information related to preamble puncturing (i.e., information related to a preamble puncturing pattern) that is applied to the first 80 MHz band. Additionally, a first field of the second U-SIG may include information related to the 160 MHz bandwidth, and a second field of the second U-SIG may include information related to preamble puncturing (i.e., information related to a preamble puncturing pattern) that is applied to the second 80 MHz band. Meanwhile, an EHT-SIG that is contiguous to the first U-SIG may include information related to preamble puncturing (i.e., information related to a preamble puncturing pattern) that is applied to the second 80 MHz band, and an EHT-SIG that is contiguous to the second U-SIG may include information related to preamble puncturing (i.e., information related to a preamble puncturing pattern) that is applied to the first 80 MHz band.

Additionally or alternatively, the U-SIG and EHT-SIG may include information related to preamble puncturing based on the following method. The U-SIG may include information related to preamble puncturing (i.e., information related to a preamble puncturing pattern) for all bands. That is, the EHT-SIG may not include information related to preamble puncturing, and only the U-SIG may include information related to preamble puncturing (i.e., information related to a preamble puncturing pattern).

The U-SIG may be configured of 20 MHz units. For example, when an 80 MHz PPDU is configured, the U-SIG may be duplicated. That is, 4 identical U-SIGs may be included in the 80 MHz PPDU. A PPDU that exceeds the 80 MHz bandwidth may include different U-SIGs.

The EHT-SIG of FIG. 18 may include the technical features of an HE-SIG-B, which is indicated in the examples of FIG. 8 to FIG. 9, as they are. The EHT-SIG may also be referred to by using various terms, such as a second SIG field, a second SIG, a second-type SIG, a control signal, a control signal field, a second (type) control signal, and so on.

The EHT-SIG may include N-bit information (e.g., 1-bit information) related to whether an EHT PPDU supports the SU mode or whether an EHT PPDU supports the MU mode.

The EHT-SIG may be configured based on various MCS schemes. As described above, the information related to the MCS scheme being applied to the EHT-SIG may be included in the U-SIG. The EHT-SIG may be configured based on a DCM scheme. For example, among N number of data tones (e.g., 52 data tones) that are allocated for the EHT-SIG, a first modulation scheme may be applied to one half of contiguous tones, and a second modulation scheme may be applied to the remaining half of contiguous tones. That is, the transmitting STA may modulate specific control information to a first symbol based on the first modulation scheme and may allocate the modulated first symbol to one half of contiguous tones. Thereafter, the transmitting STA may modulate the same control information to a second symbol based on the second modulation scheme and may allocated the modulated second symbol to the other half of contiguous tones. As described above, information related to whether or not the DCM scheme is applied to the EHT-SIG (e.g., 1 bit field) may be included in the U-SIG. EHT-STF of FIG. 18 may be used for enhancing automatic gain control estimation in a multiple input multiple output (MIMO) environment or OFDMA environment. And, EHT-LTF of FIG. 18 may be used for estimating a channel in a MIMO environment or OFDMA environment.

The EHT-STF may be set to various types. For example, among the STFs, a first type (i.e., 1×STF) may be generated based on a first type STF sequence in which non-zero coefficients are positioned at 16 subcarrier spacings. An STF signal that is generated based on the first type STF sequence may have a periodicity (or cycle period) of 0.8 μs. And, the signal having the periodicity of 0.8 μs may be repeated 5 times and become a first type STF having a length of 4 μs. For example, among the STFs, a second type (i.e., 2× STF) may be generated based on a second type STF sequence in which non-zero coefficients are positioned at 8 subcarrier spacings. An STF signal that is generated based on the second type STF sequence may have a periodicity (or cycle period) of 1.6 μs. And, the signal having the periodicity of 1.6 μs may be repeated 5 times and become a second type STF having a length of 8 μs. Hereinafter, an example of a sequence (i.e., EHT-STF sequence) for configuring an EHT-STF will be proposed. The following sequence may be modified to various types.

The EHT-STF may be configured based on the following M sequence.

$$M=\{-1,-1,-1,1,1,1,-1,1,1,1,-1,1,1,-1,1\} \quad \text{<Equation 1>}$$

An EHT-STF for a 20 MHz PPDU may be configured based on the following equation. The example shown below may be a first type (i.e., 1×STF) sequence. For example, the first type sequence may be included in an EHT-PPDU and not a trigger-based (TB) PPDU. In the following equation, (a:b:c) may denote durations being defined at b tone spacings (i.e., subcarrier spacings) starting from an a tone index (i.e., subcarrier index) to a c tone index. For example, Equation 2 shown below may represent a sequence that is defined at 16 tone spacings starting from tone index −112 to tone index 112. For an EHT-STF, since subcarrier spacing of 78.125 kHz is applied, the 16 tone spacings may mean that EHT-STF coefficients (or elements) are positioned at 78.125*16=1250 kHz intervals (or spacings). Additionally, * means multiplication (i.e., 'multiplied by'), and sqrt( ) means square root.

$$\text{EHT-STF}(-112{:}16{:}112)=\{M\}*(1+j)/\text{sqrt}(2) \quad \text{<Equation 2>}$$

$$\text{EHT-STF}(0)=0$$

An EHT-STF for a 40 MHz PPDU may be configured based on the following equation. The example shown below may be a first type (i.e., 1×STF) sequence.

$$\text{EHT-STF}(-240{:}16{:}240)=\{M,0,-M1\}*(1+j)/\text{sqrt}(2) \quad \text{<Equation 3>}$$

An EHT-STF for an 80 MHz PPDU may be configured based on the following equation. The example shown below may be a first type (i.e., 1×STF) sequence.

$$\text{EHT-STF}(-496{:}16{:}496)=\{M,1,-M,0,-M,1,-M1\}* \\ (1+j)/\text{sqrt}(2) \quad \text{<Equation 4>}$$

An EHT-STF for a 160 MHz PPDU may be configured based on the following equation. The example shown below may be a first type (i.e., 1×STF) sequence.

$$\text{EHT-STF}(-1008{:}16{:}1008)=\{M,1,-M,0,-M,1,-M,0,- \\ M,-1,M,0,-M,1,-M1\}*(1+j)/\text{sqrt}(2) \quad \text{<Equation 5>}$$

In the EHT-STF for an 80+80 MHz PPDU, a sequence for a lower 80 MHz may be the same as Equation 4. And, in the EHT-STF for the 80+80 MHz PPDU, a sequence for a higher 80 MHz may be configured based on the following equation.

$$\text{EHT-STF}(-496{:}16{:}496)=\{-M,-1,M,0,-M,1,-M\}* \\ (1+j)/\text{sqrt}(2) \quad \text{<Equation 6>}$$

Hereinafter, Equation 7 to Equation 11 relate to examples of a second type (i.e., 2× STF) sequence.

$$\text{EHT-STF}(-120{:}8{:}120)=\{M,0,-M\}*(1+j)/\text{sqrt}(2) \quad \text{<Equation 7>}$$

An EHT-STF for a 40 MHz PPDU may be configured based on the following equation.

$$\text{EHT-STF}(-248{:}8{:}248)=\{M,-1,-M,0,M,-1,M\}*(1+j)/ \\ \text{sqrt}(2) \quad \text{<Equation 8>}$$

$$\text{EHT-STF}(-248)=0$$

$$\text{EHT-STF}(248)=0$$

An EHT-STF for an 80 MHz PPDU may be configured based on the following equation.

$$\text{EHT-STF}(-504{:}8{:}504)=\{M,-1,M,-1,-M,-1,M,0,-M, \\ 1,M,1,-M,1,-M1\}*(1+j)/\text{sqrt}(2) \quad \text{<Equation 9>}$$

An EHT-STF for a 160 MHz PPDU may be configured based on the following equation.

$$\text{EHT-STF}(-1016{:}16{:}1016)=\{M,-1,M,-1,-M,-1,M,0, \\ -M,1,M,1,-M,1,-M,0,-M,1,-M,1,M,1,-M,0,-M, \\ 1,M,1,-M,1,-M\}*(1+j)/\text{sqrt}(2) \quad \text{<Equation 10>}$$

$$\text{EHT-STF}(-8)=0, \text{EHT-STF}(8)=0,$$

$$\text{EHT-STF}(-1016)=0, \text{EHT-STF}(1016)=0$$

In the EHT-STF for an 80+80 MHz PPDU, a sequence for a lower 80 MHz may be the same as Equation 9. And, in the EHT-STF for the 80+80 MHz PPDU, a sequence for a higher 80 MHz may be configured based on the following equation.

$$\text{EHT-STF}(-504{:}8{:}504)=\{-M,1,-M,1,M,1,-M,0,-M,1, \\ M,1,-M,1,-M\}*(1+j)/\text{sqrt}(2) \quad \text{<Equation 11>}$$

$$\text{EHT-STF}(-504)=0,$$

$$\text{EHT-STF}(504)=0$$

An EHT-LTF may have first, second, and third types (i.e., 1×, 2×, 4×LTF). For example, the first/second/third type LTF may be generated based on an LTF sequence in which non-zero coefficients are positioned at 4/2/1 subcarrier spacing(s). The first/second/third type LTF may have a time length of 3.2/6.4/12.8 μs. Additionally, various lengths of GI (e.g., 0.8/1/6/3.2 μs) may be applied to the first/second/third type LTF.

Information related to an STF and/or LTF type (including information related to GI that is applied to the LTF) may be included in an SIG A field and/or SIG B field of FIG. 18.

The PPDU (i.e., EHT-PPDU) of FIG. 18 may be configured based on examples of FIG. 5 and FIG. 6.

For example, an EHT PPDU being transmitted over a 20 MHz band, i.e., a 20 MHz EHT PPDU, may be configured based on RUs of FIG. 5. That is, the location of an RU of the EHT-STF, EHT-LTF, data field being included in the EHT PPDU may be determined as shown in FIG. 5.

An EHT PPDU being transmitted over a 40 MHz band, i.e., a 40 MHz EHT PPDU, may be configured based on RUs of FIG. 6. That is, the location of an RU of the EHT-STF, EHT-LTF, data field being included in the EHT PPDU may be determined as shown in FIG. 6.

Since the RU location of FIG. 6 corresponds to 40 MHz, if the pattern of FIG. 6 is repeated two times, a tone plan for 80 MHz may be determined. That is, an 80 MHz EHT PPDU may be transmitted based on a new tone plan in which the RU of FIG. 6 is repeated two times, and not the RU of FIG. 7.

In case the pattern of FIG. 6 is repeated two times, 23 tones (i.e., 11 guard tones+12 guard tones) may be configured in a DC region. That is, a tone plan for an 80 MHz EHT PPDU being allocated based on OFDMA may have 23 DC tones. On the other hand, an 80 MHz EHT PPDU being allocated based on non-OFDMA (i.e., non-OFDMA full Bandwidth 80 MHz PPDU) may be configured based on 996 RUs and may include 5 DC tones, 12 left-guard tones, and 11 right-guard tones.

A tone plan for 160/240/320 MHz may be configured to have a format of repeating the pattern of FIG. 6 multiple times.

The PPDU of FIG. 18 may be determined (or identified) as an EHT PPDU based on the following method.

A receiving STA may determine a type of an RX PPDU as the EHT PPDU, based on the following aspect. For example, the RX PPDU may be determined as the EHT PPDU: 1) when a first symbol after an L-LTF signal of the RX PPDU is a BPSK symbol; 2) when RL-SIG in which the L-SIG of the RX PPDU is repeated is detected; and 3) when a result of applying "module 3" to a value of a length field of the L-SIG of the RX PPDU is detected as "0". When the RX PPDU is determined as the EHT PPDU, the receiving STA may detect a type of the EHT PPDU (e.g., an SU/MU/Trigger-based/Extended Range type), based on bit information included in a symbol after the RL-SIG of FIG. 18. In other words, the receiving STA may determine the RX PPDU as the EHT PPDU, based on: 1) a first symbol after an L-LTF signal, which is a BPSK symbol; 2) RL-SIG contiguous to the L-SIG field and identical to L-SIG; 3) L-SIG including a length field in which a result of applying "modulo 3" is set to "0"; and 4) a 3-bit PHY version identifier of the aforementioned U-SIG (e.g., a PHY version identifier having a first value).

For example, the receiving STA may determine the type of the RX PPDU as the EHT PPDU, based on the following aspect. For example, the RX PPDU may be determined as the HE PPDU: 1) when a first symbol after an L-LTF signal is a BPSK symbol; 2) when RL-SIG in which the L-SIG is repeated is detected; and 3) when a result of applying "module 3" to a value of a length field of the L-SIG is detected as "1" or "2".

For example, the receiving STA may determine the type of the RX PPDU as a non-HT, HT, and VHT PPDU, based on the following aspect. For example, the RX PPDU may be determined as the non-HT, HT, and VHT PPDU: 1) when a first symbol after an L-LTF signal is a BPSK symbol; and 2) when RL-SIG in which L-SIG is repeated is not detected. In addition, even if the receiving STA detects that the RL-SIG is repeated, when a result of applying "modulo 3" to the length value of the L-SIG is detected as "0", the RX PPDU may be determined as the non-HT, HT, and VHT PPDU.

In the following example, a signal represented as a (TX/RX/UL/DL) signal, a (TX/RX/UL/DL) frame, a (TX/RX/UL/DL) packet, a (TX/RX/UL/DL) data unit, (TX/RX/UL/DL) data, or the like may be a signal transmitted/received based on the PPDU of FIG. 18. The PPDU of FIG. 18 may be used to transmit/receive frames of various types. For example, the PPDU of FIG. 18 may be used for a control frame. An example of the control frame may include a request to send (RTS), a clear to send (CTS), a power save-poll (PS-poll), BlockACKReq, BlockAck, a null data packet (NDP) announcement, and a trigger frame. For example, the PPDU of FIG. 18 may be used for a management frame. An example of the management frame may include a beacon frame, a (re-)association request frame, a (re-)association response frame, a probe request frame, and a probe response frame. For example, the PPDU of FIG. 18 may be used for a data frame. For example, the PPDU of FIG. 18 may be used to simultaneously transmit at least two or more of the control frame, the management frame, and the data frame.

Figure 19:
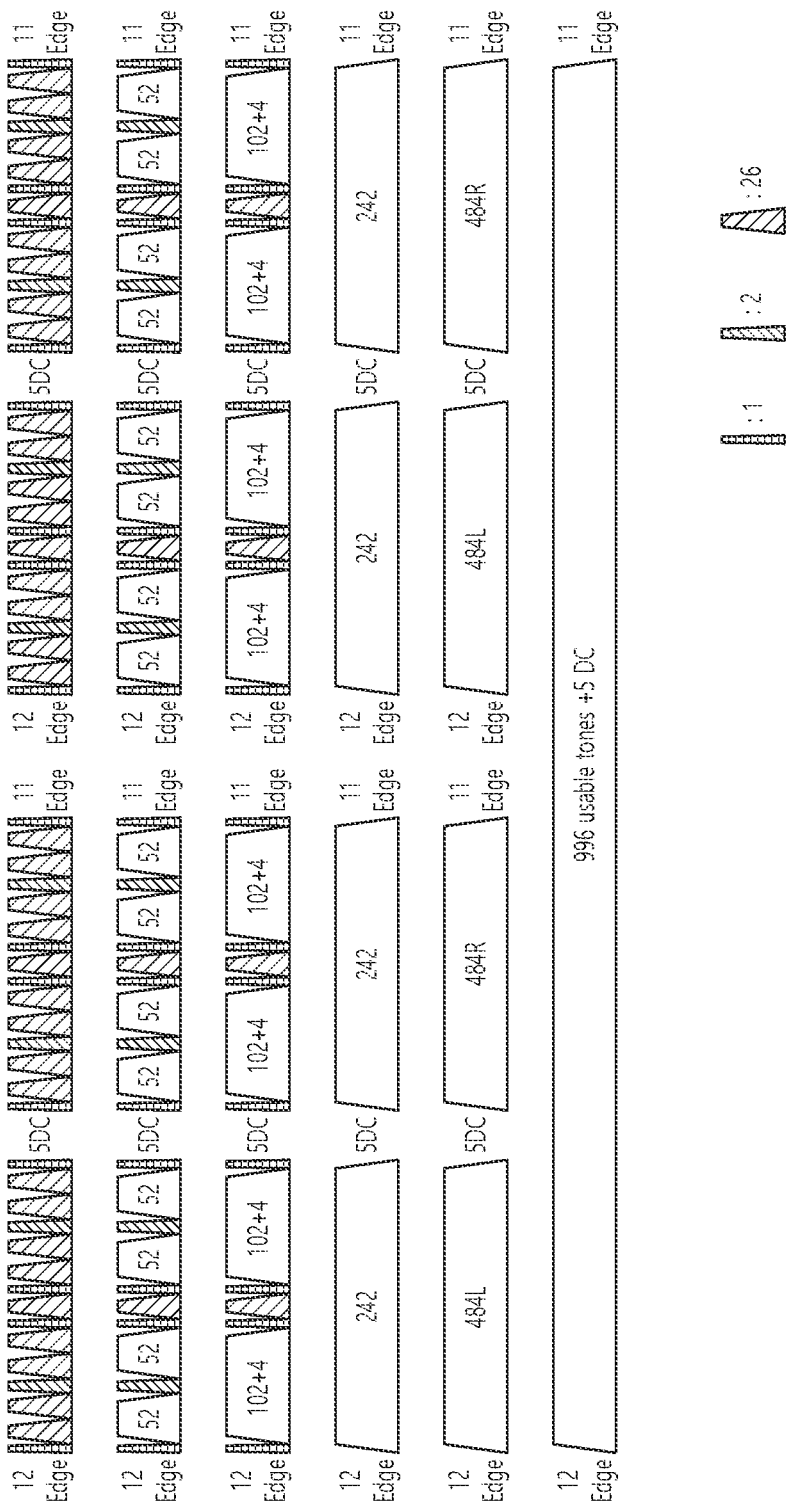
FIG. 19 shows a tone plan for an 80 MHz band in an EHT WLAN system.

FIG. 19 shows a tone plan for an 80 MHz band in an EHT WLAN system.

As described above, in the EHT WLAN system, a tone plan for an 80 MHz band may be defined by repeating two times a tone plan for 40 MHz (RU pattern of FIG. 6) that is defined in the 802.11ax WLAN system by using a detailed RU pattern.

Referring to FIG. 19, a tone plan for the 80 MHz EHT PPDU that is allocated based on OFDMA may have 23 DC tones (i.e., 11 guard tones+12 guard tones). Additionally, 1 or 2 null tone(s) (or null subcarrier(s)) may be inserted in-between 26 RUs, 52 RUs, 106 RUs (shown as 102+4 RUs). FIG. 19 more specifically shows positions and number of null subcarriers shown FIG. 6.

Additionally, left-side 484 RUs and right-side 484 RUs may all include 5 DC tones at a center part. In the left-side 484 RUs, an RU that is positioned on a left side of the center DC tone is indicated as 484L, and an RU that is positioned on a right side of the center DC tone is indicated as 484R. Similarly, in the right-side 484 RUs, an RU that is positioned on a left side of the center DC tone is indicated as 484L, and an RU that is positioned on a right side of the center DC tone is indicated as 484R.

On the other hand, an 80 MHz EHT PPDU being allocated based on non-OFDMA (i.e., non-OFDMA full Bandwidth 80 MHz PPDU) may be configured based on 996 RUs and may include 5 DC tones, 12 left-guard tones, and 11 right-guard tones.

In the EHT WLAN system, a tone plan for 160/240/320 MHz may be configured to have a format of repeating the pattern of FIG. 19 multiple times.

1. Tone Plan in 802.11ax WLAN System

In the present specification, a tone plan relates to a rule for determining a size of a resource unit (RU) and/or a location of the RU. Hereinafter, a PPDU based on the IEEE 802.11ax standard, that is, a tone plan applied to an HE PPDU, will be described. In other words, hereinafter, the RU size and RU location applied to the HE PPDU are described, and control information related to the RU applied to the HE PPDU is described.

In the present specification, control information related to an RU (or control information related to a tone plan) may include a size and location of the RU, information of a user STA allocated to a specific RU, a frequency bandwidth for a PPDU in which the RU is included, and/or control information on a modulation scheme applied to the specific RU. The control information related to the RU may be included in an SIG field. For example, in the IEEE 802.11ax standard, the control information related to the RU is included in an HE-SIG-B field. That is, in a process of generating a TX PPDU, a transmitting STA may allow the control information on the RU included in the PPDU to be included in the HE-SIG-B field. In addition, a receiving STA may receive an HE-SIG-B included in an RX PPDU and obtain control information included in the HE-SIG-B, so as to determine whether there is an RU allocated to the receiving STA and decode the allocated RU, based on the HE-SIG-B.

In the IEEE 802.11ax standard, HE-STF, HE-LTF, and data fields may be configured in unit of RUs. That is, when a first RU for a first receiving STA is configured, STF/LTF/data fields for the first receiving STA may be transmitted/received through the first RU.

In the IEEE 802.11ax standard, a PPDU (i.e., SU PPDU) for one receiving STA and a PPDU (i.e., MU PPDU) for a plurality of receiving STAs are separately defined, and respective tone plans are separately defined. Specific details will be described below.

The RU defined in 11 ax may include a plurality of subcarriers. For example, when the RU includes N subcarriers, it may be expressed by an N-tone RU or N RUs. A location of a specific RU may be expressed by a subcarrier index. The subcarrier index may be defined in unit of a subcarrier frequency spacing. In the 11ax standard, the subcarrier frequency spacing is 312.5 kHz or 78.125 kHz, and the subcarrier frequency spacing for the RU is 78.125 kHz. That is, a subcarrier index+1 for the RU may mean a location which is more increased by 78.125 kHz than a DC tone, and a subcarrier index −1 for the RU may mean a location which is more decreased by 78.125 kHz than the DC tone. For example, when the location of the specific RU is expressed by [−121:−96], the RU may be located in a region from a subcarrier index −121 to a subcarrier index −96. As a result, the RU may include 26 subcarriers.

The N-tone RU may include a pre-set pilot tone.

2. Null Subcarrier and Pilot Subcarrier

A subcarrier and resource allocation in the 802.11ax system will be described.

An OFDM symbol consists of subcarriers, and the number of subcarriers may function as a bandwidth of a PPDU. In the WLAN 802.11 system, a data subcarrier used for data transmission, a pilot subcarrier used for phase information and parameter tacking, and an unused subcarrier not used for data transmission and pilot transmission are defined.

An HE MU PPDU which uses OFDMA transmission may be transmitted by mixing a 26-tone RU, a 52-tone RU, a 106-tone RU, a 242-tone RU, a 484-tone RU, and a 996-tone RU.

Herein, the 26-tone RU consists of 24 data subcarriers and 2 pilot subcarriers. The 52-tone RU consists of 48 data subcarriers and 4 pilot subcarriers. The 106-tone RU consists of 102 data subcarriers and 4 pilot subcarriers. The 242-tone RU consists of 234 data subcarriers and 8 pilot subcarriers. The 484-tone RU consists of 468 data subcarriers and 16 pilot subcarriers. The 996-tone RU consists of 980 data subcarriers and 16 pilot subcarriers.

1) Null Subcarrier

As shown in FIG. 5 to FIG. 7, a null subcarrier exists between 26-tone RU, 52-tone RU, and 106-tone RU locations. The null subcarrier is located near a DC or edge tone to protect against transmit center frequency leakage, receiver DC offset, and interference from an adjacent RU. The null subcarrier has zero energy. An index of the null subcarrier is listed as follows.

| Channel Width | RU Size | Null Subcarrier Indices |
|---|---|---|
| 20 MHz | 26, 52 | ±69, ±122 |
|  | 106 | none |
|  | 242 | none |
| 40 MHz | 26, 52 | ±3, ±56, ±57, ±110, ±137, ±190, ±191, ±244 |
|  | 106 | ±3, ±110, ±137, ±244 |
|  | 242, 484 | none |
| 80 MHz | 26, 52 | ±17, ±70, ±71, ±124, ±151, ±204, ±205, ±258, ±259, ±312, ±313, ±366, ±393, ±446, ±447, ±500 |
|  | 106 | ±17, ±124, ±151, ±258, ±259, ±366, ±393, ±500 |
|  | 242, 484 | none |
|  | 996 | none |
| 160 MHz | 26, 52, 106 | {null subcarrier indices in 80 MHz − 512, null subcarrier indices in 80 MHz + 512} |
|  | 242, 484, 996, 2×996 | none |

A null subcarrier location for each 80 MHz frequency segment of the 80+80 MHz HE PPDU shall follow the location of the 80 MHz HE PPDU.

2) Pilot Subcarrier

If a pilot subcarrier exists in an HE-LTF field of HE SU PPDU, HE MU PPDU, HE ER SU PPDU, or HE TB PPDU, a location of a pilot sequence in an HE-LTF field and data field may be the same as a location of 4× HE-LTF. In 1× HE-LTF, the location of the pilot sequence in HE-LTF is configured based on pilot subcarriers for a data field multiplied 4 times. If the pilot subcarrier exists in 2× HE-LTF, the location of the pilot subcarrier shall be the same as a location of a pilot in a 4× data symbol. All pilot subcarriers are located at even-numbered indices listed below.

| Channel Width | RU Size | Pilot Subcarrier Indices |
|---|---|---|
| 20 MHz | 26, 52 | ±10, ±22, ±36, ±48, ±62, ±76, ±90, ±102, ±116 |
|  | 106, 242 | ±22, ±48, ±90, ±116 |
| 40 MHz | 26, 52 | ±10, ±24, ±36, ±50, ±64, ±78, ±90, ±104, ±116, ±130, ±144, ±158, ±170, ±184, ±198, ±212, ±224, ±238 |
|  | 106, 242, 484 | ±10, ±36, ±78, ±104, ±144, ±170, ±212, ±238 |
| 80 MHz | 26, 52 | ±10, ±24, ±38, ±50, ±64, ±78, ±92, ±104, ±118, ±130, ±144, ±158, ±172, ±184, ±198, ±212, ±226, ±238, ±252, ±266, ±280, ±292, ±306, ±320, ±334, ±346, ±360, ±372, ±386, ±400, ±414, ±426, ±440, ±454, ±468, ±480, ±494 |

-continued

| Channel Width | RU Size | Pilot Subcarrier Indices |
|---|---|---|
| | 106, 242, 484 | ±24, ±50, ±92, ±118, ±158, ±184, ±226, ±252, ±266, ±292, ±334, ±360, ±400, ±426, ±468, ±494 |
| | 996 | ±24, ±92, ±158, ±226, ±266, ±334, ±400, ±468 |
| 160 MHz | 26, 52, 106, 242, 484 | {pilot subcarrier indices in 80 MHz − 512, pilot subcarrier indices in 80 MHz + 512} |
| | 996 | {for the lower 80 MHz, pilot subcarrier indices in 80 MHz − 512, for the upper 80 MHz, pilot subcarrier indices in 80 MHz + 512} |

At 160 MHz or 80+80 MHz, the location of the pilot subcarrier shall use the same 80 MHz location for 80 MHz of both sides.

3. EDCA Backoff Procedure

Figure 20:
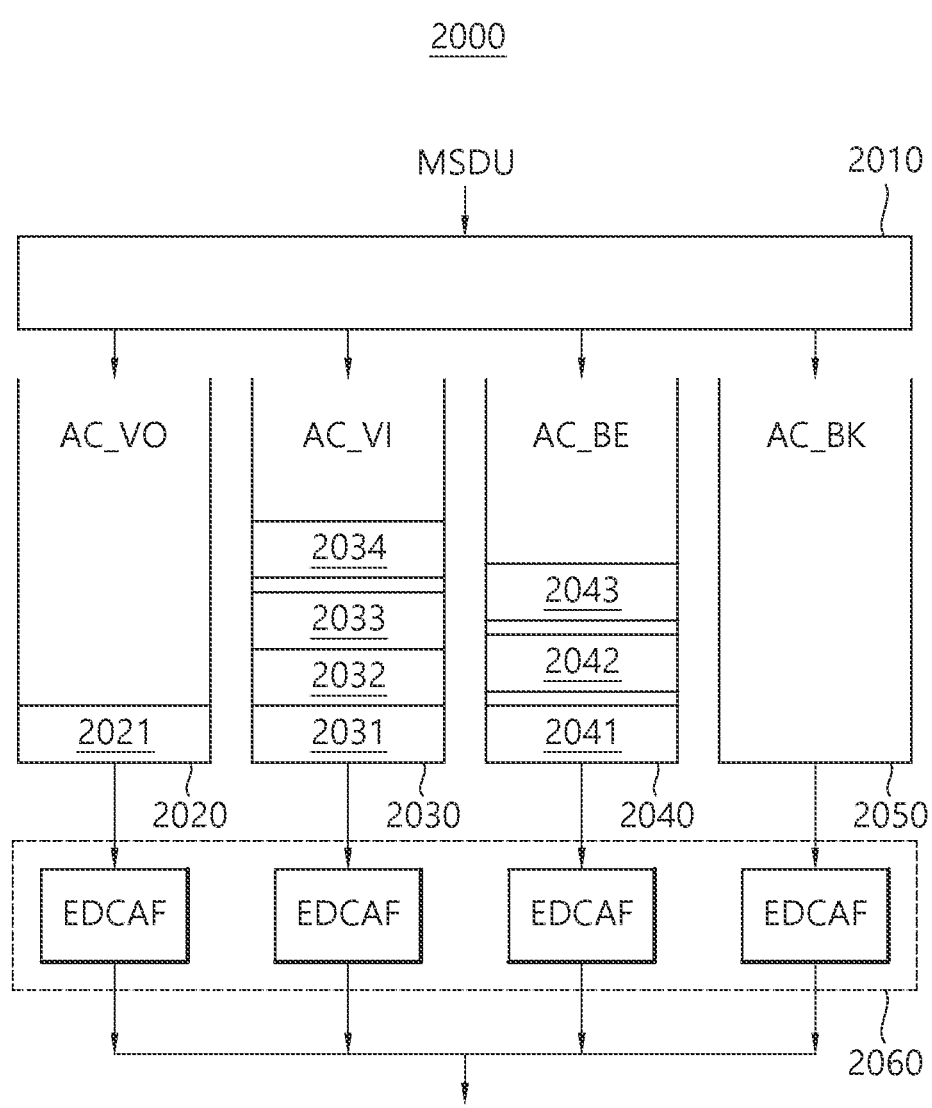
FIG. 20 is a diagram showing an EDCA-based channel access method.

FIG. 20 is a diagram showing an EDCA-based channel access method. In the WLAN system, a station (STA) may perform channel access according to a plurality of user priorities that are defined for enhanced distributed channel access (EDCA).

More specifically, for the transmission of Quality of Service (QoS) data frames based on the plurality of user priorities, four access categories (ACs) (background (AC_BK), best effort (AC_BE), video (AC_VI), and voice (AC_VO)) may be defined.

The STA may receive traffic data (e.g., MAC service data unit (MSDU)) having predetermined user priorities from a higher layer.

For example, in order to determine a transmission order of MAC frames that are to be transmitted by the STA, the user priorities may be configured with differential values for each traffic data. The user priority may be mapped to each access category (AC) in which the traffic data is buffered, by using the method shown below in Table 5.

TABLE 5

| Priority | User priority | Access category (AC) |
|---|---|---|
| Low | 1 | AC_BK |
| | 2 | AC_BK |
| | 0 | AC_BE |
| | 3 | AC_BE |
| | 4 | AC_VI |
| | 5 | AC_VI |
| | 6 | AC_VO |
| High | 7 | AC_VO |

In the present specification, the user priority may be understood as a traffic identifier (hereinafter referred to as 'TID'), which indicates the characteristics of the traffic data.

Referring to Table 5, traffic data having a user priority (i.e., TID) that is set to '1' or '2' may be buffered to a transmission queue 2050 of the AC_BK type. And, traffic data having a user priority (i.e., TID) that is set to '0' or '3' may be buffered to a transmission queue 2040 of the AC_BE type.

Traffic data having a user priority (i.e., TID) that is set to '4' or '5' may be buffered to a transmission queue 2030 of the AC_VI type, and traffic data having a user priority (i.e., TID) that is set to '6' or '7' may be buffered to a transmission queue 2020 of the AC_VO type.

Instead of the parameters for the backoff operation/procedure that is based on the legacy distributed coordination function (DCF), i.e., DCF interframe space (DIFS), CWmin, and CWmax, an EDCA parameter set for the backoff operation/procedure of the STA performing EDCA, i.e., arbitration interframe space (AIFS)[AC], CWmin[AC], CWmax[AC], and TXOP limit[AC], may be used.

Differences in transmission priorities between ACs may be implemented based on the differential EDCA parameter set. Examples of default values of the EDCA parameter set (i.e., AIFS[AC], CWmin[AC], CWmax[AC], TXOP limit[AC]) corresponding to each AC are shown below in Table 6. Specific values of Table 6 may be set to be different from the example shown below.

TABLE 6

| AC | CWmin[AC] | CWmax[AC] | AIFS[AC] | TXOP limit[AC] |
|---|---|---|---|---|
| AC_BK | 31 | 1023 | 7 | 0 |
| AC_BE | 31 | 1023 | 3 | 0 |
| AC_VI | 15 | 31 | 2 | 3.008 ms |
| AC_VO | 7 | 15 | 2 | 1.504 ms |

The EDCA parameter set for each AC may be set to a default value or included in a beacon frame and then transferred from an access point (AP) to each STA. As AIFS[AC] and CWmin[AC] values decrease, the given priority becomes higher, and accordingly, the channel access delay becomes shorter. Thus, more bands may be used in a given traffic environment.

The EDCA parameter set may include information on channel access parameters for each AC (e.g., AIFS[AC], CWmin[AC], CWmax[AC]).

The backoff operation/procedure for EDCA may be performed based on EDCA parameter sets that are separately configured for 4 ACs included in each STA. Appropriate settings of EDCA parameter values that define different channel access parameters per AC may optimize network performance and, at the same time, increase transmission effect resulting from traffic priority.

Therefore, the AP of the WLAN system should perform a function of carrying out overall management and control on the EDCA parameters in order to ensure fair medium access to all STAs joining the network.

Referring to FIG. 20, one STA (or AP) 2000 may include a virtual mapper 2010, a plurality of transmission queues 2020~2050, and a virtual collision handler 2060. The virtual mapper 2010 of FIG. 20 may carry out a function of mapping a MSDU that is received from a logical link control (LLC) layer to a transmission queue corresponding to each AC according to Table 1, which is illustrated above.

The plurality of transmission queues 2020~2050 of FIG. 20 may carry out a function of individual EDCA contention entities for wireless medium access within one STA (or AP).

Figure 21:
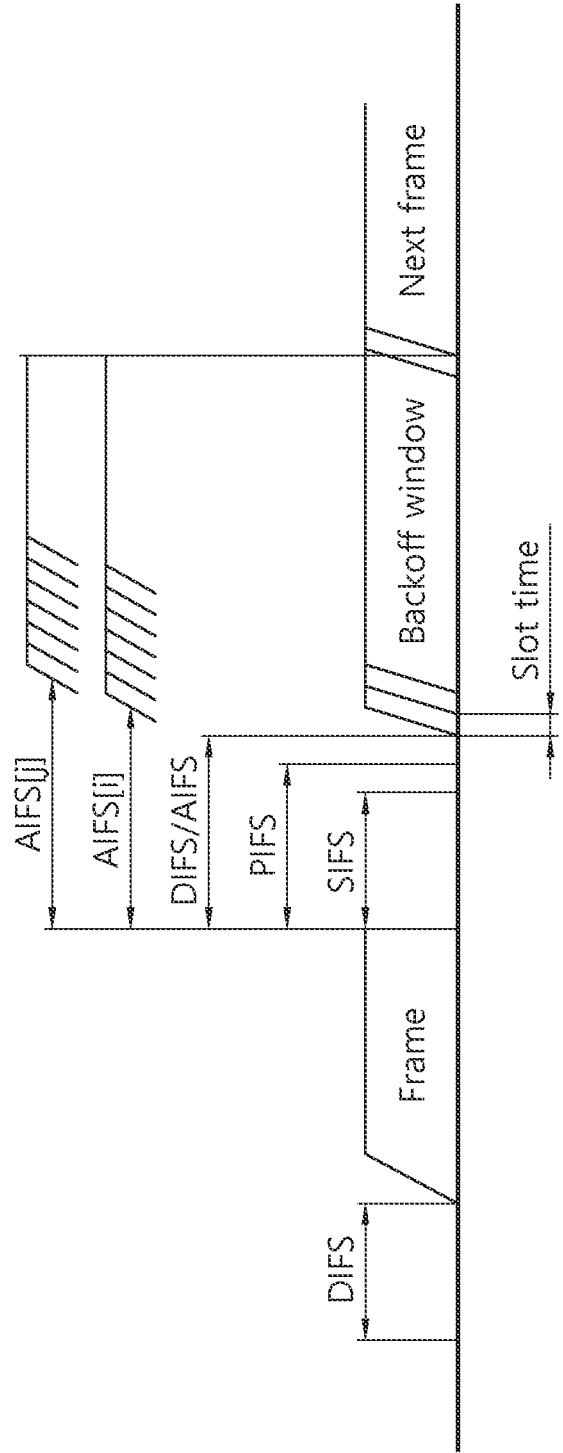
FIG. 21 is a conceptual diagram showing a backoff operation/procedure of an EDCA.

FIG. 21 is a conceptual diagram showing a backoff operation/procedure of an EDCA.

Multiple STAs may share a wireless medium based on a DCF, which is a contention-based function. The DCF may use CSMA/CA for controlling a collision between the STAs.

In a channel access method using DCF, if the medium is not used during a DCF interframe space (DIFS) (i.e., when a channel is idle), the STA may transmit an MPDU that is internally determined. A DIFS is a type of time length that is used in the IEEE standard. And, the IEEE standard uses various time durations, such as a slot time, a Short Interframe Space (SIFS), a Point Coordination Function (PCF) Inter-frame Space (PIFS), a DIFS, an arbitration interframe space (AIFS), and so on. The detailed values of each time duration may be diversely set. However, in general, the lengths of the time durations are set so that the lengths become longer by an order of the slot time, SIFS, PIFS, DIFS, and AIFS.

If it is determined that a wireless medium is used by another STA by a carrier sensing mechanism of the STA (i.e., if the channel is busy), the STA may determine a size of a contention window (hereinafter referred to as 'CW') and may perform a backoff operation/procedure.

In order to perform the backoff procedure according to EDCA, each STA may set a backoff value, which is arbitrarily selected within the contention window (CW), in the backoff counter.

Each STA may perform a backoff operation/procedure for channel access by counting-down the backoff window in slot time units. Among the plurality of STAs, an STA that has selected a relatively shortest backoff window may obtain a transmission opportunity (hereinafter referred to as 'TXOP'), which is a right to occupy a wireless medium.

During a time period for the TXOP, the remaining STAs may suspend the countdown operation. The remaining STAs may wait until the time duration for the TXOP ends. After the time duration for the TXOP is ended, the remaining STAs may resume the suspended countdown operation in order to occupy the wireless medium.

According to the transmission method based on the DCF, it is possible to prevent collision between STAs, which may occur when multiple STAs transmit frames at the same time. However, the channel access method using the DCF does not have the concept of transmission priority (i.e., user priority). That is, when DCF is used, the quality of service (QoS) of traffic that is to be transmitted by the STA cannot be guaranteed (or ensured).

In order to resolve this problem, 802.11e has defined a new coordination function, which is a hybrid coordination function (hereinafter referred to as 'HCF'). The newly defined HCF has more enhanced performance than that of the existing channel access performance using the DCF. In order to enhance the QoS, the HCF may use two different types of channel access methods together, which are HCF-controlled channel access (HCCA) of a polling method and contention-based enhanced distributed channel access (EDCA).

Referring to FIG. 21, it is assumed that the STA performs EDCA for transmitting traffic data that is buffered in the STA. Referring to Table 5, the user priority that is set for each traffic data may be differentiated to 8 levels.

Each STA may include four types (AC_BK, AC_BE, AC_VI, and AC_VO) of output queues that are mapped to the 8-level user priorities, as shown in Table 5.

IFS, such as SIFS, PIFS, DIFS, and so on, will be additionally described as follows.

The interframe spacing (IFS) may be determined according to attributes specified by the physical layer of the STA regardless of the bit rate of the STA. Among the Inter-frame Spaces (IFSs), IFSs other than the AIFS may use a fixed value that is predetermined per physical layer.

The AIFS may be set to a value corresponding to the four types of transmission queues that are mapped to the user priorities shown in Table 5.

The SIFS has the shortest time gap among the IFSs that are mentioned above. Accordingly, the SIFS may be used when an STA occupying a wireless medium needs to maintain its occupation of the medium without being interrupted by another STA during a time duration where a frame exchange sequence is being performed.

That is, by using the shortest gap between transmissions within a frame exchange sequence, the STA may be assigned with a priority in order to complete an ongoing frame exchange sequence. Also, the STA accessing the wireless medium by using the SIFS may immediately start transmission from an SIFS boundary without determining whether or not the medium is busy.

The duration of an SIFS for a specific physical (PHY) layer may be defined based on an aSIFSTime parameter. For example, the SIFS value in physical (PHY) layers of the IEEE 802.11a, IEEE 802.11g, IEEE 802.11n, and IEEE 802.11ac standards is equal to 16 μs.

The PIFS may be used in order to provide an STA with the next highest priority following the SIFS. That is, the PIFS may be used to obtain priority for accessing the wireless medium.

The DIFS may be used by an STA transmitting a data frame (MPDU) and a management frame (MAC protocol data unit (MPDU)) based on the DCF. After a received frame and backoff time are expired, if it is determined that the medium is idle by the carrier sensing (CS) mechanism, the STA may transmit a frame.

When an STA is allowed to start a TXOP, and, if the STA has at least one MSDU that is pending for the transmission for an AC of the allowed TXOP, the STA should accurately perform one of the following operations.

1) If a secondary 20 MHz channel, a secondary 40 MHz channel, and a secondary 80 MHz channel are idle during a PIFS immediately before the start of a TXOP, the STA may transmit a 160 MHz or 80+80 MHz mask PPDU.

2) If a secondary 20 MHz channel and a secondary 40 MHz channel are both idle during a PIFS immediately before the start of a TXOP, the STA may transmit an 80 MHz mask PPDU from a primary 80 MHz channel.

3) If a secondary 20 MHz channel is idle during a time duration (i) a DIFS, when a PPDU is transmitted at a 2.4 GHz band, or ii) a PIFS, in other cases) immediately before the start of a TXOP, the STA may transmit a 40 MHz mask PPDU from a primary 40 MHz channel.

4) The STA may transmit a 20 MHz mask PPDU from a primary 20 MHz channel.

4. Embodiment(s) Applicable to the Present Specification

In order to increase a peak throughput, the 802.11 system is considering the transmission of increased streams by using a band that is wider than the legacy 11ax, or by using a larger number of antennas. Moreover, the present specification is also considering a method of using various bands by performing aggregation.

The present specification proposes a channel access method for transmitting a PPDU by using a wideband and a signaling method for the same.

In the legacy 11ax, a method for transmitting a PPDU by using a 20/40/80/80+80/160 MHz bandwidth is designed. And, also, in 11be, the STA may transmit a PPDU by accessing a 20/40/80/80+80/160 MHz channel. That is, by determining an idle/busy state of a secondary channel during a DIFS or PIFS immediately before the start of a TXOP (or immediately before the start of a PPDU transmission), a transmission bandwidth may be determined. The present specification particularly proposes a method for transmitting a PPDU by using a contiguous/non-contiguous 160 MHz/240 MHz/320 MHz bandwidth and a PHY signaling method for the corresponding bandwidth. The present specification does not consider a preamble puncturing situation.

4.1 Channel Access

Firstly, in a 320 MHz/160+160 MHz transmission, primary 160 MHz and secondary 160 MHz need to be defined. Primary 160 MHz is defined as an added sum 160 MHz of primary 80 MHz and secondary 80 MHz. And, in the 320 MHz/160+160 MHz transmission, 160 MHz other than the primary 160 MHz is defined as secondary 160 MHz. Additionally, an 80 MHz corresponding to the primary 80 MHz in the secondary 160 MHz is defined as tertiary 80 MHz, and an 80 MHz corresponding to the secondary 80 MHz in the secondary 160 MHz is defined as quatenary 80 MHz, and other terms may also be used. That is, in the primary 160 MHz, if the primary 80 MHz corresponds to a low frequency 80 MHz, tertiary 80 MHz indicates a low frequency 80 MHz in the secondary 160 MHz, and quatenary 80 MHz indicates a high frequency 80 MHz in the secondary 160 MHz. Conversely, in the primary 160 MHz, if the primary 80 MHz corresponds to a high frequency 80 MHz, tertiary 80 MHz indicates a high frequency 80 MHz in the secondary 160 MHz, and quatenary 80 MHz indicates a low frequency 80 MHz in the secondary 160 MHz. Alternatively, regardless of the positions of primary 80 MHz/secondary 80 MHz, in the secondary 160 MHz, the low frequency 80 MHz may be defined as tertiary 80 MHz, and the high frequency 80 MHz may be defined as quatenary 80 MHz, or vice versa. The + sign may mean that the bands are non-contiguous bands.

4.1.A 320 MHz/160+160 MHz Mask PPDU Transmission

1) If secondary 20 MHz, secondary 40 MHz, secondary 80 MHz, secondary 160 MHz are idle during a PIFS (this is merely exemplary and may be another IFS) immediately before the start of a TXOP (or immediately before the start of a PPDU transmission), the STA may transmit a 320 MHz/160+160 MHz mask PPDU.

2) Alternatively, if secondary 20 MHz, secondary 40 MHz, secondary 80 MHz, tertiary 80 MHz, quatenary 80 MHz are idle during a PIFS (this is merely exemplary and may be another IFS) immediately before the start of a TXOP (or immediately before the start of a PPDU transmission), the STA may transmit a 320 MHz/160+160 MHz mask PPDU.

Only one of the two methods presented above may be forced. That is, only one of a first method (method number 1)) or a second method (method number 2)) may be used. In order to avoid additional definition of tertiary/quaternary 80 MHz and to avoid complexity in determining a channel idle/busy state, the first method may be appropriate.

4.1.B 240 MHz/160+80 MHz/80+160 MHz Mask Transmission

1) If secondary 20 MHz, secondary 40 MHz, secondary 80 MHz, tertiary 80 MHz are idle during a PIFS (this is merely exemplary and may be another IFS) immediately before the start of a TXOP (or immediately before the start of a PPDU transmission), the STA may transmit a 240 MHz/160+80 MHz/80+160 MHz mask PPDU. (That is, when considering the whole band, the secondary 160 MHz may be busy. In the secondary 160 MHz, the quaternary 80 MHz is busy.)

2) Alternatively, if secondary 20 MHz, secondary 40 MHz, secondary 80 MHz, quaternary 80 MHz are idle during a PIFS (this is merely exemplary and may be another IFS) immediately before the start of a TXOP (or immediately before the start of a PPDU transmission), the STA may transmit a 240 MHz/160+80 MHz/80+160 MHz mask PPDU. (That is, when considering the whole band, the secondary 160 MHz may be busy. In the secondary 160 MHz, the tertiary 80 MHz is busy.)

3) Alternatively, if secondary 20 MHz, secondary 40 MHz, secondary 160 MHz are idle during a PIFS (this is merely exemplary and may be another IFS) immediately before the start of a TXOP (or immediately before the start of a PPDU transmission), the STA may transmit a 240 MHz/160+80 MHz/80+160 MHz mask PPDU. (That is, the secondary 80 MHz is busy.)

4) Alternatively, if secondary 20 MHz, secondary 40 MHz, tertiary 80 MHz, quaternary 80 MHz are idle during a PIFS (this is merely exemplary and may be another IFS) immediately before the start of a TXOP (or immediately before the start of a PPDU transmission), the STA may transmit a 240 MHz/160+80 MHz/80+160 MHz mask PPDU. (That is, the secondary 80 MHz is busy.)

Only one of the methods presented above may be forced. That is, only one of a first method (method number 1)) or a second method (method number 2)) or a third method (method number 3)) or a fourth method (method number 4)) may be used. In order to avoid additional definition of tertiary/quaternary 80 MHz and to avoid complexity in determining a channel idle/busy state, the third method may be appropriate. Alternatively, only the first method verifying whether or not the tertiary 80 MHz is idle may be used, wherein the tertiary 80 MHz corresponds to the primary 80 MHz in the secondary 160 MHz.

Alternatively, among the above-described methods, the first or second method may be used, the first or second method being a 240 MHz/160+80 MHz/80+160 MHz mask PPDU transmitting method, wherein the primary 160 MHz is idle and one 80 MHz channel of the secondary 160 MHz is busy. Although the first or second method may have poorer efficiency, since the idle/busy state of each 80 MHz channel of the secondary 160 MHz is determined only in a situation where the primary 160 MHz is busy, there may be some gain in the implementation.

As an IFFT and mask, the IFFT and mask that are used in the 320/160+160 MHz transmission may be used as they are.

However, in 802.11be, a PPDU having a 240 MHz bandwidth may not be defined, or a 240 bandwidth may not be separately indicated. The 240 MHz bandwidth may be defined by performing preamble puncturing on a 320 MHz band, or the bandwidth may be forcibly determined by being indicated to a MAC.

4.1.C 160 MHz/80+80 MHz Transmission

1) If secondary 20 MHz, secondary 40 MHz, secondary 80 MHz are idle during a PIFS (this is merely exemplary and may be another IFS) immediately before the start of a TXOP (or immediately before the start of a PPDU transmission), the STA may transmit a 160 MHz/80+80 MHz mask PPDU. (That is, the secondary 160 MHz may be busy.)

2) Alternatively, if secondary 20 MHz, secondary 40 MHz, secondary 80 MHz are idle during a PIFS (this is merely exemplary and may be another IFS) immediately before the start of a TXOP (or immediately before the start of a PPDU transmission), the STA may transmit a 160

MHz/80+80 MHz mask PPDU. (That is, the tertiary 80 MHz and quaternary 80 MHz are busy.)

3) Alternatively, if secondary 20 MHz, secondary 40 MHz, tertiary 80 MHz are idle during a PIFS (this is merely exemplary and may be another IFS) immediately before the start of a TXOP (or immediately before the start of a PPDU transmission), the STA may transmit a 160 MHz/80+80 MHz mask PPDU. (That is, the secondary 80 MHz and quaternary 80 MHz are busy.)

4) Alternatively, if secondary 20 MHz, secondary 40 MHz, quaternary 80 MHz are idle during a PIFS (this is merely exemplary and may be another IFS) immediately before the start of a TXOP (or immediately before the start of a PPDU transmission), the STA may transmit a 160 MHz/80+80 MHz mask PPDU. (That is, the secondary 80 MHz and tertiary 80 MHz are busy.)

Only one of the methods presented above may be forced. That is, only one of a first method (method number 1)) or a second method (method number 2)) or a third method (method number 3)) or a fourth method (method number 4)) may be used. In order to avoid additional definition of tertiary/quaternary 80 MHz and to avoid complexity in determining a channel idle/busy state, the first method may be appropriate.

Only two of the methods presented above may be forced. That is, the first (or second) and third methods or the first (or second) and fourth methods may be used.

As an IFFT and mask, the IFFT and mask that are used in the 160/80+80 MHz transmission of the legacy 11ax may be used as they are.

4.2 Signaling Method

4.2.A EHT SU PPDU/EHT ER SU PPDU Transmission

When performing EHT SU PPDU/EHT ER SU PPDU transmission, the PPDU is transmitted by using the whole bandwidth without considering any application, such as preamble puncturing, and so on, and, as shown below, EHT-SIG-A may signal a bandwidth by using 3 bits. This is only an example, and the order of the bits and description may be changed. Additionally, information on a bandwidth (BW field) may be included in a U-SIG of the PPDU, and information on preamble puncturing may also be included in EHT-SIG. Thus, the receiving STA may decode the U-SIG so as to know the whole bandwidth, and the receiving STA may decode the EHT-SIG so as to know the band or RU through which actual data is being transmitted in the whole bandwidth. Firstly, the following considers a situation where the 160/80+80 MHz is fixed to only one type.

TABLE 7

| Bits | Description |
|---|---|
| 000 | 20 MHz |
| 001 | 40 MHz |
| 010 | 80 MHz |
| 011 | 160 MHz 80 + 80 MHz |
| 100 | 240 MHz/160 + 80 MHz corresponding to a combination of primary 80 MHz and secondary 160 MHz (or tertiary 80 MHz and quaternary 80 MHz) |
| 101 | 240 MHz/160 + 80 MHz corresponding to a combination of primary 160 MHz (or primary 80 MHz and secondary 80 MHz) and tertiary 80 MHz |

TABLE 7-continued

| Bits | Description |
|---|---|
| 110 | 240 MHz/160 + 80 MHz corresponding to a combination of primary 160 MHz (or primary 80 MHz and secondary 80 MHz) and quaternary 80 MHz |
| 111 | 320 MHz/160 + 160 MHz |

If the 240 MHz/160+80 MHz transmission is forced to only one combination (e.g., when the transmission bandwidth is indicated as 240 MHz to the MAC), as shown below, 100 may indicate 240 MHz/160+80 MHz and 101 may indicate 320 MHz/160+160 MHz, and 110 and 111 may be reserved. And, the order of the bits and description may be changed.

TABLE 8

| Bits | Description |
|---|---|
| 000 | 20 MHz |
| 001 | 40 MHz |
| 010 | 80 MHz |
| 011 | 160 MHz/80 + 80 MHz |
| 100 | 240 MHz/160 + 80 MHz |
| 101 | 320 MHz/160 + 160 MHz |
| 110~111 | Reserved |

The 240 MHz/160+80 MHz transmission may consider only two combinations listed below. And, the order of the bits and description may be changed.

TABLE 9

| Bits | Description |
|---|---|
| 000 | 20 MHz |
| 001 | 40 MHz |
| 010 | 80 MHz |
| 011 | 160 MHz/80 + 80 MHz |
| 100 | 240 MHz/160 + 80 MHz corresponding to a combination of primary 160 MHz (or primary 80 MHz and secondary 80 MHz) and tertiary 80 MHz |
| 101 | 240 MHz/160 + 80 MHz corresponding to a combination of primary 160 MHz (or primary 80 MHz and secondary 80 MHz) and quaternary 80 MHz |
| 110 | 320 MHz/160 + 160 MHz |
| 111 | Reserved |

The following are various examples in a situation where 160/80+80 MHz is fixed to two combinations. And, the order of the bits and description may be changed. In this case, there is a case where 4 bits are needed and not 3 bits.

TABLE 10

| Bits | Description |
|---|---|
| 0000 | 20 MHz |
| 0001 | 40 MHz |
| 0010 | 80 MHz |
| 0011 | 160 MHz/80 + 80 MHz corresponding to a combination of primary 80 MHz and secondary 80 MHz |
| 0100 | 160 MHz/80 + 80 MHz corresponding to a combination of primary 80 MHz and tertiary 80 MHz (or quaternary 80 MHz) |

TABLE 10-continued

| Bits | Description |
|---|---|
| 0101 | 240 MHz/160 + 80 MHz corresponding to a combination of primary 80 MHz and secondary 160 MHz (or tertiary 80 MHz and quaternary 80 MHz) |
| 0110 | 240 MHz/160 + 80 MHz corresponding to a combination of primary 160 MHz (or primary 80 MHz and secondary 80 MHz) and tertiary 80 MHz |
| 0111 | 240 MHz/160 + 80 MHz corresponding to a combination of primary 160 MHz (or primary 80 MHz and secondary 80 MHz) and quaternary 80 MHz |
| 1000 | 320 MHz/160 + 160 MHz |
| 1001~1111 | Reserved |

TABLE 11

| Bits | Description |
|---|---|
| 000 | 20 MHz |
| 001 | 40 MHz |
| 010 | 80 MHz |
| 011 | 160 MHz/80 + 80 MHz corresponding to a combination of primary 80 MHz and secondary 80 MHz |
| 100 | 160 MHz/80 + 80 MHz corresponding to a combination of primary 80 MHz and tertiary 80 MHz (or quaternary 80 MHz) |
| 101 | 240 MHz/160 + 80 MHz |
| 110 | 320 MHz/160 + 160 MHz |
| 111 | Reserved |

TABLE 12

| Bits | Description |
|---|---|
| 000 | 20 MHz |
| 001 | 40 MHz |
| 010 | 80 MHz |
| 011 | 160 MHz/80 + 80 MHz corresponding to a combination of primary 80 MHz and secondary 80 MHz |
| 100 | 160 MHz/80 + 80 MHz corresponding to a combination of primary 80 MHz and tertiary 80 MHz (or quaternary 80 MHz) |
| 101 | 240 MHz/160 + 80 MHz corresponding to a combination of primary 160 MHz (or primary 80 MHz and secondary 80 MHz) and tertiary 80 MHz |
| 110 | 240 MHz/160 + 80 MHz corresponding to a combination of primary 160 MHz (or primary 80 MHz and secondary 80 MHz) and quaternary 80 MHz |
| 111 | 320 MHz/160 + 160 MHz |

The following are various examples in a situation where 160/80+80 MHz is fixed to three combinations. And, the order of the bits and description may be changed. In this case, there is a case where 4 bits are needed and not 3 bits.

TABLE 13

| Bits | Description |
|---|---|
| 0000 | 20 MHz |
| 0001 | 40 MHz |
| 0010 | 80 MHz |
| 0011 | 160 MHz/80 + 80 MHz corresponding to a combination of primary 80 MHz and secondary 80 MHz |
| 0100 | 160 MHz/80 + 80 MHz corresponding to a combination of primary 80 MHz and tertiary 80 MHz |
| 0101 | 160 MHz/80 + 80 MHz corresponding to a combination of primary 80 MHz and quaternary 80 MHz |
| 0110 | 240 MHz/160 + 80 MHz corresponding to a combination of primary 80 MHz and secondary 160 MHz (or tertiary 80 MHz and quaternary 80 MHz) |
| 0111 | 240 MHz/160 + 80 MHz corresponding to a combination of primary 160 MHz (or primary 80 MHz and secondary 80 MHz) and tertiary 80 MHz |
| 1000 | 240 MHz/160 + 80 MHz corresponding to a combination of primary 160 MHz (or primary 80 MHz and secondary 80 MHz) and quaternary 80 MHz |
| 1001 | 320 MHz/160 + 160 MHz |
| 1010~1111 | Reserved |

TABLE 14

| Bits | Description |
|---|---|
| 000 | 20 MHz |
| 001 | 40 MHz |
| 010 | 80 MHz |
| 011 | 160 MHz/80 + 80 MHz corresponding to a combination of primary 80 MHz and secondary 80 MHz |
| 100 | 160 MHz/80 + 80 MHz corresponding to a combination of primary 80 MHz and tertiary 80 MHz |
| 101 | 160 MHz/80 + 80 MHz corresponding to a combination of primary 80 MHz and quaternary 80 MHz |
| 110 | 240 MHz/160 + 80 MHz |
| 111 | 320 MHz/160 + 160 MHz |

TABLE 15

| Bits | Description |
|---|---|
| 0000 | 20 MHz |
| 0001 | 40 MHz |
| 0010 | 80 MHz |
| 0011 | 160 MHz/80 + 80 MHz corresponding to a combination of primary 80 MHz and secondary 80 MHz |
| 0100 | 160 MHz/80 + 80 MHz corresponding to a combination of primary 80 MHz and tertiary 80 MHz |
| 0101 | 160 MHz/80 + 80 MHz corresponding to a combination of primary 80 MHz and quaternary 80 MHz |
| 0110 | 240 MHz/160 + 80 MHz corresponding to a combination of primary 160 MHz (or primary 80 MHz and secondary 80 MHz) and tertiary 80 MHz |
| 0111 | 240 MHz/160 + 80 MHz corresponding to a combination of primary 160 MHz (or primary 80 MHz and secondary 80 MHz) and quaternary 80 MHz |
| 1000 | 320 MHz/160 + 160 MHz |
| 1001~1111 | Reserved |

4.2.B EHT MU (or OFDMA) PPDU Transmission

In an EHT MU (or OFDMA) PPDU, a PPDU may be transmitted by performing preamble puncturing and additionally allocating multiple RUs, to each STA (SU transmission through multiple RUs may also be possible). And, therefore, 3 bits or more may be used for bandwidth signaling that includes preamble puncturing. The following is a method for signaling a bandwidth by using 4 bits in an EHT-SIG-A of the EHT MU PPDU. The order of the bits and description may be changed, and the number of bits may also be changed. Additionally, information on a bandwidth (BW field) may be included in a U-SIG of the PPDU, and information on preamble puncturing may also be included in EHT-SIG. Thus, the receiving STA may decode the U-SIG so as to know the whole bandwidth, and the receiving STA may decode the EHT-SIG so as to know the band or RU through which actual data is being transmitted in the whole bandwidth. Firstly, the following considers a situation where the 160/80+80 MHz is fixed to only one type.

TABLE 16

| Bits | Description |
| --- | --- |
| 0000 | 20 MHz |
| 0001 | 40 MHz |
| 0010 | 80 MHz |
| 0011 | 160 MHz/80 + 80 MHz |
| 0100 | 240 MHz/160 + 80 MHz corresponding to a combination of primary 80 MHz and secondary 160 MHz (or tertiary 80 MHz and quaternary 80 MHz) |
| 0101 | 240 MHz/160 + 80 MHz corresponding to a combination of primary 160 MHz (or primary 80 MHz and secondary 80 MHz) and tertiary 80 MHz |
| 0110 | 240 MHz/160 + 80 MHz corresponding to a combination of primary 160 MHz (or primary 80 MHz and secondary 80 MHz) and quaternary 80 MHz |
| 0111 | 320 MHz/160 + 160 MHz |
| 1000~1111 | Processed with preamble puncturing indication and Reserved |

If the 240 MHz/160+80 MHz transmission is forced to only one combination (e.g., when the transmission bandwidth is indicated as 240 MHz to the MAC), 0100 may indicate 240 MHz/160+80 MHz, 0101 may indicate 320 MHz/160+160 MHz, and 0110~1111 may be indicated with preamble puncturing and reserved. And, the order of the bits and description may be changed, and the number of bits may also be changed.

TABLE 17

| Bits | Description |
| --- | --- |
| 0000 | 20 MHz |
| 0001 | 40 MHz |
| 0010 | 80 MHz |
| 0011 | 160 MHz/80 + 80 MHz |
| 0100 | 240 MHz/160 + 80 MHz |
| 0101 | 320 MHz/160 + 160 MHz |
| 0110~1111 | Processed with preamble puncturing indication and Reserved |

The 240 MHz/160+80 MHz transmission may consider only two combinations listed below. And, the order of the bits and description may be changed.

TABLE 18

| Bits | Description |
| --- | --- |
| 0000 | 20 MHz |
| 0001 | 40 MHz |
| 0010 | 80 MHz |

TABLE 18-continued

| Bits | Description |
| --- | --- |
| 0011 | 160 MHz/80 + 80 MHz |
| 0100 | 240 MHz/160 + 80 MHz corresponding to a combination of primary 160 MHz (or primary 80 MHz and secondary 80 MHz) and tertiary 80 MHz |
| 0101 | 240 MHz/160 + 80 MHz corresponding to a combination of primary 160 MHz (or primary 80 MHz and secondary 80 MHz) and quaternary 80 MHz |
| 0110 | 320 MHz/160 + 160 MHz |
| 0111~1111 | Processed with preamble puncturing indication and Reserved |

Since the support of 240 MHz may also be included in 320 MHz through preamble puncturing, a method in which a bandwidth indicator for the 240/160+80 MHz transmission is not separately defined may be considered. And, the order of the bits and description may be changed.

TABLE 19

| Bits | Description |
| --- | --- |
| 0000 | 20 MHz |
| 0001 | 40 MHz |
| 0010 | 80 MHz |
| 0011 | 160 MHz/80 + 80 MHz |
| 0100 | 320 MHz/160 + 160 MHz |
| 0101~1111 | Processed with preamble puncturing indication and Reserved |

The following are various examples in a situation where 160/80+80 MHz is fixed to two combinations. And, the order of the bits and description may be changed.

TABLE 20

| Bits | Description |
| --- | --- |
| 0000 | 20 MHz |
| 0001 | 40 MHz |
| 0010 | 80 MHz |
| 0011 | 160 MHz/80 + 80 MHz corresponding to a combination of primary 80 MHz and secondary 80 MHz |
| 0100 | 160 MHz/80 + 80 MHz corresponding to a combination of primary 80 MHz and tertiary 80 MHz (or quaternary 80 MHz) |
| 0101 | 240 MHz/160 + 80 MHz corresponding to a combination of primary 80 MHz and secondary 160 MHz (or tertiary 80 MHz and quaternary 80 MHz) |
| 0110 | 240 MHz/160 + 80 MHz corresponding to a combination of primary 160 MHz (or primary 80 MHz and secondary 80 MHz) and tertiary 80 MHz |
| 0111 | 240 MHz/160 + 80 MHz corresponding to a combination of primary 160 MHz (or primary 80 MHz and secondary 80 MHz) and quaternary 80 MHz |
| 1000 | 320 MHz/160 + 160 MHz |
| 1001~1111 | Processed with preamble puncturing indication and Reserved |

TABLE 21

| Bits | Description |
| --- | --- |
| 0000 | 20 MHz |
| 0001 | 40 MHz |
| 0010 | 80 MHz |

TABLE 21-continued

| Bits | Description |
|---|---|
| 0011 | 160 MHz/80 + 80 MHz corresponding to a combination of primary 80 MHz and secondary 80 MHz |
| 0100 | 160 MHz/80 + 80 MHz corresponding to a combination of primary 80 MHz and tertiary 80 MHz (or quaternary 80 MHz) |
| 0101 | 240 MHz/160 + 80 MHz |
| 0110 | 320 MHz/160 + 160 MHz |
| 0111~1111 | Processed with preamble puncturing indication and Reserved |

TABLE 22

| Bits | Description |
|---|---|
| 0000 | 20 MHz |
| 0001 | 40 MHz |
| 0010 | 80 MHz |
| 0011 | 160 MHz/80 + 80 MHz corresponding to a combination of primary 80 MHz and secondary 80 MHz |
| 0100 | 160 MHz/80 + 80 MHz corresponding to a combination of primary 80 MHz and tertiary 80 MHz (or quaternary 80 MHz) |
| 0101 | 240 MHz/160 + 80 MHz corresponding to a combination of primary 160 MHz (or primary 80 MHz and secondary 80 MHz) and tertiary 80 MHz |
| 0110 | 240 MHz/160 + 80 MHz corresponding to a combination of primary 160 MHz (or primary 80 MHz and secondary 80 MHz) and quaternary 80 MHz |
| 0111 | 320 MHz/160 + 160 MHz |
| 1000~1111 | Processed with preamble puncturing indication and Reserved |

The following are various examples in a situation where 160/80+80 MHz is fixed to three combinations. And, the order of the bits and description may be changed.

TABLE 23

| Bits | Description |
|---|---|
| 0000 | 20 MHz |
| 0001 | 40 MHz |
| 0010 | 80 MHz |
| 0011 | 160 MHz/80 + 80 MHz corresponding to a combination of primary 80 MHz and secondary 80 MHz |
| 0100 | 160 MHz/80 + 80 MHz corresponding to a combination of primary 80 MHz and tertiary 80 MHz |
| 0101 | 160 MHz/80 + 80 MHz corresponding to a combination of primary 80 MHz and quaternary 80 MHz |
| 0110 | 240 MHz/160 + 80 MHz corresponding to a combination of primary 80 MHz and secondary 160 MHz (or tertiary 80 MHz and quaternary 80 MHz) |
| 0111 | 240 MHz/160 + 80 MHz corresponding to a combination of primary 160 MHz (or primary 80 MHz and secondary 80 MHz) and tertiary 80 MHz |
| 1000 | 240 MHz/160 + 80 MHz corresponding to a combination of primary 160 MHz (or primary 80 MHz and secondary 80 MHz) and quaternary 80 MHz |
| 1001 | 320 MHz/160 + 160 MHz |
| 1010~1111 | Processed with preamble puncturing indication and Reserved |

TABLE 24

| Bits | Description |
|---|---|
| 0000 | 20 MHz |
| 0001 | 40 MHz |
| 0010 | 80 MHz |
| 0011 | 160 MHz/80 + 80 MHz corresponding to a combination of primary 80 MHz and secondary 80 MHz |
| 0100 | 160 MHz/80 + 80 MHz corresponding to a combination of primary 80 MHz and tertiary 80 MHz |
| 0101 | 160 MHz/80 + 80 MHz corresponding to a combination of primary 80 MHz and quaternary 80 MHz |
| 0110 | 240 MHz/160 + 80 MHz |
| 0111 | 320 MHz/160 + 160 MHz |
| 1000~1111 | Processed with preamble puncturing indication and Reserved |

TABLE 25

| Bits | Description |
|---|---|
| 0000 | 20 MHz |
| 0001 | 40 MHz |
| 0010 | 80 MHz |
| 0011 | 160 MHz/80 + 80 MHz corresponding to a combination of primary 80 MHz and secondary 80 MHz |
| 0100 | 160 MHz/80 + 80 MHz corresponding to a combination of primary 80 MHz and tertiary 80 MHz |
| 0101 | 160 MHz/80 + 80 MHz corresponding to a combination of primary 80 MHz and quaternary 80 MHz |
| 0110 | 240 MHz/160 + 80 MHz corresponding to a combination of primary 160 MHz (or primary 80 MHz and secondary 80 MHz) and tertiary 80 MHz |
| 0111 | 240 MHz/160 + 80 MHz corresponding to a combination of primary 160 MHz (or primary 80 MHz and secondary 80 MHz) and quaternary 80 MHz |
| 1000 | 320 MHz/160 + 160 MHz |
| 1001~1111 | Processed with preamble puncturing indication and Reserved |

Figure 22:
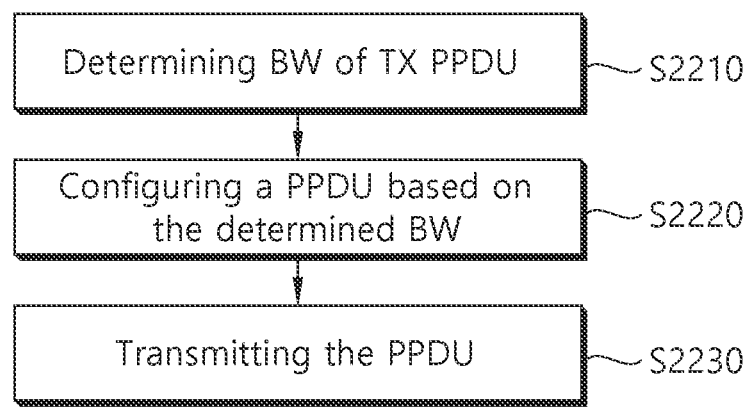
FIG. 22 is a procedure flowchart showing operations of a transmitting device according to the present embodiment.

FIG. 22 is a procedure flowchart showing operations of a transmitting device according to the present embodiment.

An example of FIG. 22 may be performed by a transmitting STA or transmitting device (AP and/or non-AP STA). For example, the example of FIG. 22 may be performed by an AP that transmits EHT SU PPDU, EHT ER SU PPDU, EHT MU PPDU. The example of FIG. 22 may be performed by a non-AP that transmits EHT SU PPDU, EHT ER SU PPDU, EHT MU PPDU. Part of each step (or detailed sub-step that will be described later on) in the example of FIG. 18 may be skipped (or omitted) or varied.

In step S2210, the transmitting device (i.e., transmitting STA) may perform Channel Access operations of the above-described Section 4.1 according to the present disclosure. For example, since the transmitting STA is capable of transmitting a 320 MHz/160+160 MHz mask PPDU if secondary 20 MHz, secondary 40 MHz, secondary 80 MHz, secondary 160 MHz are idle during a PIFS (this is merely exemplary and may be another IFS) immediately before the start of a TXOP (or immediately before the start of a PPDU transmission), the BW may be determined as 320 MHz or 160+160 MHz through step S2210.

In step S2220, the transmitting STA may configure a PPDU. For example, the PPDU may be EHT SU PPDU, EHT ER SU PPDU, EHT MU PPDU. As shown in FIG. 18, the PPDU may include a U-SIG and an EHT-SIG (EHT-SIG-A).

The transmitting STA may perform step S2220 based on the BW that is determined in step S2210.

That is, as described above, n-bit (e.g., 3-bit) information may be included in the EHT-SIG-A (or U-SIG), and the corresponding bits may be determined in accordance with the example of section 4.2. For example, an EHT-SIG-A (or U-SIG) field may be configured based on the table that is presented above.

In step S2230, the transmitting device (or STA) may transmit the PPDU, which is configured in step S2220, to a receiving device (or STA) based on step S2230.

While performing step S2230, the transmitting device may perform at least one of the operations of CSD, Spatial Mapping, IDFT/IFFT operation, GI insertion, and so on.

The signal(s)/field(s)/sequences(s) that is/are configured according to the present specification may be transmitted in the format of FIG. 18.

For example, the above-described EHT-SIG-A may be transmitted based on one or more OFDM symbols. For example, one OFDM symbol may include 26-bit information. The 26-bit information may include the above-described 3-bit BW information. Random m-bit information may also be used instead of the 26-bit information.

BCC coding of a ½ coding rate may be applied to the 26-bit information. Interleaving performed by an interleaver may be applied to BCC coding bits (i.e., 52 bits). Constellation mapping performed by a constellation mapper may be performed on the interleaved 52 bits. More specifically, by applying a BPSK module, 52 BPSK symbols may be generated. The 52 BPSK symbols may be matched to a remaining part of the frequency domain (−28 to +28) after excluding the DC tone and the pilot tones (−21, −7, +7, +21). Thereafter, the 52 BPSK symbols may be transmitted to the receiving STA by performing Phase rotation, CSD, Spatial Mapping, IDFT/IFFT operations, and so on.

Figure 23:
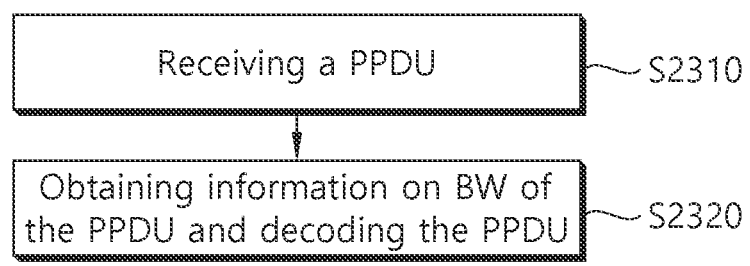
FIG. 23 is a procedure flowchart showing operations of a receiving device according to the present embodiment.

FIG. 23 is a procedure flowchart showing operations of a receiving device according to the present embodiment.

An example of FIG. 23 may be performed by a receiving device (AP and/or non-AP STA).

An example of FIG. 23 may be performed by a receiving STA or receiving device (AP and/or non-AP STA). For example, the example of FIG. 23 may be performed by a non-AP that receives EHT SU PPDU, EHT ER SU PPDU, EHT MU PPDU. The example of FIG. 23 may be performed by an AP that transmits EHT SU PPDU, EHT ER SU PPDU.

Part of each step (or detailed sub-step that will be described later on) in the example of FIG. 23 may be skipped (or omitted).

In step S2310, the receiving device (receiving STA) may receive all or part of a PPDU. The received signal may have the format shown in FIG. 18.

A sub-step of step S2310 may be determined based on step S2230. That is, step S2310 may perform operations of recovering (or reconfiguring) the results of the operations of CSD, Spatial Mapping, IDFT/IFFT operation, GI insertion, and so on, which are applied in step S2230.

In step S2320, the receiving STA may decode information included in an EHT-SIG-A (or U-SIG) and may obtain information related to a BW of the EHT PPDU.

By doing so, the receiving ST may complete decoding process(es) on other field(s)/symbol(s) of the received PPDU.

As a result, the receiving STA may decode a data field that is included in the PPDU by performing step S2320. Thereafter, the receiving STA may perform processing operations transferring the decoded data from the data field to a higher layer (e.g., MAC layer). Additionally, when signal generation is instructed by the higher layer to a PHY layer in response to the data that is transferred to the higher layer, a following operation may be performed.

Hereinafter, the above-described embodiment will be described with reference to FIG. 1 to FIG. 23.

Figure 24:
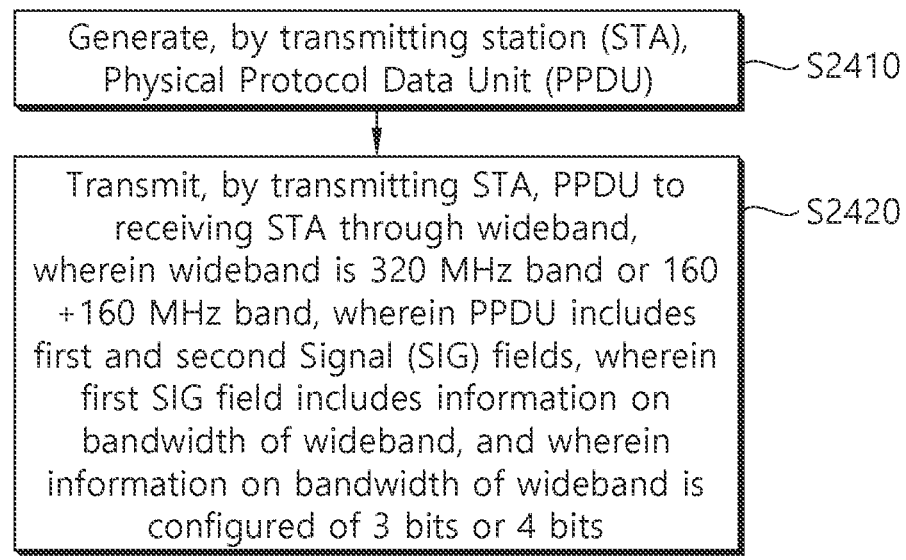
FIG. 24 shows a flowchart showing a procedure of transmitting, by a transmitting STA, a PPDU in a wideband according to the present embodiment.

FIG. 24 shows a flowchart showing a procedure of transmitting, by a transmitting STA, a PPDU in a wideband according to the present embodiment.

The example of FIG. 24 may be performed in a network environment in which a next generation WLAN system (IEEE 802.11be or EHT WLAN system) is being supported. The next generation WLAN system is a WLAN system that is enhanced from an 802.11ax system and may, therefore, satisfy backward compatibility with the 802.11ax system.

The present embodiment proposes a channel access method for transmitting a PPDU and a signaling method for a transmission bandwidth (240 MHz, 320 MHz bandwidth) in a wideband that is supported by an EHT WLAN system. At this point, a tone plan of the wideband may be designed by repeating (or iterating) an 80 MHz tone plan of 802.11ax or may be designed by repeating (or iterating) an 80 MHz tone plan of 802.11be. Herein, the 80 MHz tone plan of 802.11be may be designed by repeating a 40 MHz tone plan of 802.11ax (or RU alignment for 40 MHz of 802.11ax) two times.

The example of FIG. 24 is performed by a transmitting STA, and the transmitting STA may correspond to an access point (AP). A receiving STA of FIG. 24 may correspond to an STA that supports an Extremely High Throughput (EHT) WLAN system.

In step S2410, a transmitting station (STA) generates a Physical Protocol Data Unit (PPDU).

In step S2420, the transmitting STA transmits the PPDU to a receiving STA through a wideband.

The wideband is a 320 MHz band or a 160+160 MHz band.

The PPDU includes first and second Signal (SIG) fields. The first SIG field includes information on a bandwidth of the wideband. The information on the bandwidth of the wideband is configured of 3 bits or 4 bits. That is, the transmitting STA may signal information on a transmission bandwidth through the first SIG field.

A channel access method for transmitting the PPDU in the wideband will be described as follows. Firstly, the wideband may be defined as follows.

The 320 MHz band or 160+160 MHz band may include primary 160 MHz and secondary 160 MHz. The primary 160 MHz may include primary 80 MHz and secondary 80 MHz. The primary 80 MHz may include primary 40 MHz and secondary 40 MHz. The primary 40 MHz may include primary 20 MHz and secondary 20 MHz. And, the secondary 160 MHz may include tertiary 80 MHz and quaternary 80 MHz.

The transmitting STA may perform channel sensing on the wideband.

The PPDU may be transmitted based on a result of the channel sensing. The channel sensing result may be obtained based on whether or not the secondary 20 MHz, secondary 40 MHz, secondary 80 MHz, and secondary 160 MHz channels are idle during a Point Coordination Function (PCF) Inter-frame Space (PIFS) immediately before a start of a transmission opportunity (TXOP). That is, when the channel status of the secondary 20 MHz, the secondary 40 MHz, the secondary 80 MHz, and the secondary 160 MHz is idle, the transmitting STA may transmit the PPDU through the 320 MHz band or 160+160 MHz band.

Alternatively, the channel sensing result may be obtained based on whether or not the secondary 20 MHz, secondary 40 MHz, secondary 80 MHz, tertiary 80 MHz, and quatenary 80 MHz channels are idle during a PIFS immediately before a start of a TXOP. That is, when the channel status of the secondary 20 MHz, the secondary 40 MHz, the secondary 80 MHz, the tertiary 80 MHz, and the quatenary 80 MHz is idle, the transmitting STA may transmit the PPDU through the 320 MHz band or 160+160 MHz band.

Herein, the first SIG field may be a physical (PHY) layer, and the transmitting STA may transfer information on a bandwidth of the wideband to the receiving STA via PHY signaling.

When the PPDU is a Single User (SU) PPDU, the information on the bandwidth of the wideband may be configured of 3 bits. The bandwidth of the wideband may be determined as one of 20 MHz, 40 MHz, 80 MHz, 160 MHz, 80+80 MHz, 240 MHz, 160+80 MHz, 320 MHz or 160+160 MHz based on the 3 bits. For example, if the 3 bits are 000, the bandwidth may be set to 20 MHz, if the 3 bits are 001, the bandwidth may be set to 40 MHz, if the 3 bits are 010, the bandwidth may be set to 80 MHz, if the 3 bits are 011, the bandwidth may be set to 160 MHz or 80+80 MHz, if the 3 bits are 100, the bandwidth may be set to 240 MHz or 160+80 MHz, and, if the 3 bits are 101, the bandwidth may be set to 320 MHz or 160+160 MHz. If the 3 bits are 110 to 111, the bandwidth may be configured of reserved bits. That is, the receiving STA may receive the 3 bits and verify a bandwidth size of the wideband.

When the PPDU is a Multi-User (MU) PPDU, the information on the bandwidth of the wideband may be configured of 4 bits. The bandwidth of the wideband may be determined as one of 20 MHz, 40 MHz, 80 MHz, 160 MHz, 80+80 MHz, 240 MHz, 160+80 MHz, 320 MHz, 160+160 MHz or a band that is processed with preamble puncturing based on the 4 bits. For example, if the 4 bits are 0000, the bandwidth may be set to 20 MHz, if the 4 bits are 0001, the bandwidth may be set to 40 MHz, if the 4 bits are 0010, the bandwidth may be set to 80 MHz, if the 4 bits are 0011, the bandwidth may be set to 160 MHz or 80+80 MHz, if the 4 bits are 0100, the bandwidth may be set to 240 MHz or 160+80 MHz, and, if the 4 bits are 0101, the bandwidth may be set to 320 MHz or 160+160 MHz. If the 4 bits are 0110 to 1111, the bandwidth may be configured as a band that is processed with preamble puncturing or may be configured of reserved bits. That is, the receiving STA may receive the 4 bits and verify a bandwidth size of the wideband.

When the bandwidth through which the PPDU is transmitted is 240 MHz, information indicating that the bandwidth is set to 240 MHz or 160+80 MHz may not be transferred via PHY signaling. That is, in an 802.11be or EHT WLAN system, a PPDU having a bandwidth of 240 MHz may not be defined, or a 240 MHz bandwidth may not be signaled separately. The 240 MHz bandwidth may be defined by performing preamble puncturing on a 320 MHz band, or the bandwidth may be forcibly determined by being indicated to the MAC.

The PPDU may include a first field in which a first WLAN system is supported and a second field in which a second WLAN system is supported. The first WLAN system may be an 802.11be or Extremely High Throughput (EHT) WLAN system. The second WLAN system may be a legacy WLAN system.

The first field may include the first and second SIG fields.

For example, the first SIG field may be an EHT-SIG-A field. The information on the bandwidth of the wideband may correspond to a Bandwidth (BW) field of the EHT-SIG-A field.

As another example, the first SIG field may be a Universal-Signal (U-SIG) field, and the second SIG field may be an EHT-SIG field. At this point, the second SIG field may include information on a preamble puncturing pattern of the wideband. That is, the transmitting STA may signal a bandwidth of the wideband based on the U-SIG field, and the transmitting STA may signal a preamble puncturing pattern of the wideband based on the EHT-SIG field.

The PPDU may further include a Legacy-Signal (L-SIG) field, a Repeated Legacy-Signal (RL-SIG) field, an EHT-Short Training Field (STF), an EHT-Long Training Field (LTF), and a Data field. The EHT-SIG field may include an EHT-SIG-A field and an EHT-SIG-B field. The EHT-SIG field may further include an EHT-SIG-C field.

Figure 25:
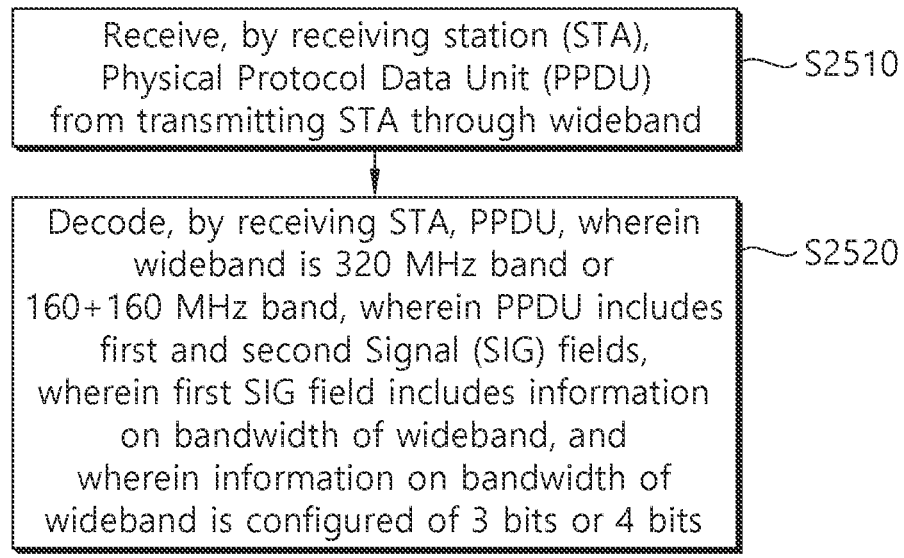
FIG. 25 shows a flowchart showing a procedure of receiving, by a receiving STA, a PPDU in a wideband according to the present embodiment.

FIG. 25 shows a flowchart showing a procedure of receiving, by a receiving STA, a PPDU in a wideband according to the present embodiment.

The example of FIG. 25 may be performed in a network environment in which a next generation WLAN system (IEEE 802.11be or EHT WLAN system) is being supported. The next generation WLAN system is a WLAN system that is enhanced from an 802.11ax system and may, therefore, satisfy backward compatibility with the 802.11ax system.

The present embodiment proposes a channel access method for transmitting a PPDU and a signaling method for a transmission bandwidth (240 MHz, 320 MHz bandwidth) in a wideband that is supported by an EHT WLAN system. At this point, a tone plan of the wideband may be designed by repeating (or iterating) an 80 MHz tone plan of 802.11ax or may be designed by repeating (or iterating) an 80 MHz tone plan of 802.11be. Herein, the 80 MHz tone plan of 802.11be may be designed by repeating a 40 MHz tone plan of 802.11ax (or RU alignment for 40 MHz of 802.11ax) two times.

The example of FIG. 25 may be performed by a receiving station (STA), and the receiving STA may correspond to an STA that supports an Extremely High Throughput (EHT) WLAN system. A transmitting STA of FIG. 25 may correspond to an access point (AP).

In step S2510, a receiving STA receives a Physical Protocol Data Unit (PPDU) from a transmitting STA through a wideband.

In step S2520, the receiving STA decodes the PPDU.

The wideband is a 320 MHz band or a 160+160 MHz band.

The PPDU includes first and second Signal (SIG) fields. The first SIG field includes information on a bandwidth of the wideband. The information on the bandwidth of the wideband is configured of 3 bits or 4 bits. That is, the transmitting STA may signal information on a transmission bandwidth through the first SIG field.

A channel access method for transmitting the PPDU in the wideband is as described below. Firstly, a wideband may be defined as described below.

The 320 MHz band or 160+160 MHz band may include primary 160 MHz and secondary 160 MHz. The primary 160 MHz may include primary 80 MHz and secondary 80 MHz. The primary 80 MHz may include primary 40 MHz and secondary 40 MHz. The primary 40 MHz may include primary 20 MHz and secondary 20 MHz. And, the secondary 160 MHz may include tertiary 80 MHz and quaternary 80 MHz.

The transmitting STA may perform channel sensing on the wideband.

The PPDU may be transmitted based on a result of the channel sensing. The channel sensing result may be obtained based on whether or not the secondary 20 MHz, secondary 40 MHz, secondary 80 MHz, and secondary 160 MHz channels are idle during a Point Coordination Function (PCF) Inter-frame Space (PIFS) immediately before a start of a transmission opportunity (TXOP). That is, when the channel status of the secondary 20 MHz, the secondary 40 MHz, the secondary 80 MHz, and the secondary 160 MHz is idle, the transmitting STA may transmit the PPDU through the 320 MHz band or 160+160 MHz band.

Alternatively, the channel sensing result may be obtained based on whether or not the secondary 20 MHz, secondary 40 MHz, secondary 80 MHz, tertiary 80 MHz, and quatenary 80 MHz channels are idle during a PIFS immediately before a start of a TXOP. That is, when the channel status of the secondary 20 MHz, the secondary 40 MHz, the secondary 80 MHz, the tertiary 80 MHz, and the quatenary 80 MHz is idle, the transmitting STA may transmit the PPDU through the 320 MHz band or 160+160 MHz band.

Herein, the first SIG field may be a physical (PHY) layer, and the transmitting STA may transfer information on a bandwidth of the wideband to the receiving STA via PHY signaling.

When the PPDU is a Single User (SU) PPDU, the information on the bandwidth of the wideband may be configured of 3 bits. The bandwidth of the wideband may be determined as one of 20 MHz, 40 MHz, 80 MHz, 160 MHz, 80+80 MHz, 240 MHz, 160+80 MHz, 320 MHz or 160+160 MHz based on the 3 bits. For example, if the 3 bits are 000, the bandwidth may be set to 20 MHz, if the 3 bits are 001, the bandwidth may be set to 40 MHz, if the 3 bits are 010, the bandwidth may be set to 80 MHz, if the 3 bits are 011, the bandwidth may be set to 160 MHz or 80+80 MHz, if the 3 bits are 100, the bandwidth may be set to 240 MHz or 160+80 MHz, and, if the 3 bits are 101, the bandwidth may be set to 320 MHz or 160+160 MHz. If the 3 bits are 110 to 111, the bandwidth may be configured of reserved bits. That is, the receiving STA may receive the 3 bits and verify a bandwidth size of the wideband.

When the PPDU is a Multi-User (MU) PPDU, the information on the bandwidth of the wideband may be configured of 4 bits. The bandwidth of the wideband may be determined as one of 20 MHz, 40 MHz, 80 MHz, 160 MHz, 80+80 MHz, 240 MHz, 160+80 MHz, 320 MHz, 160+160 MHz or a band that is processed with preamble puncturing based on the 4 bits. For example, if the 4 bits are 0000, the bandwidth may be set to 20 MHz, if the 4 bits are 0001, the bandwidth may be set to 40 MHz, if the 4 bits are 0010, the bandwidth may be set to 80 MHz, if the 4 bits are 0011, the bandwidth may be set to 160 MHz or 80+80 MHz, if the 4 bits are 0100, the bandwidth may be set to 240 MHz or 160+80 MHz, and, if the 4 bits are 0101, the bandwidth may be set to 320 MHz or 160+160 MHz. If the 4 bits are 0110 to 1111, the bandwidth may be configured as a band that is processed with preamble puncturing or may be configured of reserved bits. That is, the receiving STA may receive the 4 bits and verify a bandwidth size of the wideband.

When the bandwidth through which the PPDU is transmitted is 240 MHz, information indicating that the bandwidth is set to 240 MHz or 160+80 MHz may not be transferred via PHY signaling. That is, in an 802.11be or EHT WLAN system, a PPDU having a bandwidth of 240 MHz may not be defined, or a 240 MHz bandwidth may not be signaled separately. The 240 MHz bandwidth may be defined by performing preamble puncturing on a 320 MHz band, or the bandwidth may be forcibly determined by being indicated to the MAC.

The PPDU may include a first field in which a first WLAN system is supported and a second field in which a second WLAN system is supported. The first WLAN system may be an 802.11be or Extremely High Throughput (EHT) WLAN system. The second WLAN system may be a legacy WLAN system.

The first field may include the first and second SIG fields.

For example, the first SIG field may be an EHT-SIG-A field. The information on the bandwidth of the wideband may correspond to a Bandwidth (BW) field of the EHT-SIG-A field.

As another example, the first SIG field may be a Universal-Signal (U-SIG) field, and the second SIG field may be an EHT-SIG field. At this point, the second SIG field may include information on a preamble puncturing pattern of the wideband. That is, the transmitting STA may signal a bandwidth of the wideband based on the U-SIG field, and the transmitting STA may signal a preamble puncturing pattern of the wideband based on the EHT-SIG field.

The PPDU may further include a Legacy-Signal (L-SIG) field, a Repeated Legacy-Signal (RL-SIG) field, an EHT-Short Training Field (STF), an EHT-Long Training Field (LTF), and a Data field. The EHT-SIG field may include an EHT-SIG-A field and an EHT-SIG-B field. The EHT-SIG field may further include an EHT-SIG-C field.

4. Device Configuration

Figure 26:
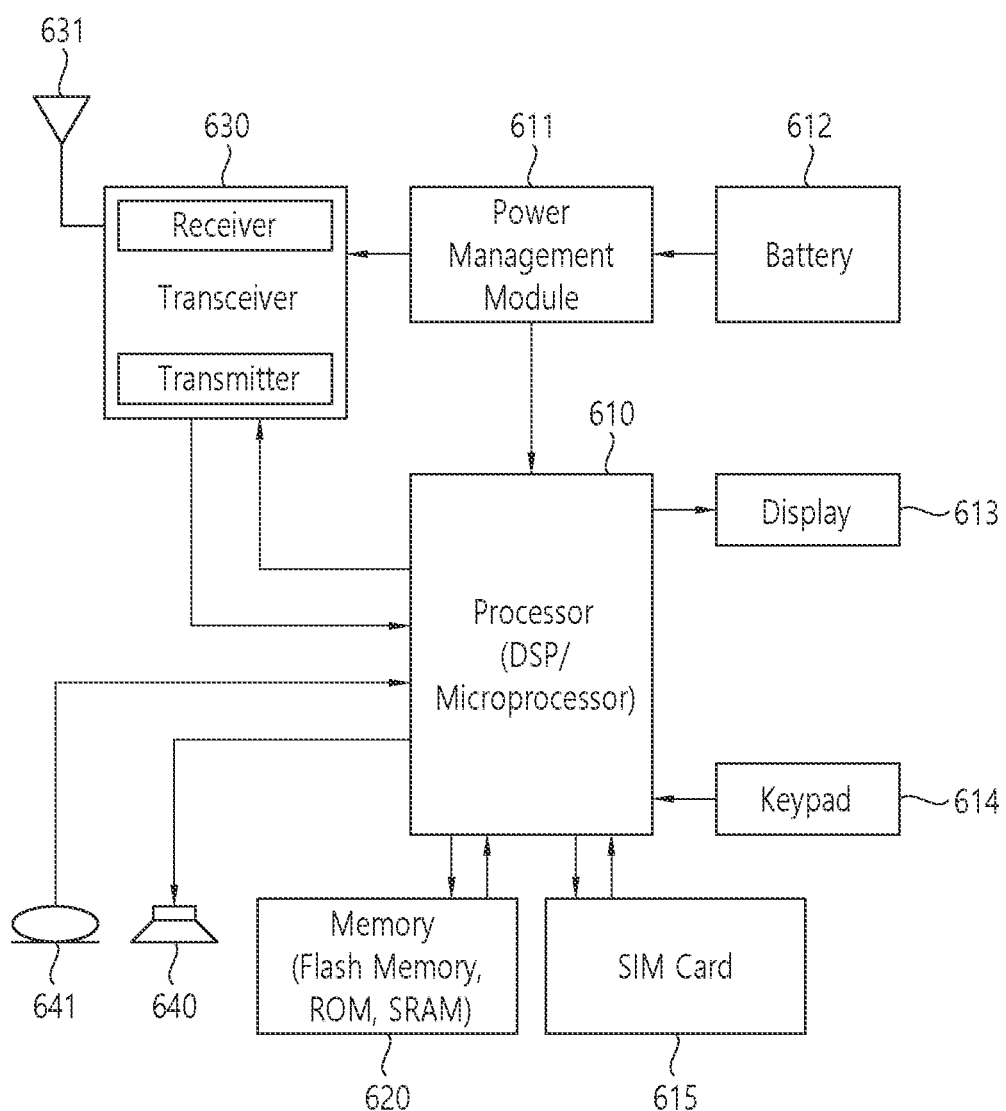
FIG. 26 illustrates an example of a modified transmitting device and/or receiving device of the present specification.

FIG. 26 illustrates an example of a modified transmitting device and/or receiving device of the present specification.

Each device/STA shown in sub-figures (a)/(b) of FIG. 1 may be modified as shown in FIG. 26. A transceiver 630 of FIG. 26 may be the same as the transceiver(s) 113 and 123 of FIG. 1. The transceiver 630 of FIG. 26 may include a receiver and a transmitter.

A processor 610 of FIG. 26 may be the same as the processor(s) 111 and 121 shown in FIG. 1. Alternatively, the processor 610 of FIG. 26 may be the same as the processing chip(s) 114 and 124 shown in FIG. 1.

A memory 150 of FIG. 26 may be the same as the memory(s) 112 and 122 shown in FIG. 1. Alternatively, the memory 150 of FIG. 26 may be a separate external memory that is different from the memory(s) 112 and 122 shown in FIG. 1.

Referring to FIG. 26, the power management module 611 manages power for the processor 610 and/or the transceiver 630. The battery 612 supplies power to the power management module 611. The display 613 outputs results processed by the processor 610. The keypad 614 receives inputs that are to be used by the processor 610. The keypad 614 may be shown on the display 613. The SIM card 615 may be an integrated circuit that is intended to securely store the international mobile subscriber identity (IMSI) number and its related key, which are used to identify and authenticate subscribers on mobile telephony devices, such as mobile phones and computers.

Referring to FIG. 26, the speaker 640 may output sound-related results processed by the processor 610. The microphone 641 may receive sound-related inputs to be used by the processor 610.

The above-described technical features of the present specification may be applied to various devices and methods. For example, the above-described technical features of the present specification may be performed/supported through the device(s) of FIG. 1 and/or FIG. 26. For example, the above-described technical features of the present specification may be applied to only part of FIG. 1 and/or FIG. 26. For example, the above-described technical features of the present specification may be implemented based on the processing chip(s) 114 and 124 of FIG. 1, or implemented based on the processor(s) 111 and 121 and the memory(s) 112 and 122, or implemented based on the processor 610 and the memory 620 of FIG. 26. For example, the device of the present specification is a device receiving a PPDU in a wideband, and the device includes a memory, and a processor being operatively connected to the memory, wherein the processor may be configured to receive a Multi-User Physical Protocol Data Unit (PPDU) from a transmitting station (STA) through a wideband, and to decode the PPDU.

The wideband is a 320 MHz band or a 160+160 MHz band.

The PPDU includes first and second Signal (SIG) fields. The first SIG field includes information on a bandwidth of the wideband. The information on the bandwidth of the wideband is configured of 3 bits or 4 bits. That is, the transmitting STA may signal information on a transmission bandwidth through the first SIG field.

A channel access method for transmitting the PPDU in the wideband will be described as follows. Firstly, the wideband may be defined as follows.

The 320 MHz band or 160+160 MHz band may include primary 160 MHz and secondary 160 MHz. The primary 160 MHz may include primary 80 MHz and secondary 80 MHz. The primary 80 MHz may include primary 40 MHz and secondary 40 MHz. The primary 40 MHz may include primary 20 MHz and secondary 20 MHz. And, the secondary 160 MHz may include tertiary 80 MHz and quaternary 80 MHz.

The transmitting STA may perform channel sensing on the wideband.

The PPDU may be transmitted based on a result of the channel sensing. The channel sensing result may be obtained based on whether or not the secondary 20 MHz, secondary 40 MHz, secondary 80 MHz, and secondary 160 MHz channels are idle during a Point Coordination Function (PCF) Inter-frame Space (PIFS) immediately before a start of a transmission opportunity (TXOP). That is, when the channel status of the secondary 20 MHz, the secondary 40 MHz, the secondary 80 MHz, and the secondary 160 MHz is idle, the transmitting STA may transmit the PPDU through the 320 MHz band or 160+160 MHz band.

Alternatively, the channel sensing result may be obtained based on whether or not the secondary 20 MHz, secondary 40 MHz, secondary 80 MHz, tertiary 80 MHz, and quatenary 80 MHz channels are idle during a PIFS immediately before a start of a TXOP. That is, when the channel status of the secondary 20 MHz, the secondary 40 MHz, the secondary 80 MHz, the tertiary 80 MHz, and the quatenary 80 MHz is idle, the transmitting STA may transmit the PPDU through the 320 MHz band or 160+160 MHz band.

Herein, the first SIG field may be a physical (PHY) layer, and the transmitting STA may transfer information on a bandwidth of the wideband to the receiving STA via PHY signaling.

When the PPDU is a Single User (SU) PPDU, the information on the bandwidth of the wideband may be configured of 3 bits. The bandwidth of the wideband may be determined as one of 20 MHz, 40 MHz, 80 MHz, 160 MHz, 80+80 MHz, 240 MHz, 160+80 MHz, 320 MHz or 160+160 MHz based on the 3 bits. For example, if the 3 bits are 000, the bandwidth may be set to 20 MHz, if the 3 bits are 001, the bandwidth may be set to 40 MHz, if the 3 bits are 010, the bandwidth may be set to 80 MHz, if the 3 bits are 011, the bandwidth may be set to 160 MHz or 80+80 MHz, if the 3 bits are 100, the bandwidth may be set to 240 MHz or 160+80 MHz, and, if the 3 bits are 101, the bandwidth may be set to 320 MHz or 160+160 MHz. If the 3 bits are 110 to 111, the bandwidth may be configured of reserved bits. That is, the receiving STA may receive the 3 bits and verify a bandwidth size of the wideband.

When the PPDU is a Multi-User (MU) PPDU, the information on the bandwidth of the wideband may be configured of 4 bits. The bandwidth of the wideband may be determined as one of 20 MHz, 40 MHz, 80 MHz, 160 MHz, 80+80 MHz, 240 MHz, 160+80 MHz, 320 MHz, 160+160 MHz or a band that is processed with preamble puncturing based on the 4 bits. For example, if the 4 bits are 0000, the bandwidth may be set to 20 MHz, if the 4 bits are 0001, the bandwidth may be set to 40 MHz, if the 4 bits are 0010, the bandwidth may be set to 80 MHz, if the 4 bits are 0011, the bandwidth may be set to 160 MHz or 80+80 MHz, if the 4 bits are 0100, the bandwidth may be set to 240 MHz or 160+80 MHz, and, if the 4 bits are 0101, the bandwidth may be set to 320 MHz or 160+160 MHz. If the 4 bits are 0110 to 1111, the bandwidth may be configured as a band that is processed with preamble puncturing or may be configured of reserved bits. That is, the receiving STA may receive the 4 bits and verify a bandwidth size of the wideband.

When the bandwidth through which the PPDU is transmitted is 240 MHz, information indicating that the bandwidth is set to 240 MHz or 160+80 MHz may not be transferred via PHY signaling. That is, in an 802.11be or EHT WLAN system, a PPDU having a bandwidth of 240 MHz may not be defined, or a 240 MHz bandwidth may not be signaled separately. The 240 MHz bandwidth may be defined by performing preamble puncturing on a 320 MHz band, or the bandwidth may be forcibly determined by being indicated to the MAC.

The PPDU may include a first field in which a first WLAN system is supported and a second field in which a second WLAN system is supported. The first WLAN system may be an 802.11be or Extremely High Throughput (EHT) WLAN system. The second WLAN system may be a legacy WLAN system.

The first field may include the first and second SIG fields.

For example, the first SIG field may be an EHT-SIG-A field. The information on the bandwidth of the wideband may correspond to a Bandwidth (BW) field of the EHT-SIG-A field.

As another example, the first SIG field may be a Universal-Signal (U-SIG) field, and the second SIG field may be an EHT-SIG field. At this point, the second SIG field may include information on a preamble puncturing pattern of the wideband. That is, the transmitting STA may signal a bandwidth of the wideband based on the U-SIG field, and the transmitting STA may signal a preamble puncturing pattern of the wideband based on the EHT-SIG field.

The PPDU may further include a Legacy-Signal (L-SIG) field, a Repeated Legacy-Signal (RL-SIG) field, an EHT-Short Training Field (STF), an EHT-Long Training Field (LTF), and a Data field. The EHT-SIG field may include an EHT-SIG-A field and an EHT-SIG-B field. The EHT-SIG field may further include an EHT-SIG-C field.

The technical features of the present specification may be implemented based on a computer readable medium (CRM). For example, the CRM that is proposed in the present specification is a computer readable medium including an instruction being executed by at least one processor.

The CRM may store instructions performing operations including the steps of receiving a Physical Protocol Data Unit (PPDU) from a transmitting station (STA), and decoding the PPDU. The instructions that are stored in the CRM of the present specification may be executed by at least one of processor. At least one processor being related to the CRM of the present specification may be the processor(s) 111 and 121 or processing chip(s) 114 and 124 of FIG. 1, or the processor 610 of FIG. 26. Meanwhile, the CRM of the present specification may be the memory(s) 112 and 122 of FIG. 1, or the memory 620 of FIG. 26, or a separate external memory/storage medium/disc, and so on.

The wideband is a 320 MHz band or a 160+160 MHz band.

The PPDU includes first and second Signal (SIG) fields. The first SIG field includes information on a bandwidth of the wideband. The information on the bandwidth of the wideband is configured of 3 bits or 4 bits. That is, the transmitting STA may signal information on a transmission bandwidth through the first SIG field.

A channel access method for transmitting the PPDU in the wideband will be described as follows. Firstly, the wideband may be defined as follows.

The 320 MHz band or 160+160 MHz band may include primary 160 MHz and secondary 160 MHz. The primary 160 MHz may include primary 80 MHz and secondary 80 MHz. The primary 80 MHz may include primary 40 MHz and secondary 40 MHz. The primary 40 MHz may include primary 20 MHz and secondary 20 MHz. And, the secondary 160 MHz may include tertiary 80 MHz and quaternary 80 MHz.

The transmitting STA may perform channel sensing on the wideband.

The PPDU may be transmitted based on a result of the channel sensing. The channel sensing result may be obtained based on whether or not the secondary 20 MHz, secondary 40 MHz, secondary 80 MHz, and secondary 160 MHz channels are idle during a Point Coordination Function (PCF) Inter-frame Space (PIFS) immediately before a start of a transmission opportunity (TXOP). That is, when the channel status of the secondary 20 MHz, the secondary 40 MHz, the secondary 80 MHz, and the secondary 160 MHz is idle, the transmitting STA may transmit the PPDU through the 320 MHz band or 160+160 MHz band.

Alternatively, the channel sensing result may be obtained based on whether or not the secondary 20 MHz, secondary 40 MHz, secondary 80 MHz, tertiary 80 MHz, and quatenary 80 MHz channels are idle during a PIFS immediately before a start of a TXOP. That is, when the channel status of the secondary 20 MHz, the secondary 40 MHz, the secondary 80 MHz, the tertiary 80 MHz, and the quatenary 80 MHz is idle, the transmitting STA may transmit the PPDU through the 320 MHz band or 160+160 MHz band.

Herein, the first SIG field may be a physical (PHY) layer, and the transmitting STA may transfer information on a bandwidth of the wideband to the receiving STA via PHY signaling.

When the PPDU is a Single User (SU) PPDU, the information on the bandwidth of the wideband may be configured of 3 bits. The bandwidth of the wideband may be determined as one of 20 MHz, 40 MHz, 80 MHz, 160 MHz, 80+80 MHz, 240 MHz, 160+80 MHz, 320 MHz or 160+160 MHz based on the 3 bits. For example, if the 3 bits are 000, the bandwidth may be set to 20 MHz, if the 3 bits are 001, the bandwidth may be set to 40 MHz, if the 3 bits are 010, the bandwidth may be set to 80 MHz, if the 3 bits are 011, the bandwidth may be set to 160 MHz or 80+80 MHz, if the 3 bits are 100, the bandwidth may be set to 240 MHz or 160+80 MHz, and, if the 3 bits are 101, the bandwidth may be set to 320 MHz or 160+160 MHz. If the 3 bits are 110 to 111, the bandwidth may be configured of reserved bits. That is, the receiving STA may receive the 3 bits and verify a bandwidth size of the wideband.

When the PPDU is a Multi-User (MU) PPDU, the information on the bandwidth of the wideband may be configured of 4 bits. The bandwidth of the wideband may be determined as one of 20 MHz, 40 MHz, 80 MHz, 160 MHz, 80+80 MHz, 240 MHz, 160+80 MHz, 320 MHz, 160+160 MHz or a band that is processed with preamble puncturing based on the 4 bits. For example, if the 4 bits are 0000, the bandwidth may be set to 20 MHz, if the 4 bits are 0001, the bandwidth may be set to 40 MHz, if the 4 bits are 0010, the bandwidth may be set to 80 MHz, if the 4 bits are 0011, the bandwidth may be set to 160 MHz or 80+80 MHz, if the 4 bits are 0100, the bandwidth may be set to 240 MHz or 160+80 MHz, and, if the 4 bits are 0101, the bandwidth may be set to 320 MHz or 160+160 MHz. If the 4 bits are 0110 to 1111, the bandwidth may be configured as a band that is processed with preamble puncturing or may be configured of reserved bits. That is, the receiving STA may receive the 4 bits and verify a bandwidth size of the wideband.

When the bandwidth through which the PPDU is transmitted is 240 MHz, information indicating that the bandwidth is set to 240 MHz or 160+80 MHz may not be transferred via PHY signaling. That is, in an 802.11be or EHT WLAN system, a PPDU having a bandwidth of 240 MHz may not be defined, or a 240 MHz bandwidth may not be signaled separately. The 240 MHz bandwidth may be defined by performing preamble puncturing on a 320 MHz band, or the bandwidth may be forcibly determined by being indicated to the MAC.

The PPDU may include a first field in which a first WLAN system is supported and a second field in which a second WLAN system is supported. The first WLAN system may be an 802.11be or Extremely High Throughput (EHT) WLAN system. The second WLAN system may be a legacy WLAN system.

The first field may include the first and second SIG fields.

For example, the first SIG field may be an EHT-SIG-A field. The information on the bandwidth of the wideband may correspond to a Bandwidth (BW) field of the EHT-SIG-A field.

As another example, the first SIG field may be a Universal-Signal (U-SIG) field, and the second SIG field may be an EHT-SIG field. At this point, the second SIG field may include information on a preamble puncturing pattern of the wideband. That is, the transmitting STA may signal a bandwidth of the wideband based on the U-SIG field, and the transmitting STA may signal a preamble puncturing pattern of the wideband based on the EHT-SIG field.

The PPDU may further include a Legacy-Signal (L-SIG) field, a Repeated Legacy-Signal (RL-SIG) field, an EHT-Short Training Field (STF), an EHT-Long Training Field (LTF), and a Data field. The EHT-SIG field may include an EHT-SIG-A field and an EHT-SIG-B field. The EHT-SIG field may further include an EHT-SIG-C field.

The foregoing technical features of the present specification are applicable to various applications or business models. For example, the foregoing technical features may be applied for wireless communication of a device supporting artificial intelligence (AI).

Artificial intelligence refers to a field of study on artificial intelligence or methodologies for creating artificial intelligence, and machine learning refers to a field of study on methodologies for defining and solving various issues in the area of artificial intelligence. Machine learning is also defined as an algorithm for improving the performance of an operation through steady experiences of the operation.

An artificial neural network (ANN) is a model used in machine learning and may refer to an overall problem-solving model that includes artificial neurons (nodes) forming a network by combining synapses. The artificial neural network may be defined by a pattern of connection between neurons of different layers, a learning process of updating a model parameter, and an activation function generating an output value.

The artificial neural network may include an input layer, an output layer, and optionally one or more hidden layers. Each layer includes one or more neurons, and the artificial neural network may include synapses that connect neurons. In the artificial neural network, each neuron may output a function value of an activation function of input signals input through a synapse, weights, and deviations.

A model parameter refers to a parameter determined through learning and includes a weight of synapse connection and a deviation of a neuron. A hyper-parameter refers to a parameter to be set before learning in a machine learning algorithm and includes a learning rate, the number of iterations, a mini-batch size, and an initialization function.

Learning an artificial neural network may be intended to determine a model parameter for minimizing a loss function. The loss function may be used as an index for determining an optimal model parameter in a process of learning the artificial neural network.

Machine learning may be classified into supervised learning, unsupervised learning, and reinforcement learning.

Supervised learning refers to a method of training an artificial neural network with a label given for training data, wherein the label may indicate a correct answer (or result value) that the artificial neural network needs to infer when the training data is input to the artificial neural network. Unsupervised learning may refer to a method of training an artificial neural network without a label given for training data. Reinforcement learning may refer to a training method for training an agent defined in an environment to choose an action or a sequence of actions to maximize a cumulative reward in each state.

Machine learning implemented with a deep neural network (DNN) including a plurality of hidden layers among artificial neural networks is referred to as deep learning, and deep learning is part of machine learning. Hereinafter, machine learning is construed as including deep learning.

The foregoing technical features may be applied to wireless communication of a robot.

Robots may refer to machinery that automatically process or operate a given task with own ability thereof. In particular, a robot having a function of recognizing an environment and autonomously making a judgment to perform an operation may be referred to as an intelligent robot.

Robots may be classified into industrial, medical, household, military robots and the like according uses or fields. A robot may include an actuator or a driver including a motor to perform various physical operations, such as moving a robot joint. In addition, a movable robot may include a wheel, a brake, a propeller, and the like in a driver to run on the ground or fly in the air through the driver.

The foregoing technical features may be applied to a device supporting extended reality.

Extended reality collectively refers to virtual reality (VR), augmented reality (AR), and mixed reality (MR). VR technology is a computer graphic technology of providing a real-world object and background only in a CG image, AR technology is a computer graphic technology of providing a virtual CG image on a real object image, and MR technology is a computer graphic technology of providing virtual objects mixed and combined with the real world.

MR technology is similar to AR technology in that a real object and a virtual object are displayed together. However, a virtual object is used as a supplement to a real object in AR technology, whereas a virtual object and a real object are used as equal statuses in MR technology.

XR technology may be applied to a head-mount display (HMD), a head-up display (HUD), a mobile phone, a tablet PC, a laptop computer, a desktop computer, a TV, digital signage, and the like. A device to which XR technology is applied may be referred to as an XR device.

The claims recited in the present specification may be combined in a variety of ways. For example, the technical features of the method claims of the present specification may be combined to be implemented as a device, and the technical features of the device claims of the present specification may be combined to be implemented by a method. In addition, the technical characteristics of the method claim of the present specification and the technical characteristics of the device claim may be combined to be implemented as a device, and the technical characteristics of the method claim of the present specification and the technical characteristics of the device claim may be combined to be implemented by a method.

What is claimed is:

1. A method in a wireless local area network (WLAN) system, the method comprising:
   receiving, by a receiving station (STA), a Physical Protocol Data Unit (PPDU) from a transmitting STA; and
   decoding, by the receiving STA, the PPDU,
   wherein the PPDU includes first and second Signal (SIG) fields,
   wherein the first SIG field includes information on a bandwidth of the PPDU,
   wherein the information on the bandwidth of the PPDU is configured of 3 bits or 4 bits,
   wherein based on the PPDU being a Multi-User (MU) PPDU, the information on the bandwidth of the PPDU is configured of 4 bits, and
   wherein based on the 4 bits being 0000, the bandwidth of the PPDU is 20 MHz,
   wherein based on the 4 bits being 0001, the bandwidth of the PPDU is 40 MHz,
   wherein based on the 4 bits being 0010, the bandwidth of the PPDU is 80 MHz,
   wherein based on the 4 bits being 0011, the bandwidth of the PPDU is 160 MHz or 80+80 MHz related to a combination of primary 80 MHz and secondary 80 MHz,
   wherein based on the 4 bits being 0100, the bandwidth of the PPDU is 160 MHz or 80+80 MHz related to a combination of the primary 80 MHz and tertiary 80 MHz,
   wherein based on the 4 bits being 0101, the bandwidth of the PPDU is 160 MHz or 80+80 MHz related to a combination of the primary 80 MHz and quaternary 80 MHz,
   wherein based on the 4 bits being 0110, the bandwidth of the PPDU is 240 MHz or 160+80 MHz related to a combination of the primary 80 MHz and the secondary 160 MHz or a combination of the tertiary 80 MHz and the quaternary 80 MHz, wherein based on the 4 bits being 0111, the bandwidth of the PPDU is 240 MHz or 160+80 MHz related to a combination of the primary 160 MHz and the tertiary 80 MHz or a combination of the primary 80 MHz, secondary 80 MHz and the tertiary 80 MHz, wherein based on the 4 bits being 1000, the bandwidth of the PPDU is 240 MHz or 160+80 MHz related to a combination of the primary 160 MHz and the quaternary 80 MHz or a combination of the primary 80 MHz, secondary 80 MHz and the quaternary 80 MHz, wherein based on the 4 bits being 1001, the bandwidth of the PPDU is 320 MHz or 160+160 MHz, wherein based on the 4 bits being 1010 to 1111, the information on the bandwidth of the PPDU include information on a band that is processed with preamble puncturing or is reserved, wherein the 320 MHz or 160+160 MHz includes the primary 160 MHz and the secondary 160 MHz, wherein the primary 160 MHz includes the primary 80 MHz and the secondary 80 MHz, and wherein the secondary 160 MHz includes the tertiary 80 MHz and the quaternary 80 MHz.

2. The method of claim 1,
wherein the primary 80 MHz includes primary 40 MHz and secondary 40 MHz,
wherein the primary 40 MHz includes primary 20 MHz and secondary 20 MHz.

3. The method of claim 2, further comprising:
performing, by the receiving STA, channel sensing,
wherein the PPDU is transmitted based on a result of the channel sensing, and
wherein the channel sensing result is obtained based on whether or not the secondary 20 MHz, secondary 40 MHz, secondary 80 MHz, and secondary 160 MHz channels are idle during a Point Coordination Function (PCF) Inter-frame Space (PIFS) immediately before a start of a transmission opportunity (TXOP).

4. The method of claim 1, wherein, based on the PPDU being a Single User (SU) PPDU, the information on the bandwidth of the PPDU is configured of 3 bits,
wherein based on the 3 bits being 000, the bandwidth of the PPDU is 20 MHz,
wherein based on the 3 bits being 001, the bandwidth of the PPDU is 40 MHz,
wherein based on the 3 bits being 010, the bandwidth of the PPDU is 80 MHz,
wherein based on the 3 bits being 011, the bandwidth of the PPDU is 160 MHz or 80+80 MHz related to a combination of the primary 80 MHz and the secondary 80 MHz,
wherein based on the 3 bits being 100, the bandwidth of the PPDU is 160 MHz or 80+80 MHz related to a combination of the primary 80 MHz and the tertiary 80 MHz or a combination of the primary 80 MHz and the quaternary 80 MHz,
wherein based on the 3 bits being 101, the bandwidth of the PPDU is 240 MHz or 160+80 MHz related to a combination of the primary 160 MHz and the tertiary 80 MHz or a combination of the primary 80 MHz, secondary 80 MHz and the tertiary 80 MHz,
wherein based on the 3 bits being 110, the bandwidth of the PPDU is 240 MHz or 160+80 MHz related to a combination of the primary 160 MHz and the quaternary 80 MHz or a combination of the primary 80 MHz, secondary 80 MHz and the quaternary 80 MHz,
wherein based on the 3 bits being 111, the bandwidth of the PPDU is the 320 MHz or the 160+160 MHz.

5. The method of claim 1, wherein the PPDU includes a first field in which a first WLAN system is supported and a second field in which a second WLAN system is supported,
wherein the first WLAN system is an 802.11be or Extremely High Throughput (EHT) WLAN system,
wherein the second WLAN system is a legacy WLAN system, and
wherein the first field includes the first and second SIG fields.

6. The method of claim 5, wherein the first SIG field is a Universal-Signal (U-SIG) field,
wherein the second SIG field is an EHT-SIG field, and
wherein the second SIG field includes information on a preamble puncturing pattern of the bandwidth of the PPDU.

7. A receiving station (STA) in a wireless local area network (WLAN) system, the receiving STA comprising:
a memory;
a transceiver; and
a processor being operatively connected to the memory and the transceiver,
wherein the processor is configured to:
receive a Physical Protocol Data Unit (PPDU) from a transmitting station (STA), and
decode the PPDU,
wherein the PPDU includes first and second Signal (SIG) fields,
wherein the first SIG field includes information on a bandwidth of the PPDU,
wherein the information on the bandwidth of the PPDU is configured of 3 bits or 4 bits,
wherein based on the PPDU being a Multi-User (MU) PPDU, the information on the bandwidth of the PPDU is configured of 4 bits, and
wherein based on the 4 bits being 0000, the bandwidth of the PPDU is 20 MHz,
wherein based on the 4 bits being 0001, the bandwidth of the PPDU is 40 MHz,
wherein based on the 4 bits being 0010, the bandwidth of the PPDU is 80 MHz,
wherein based on the 4 bits being 0011, the bandwidth of the PPDU is 160 MHz or 80+80 MHz related to a combination of primary 80 MHz and secondary 80 MHz,
wherein based on the 4 bits being 0100, the bandwidth of the PPDU is 160 MHz or 80+80 MHz related to a combination of the primary 80 MHz and tertiary 80 MHz,
wherein based on the 4 bits being 0101, the bandwidth of the PPDU is 160 MHz or 80+80 MHz related to a combination of the primary 80 MHz and quaternary 80 MHz,
wherein based on the 4 bits being 0110, the bandwidth of the PPDU is 240 MHz or 160+80 MHz related to a combination of the primary 80 MHz and the secondary 160 MHz or a combination of the tertiary 80 MHz and the quaternary 80 MHz,
wherein based on the 4 bits being 0111, the bandwidth of the PPDU is 240 MHz or 160+80 MHz related to a combination of the primary 160 MHz and the tertiary 80 MHz or a combination of the primary 80 MHz, secondary 80 MHz and the tertiary 80 MHz,
wherein based on the 4 bits being 1000, the bandwidth of the PPDU is 240 MHz or 160+80 MHz related to a combination of the primary 160 MHz and the quaternary 80 MHz or a combination of the primary 80 MHz, secondary 80 MHz and the quaternary 80 MHz, wherein based on the 4 bits being 1001, the bandwidth of the PPDU is 320 MHz or 160+160 MHz, wherein based on the 4 bits being 1010 to 1111, the information on the bandwidth of the PPDU include information on a band that is processed with preamble puncturing or is reserved, wherein the 320 MHz or 160+160 MHz includes the primary 160 MHz and the secondary 160 MHz, wherein the primary 160 MHz includes the primary 80 MHz and the secondary 80 MHz, and wherein the secondary 160 MHz includes the tertiary 80 MHz and the quaternary 80 MHz.

8. A method in a wireless local area network (WLAN) system, the method comprising:

generating, by a transmitting station (STA), a Physical Protocol Data Unit (PPDU); and transmitting, by the transmitting STA, the PPDU to a receiving STA, wherein the PPDU includes first and second Signal (SIG) fields, wherein the first SIG field includes information on a bandwidth of the PPDU, wherein the information on the bandwidth of the PPDU is configured of 3 bits or 4 bits, wherein based on the PPDU being a Multi-User (MU) PPDU, the information on the bandwidth of the PPDU is configured of 4 bits, and wherein based on the 4 bits being 0000, the bandwidth of the PPDU is 20 MHz, wherein based on the 4 bits being 0001, the bandwidth of the PPDU is 40 MHz, wherein based on the 4 bits being 0010, the bandwidth of the PPDU is 80 MHz, wherein based on the 4 bits being 0011, the bandwidth of the PPDU is 160 MHz or 80+80 MHz related to a combination of primary 80 MHz and secondary 80 MHz, wherein based on the 4 bits being 0100, the bandwidth of the PPDU is 160 MHz or 80+80 MHz related to a combination of the primary 80 MHz and tertiary 80 MHz, wherein based on the 4 bits being 0101, the bandwidth of the PPDU is 160 MHz or 80+80 MHz related to a combination of the primary 80 MHz and quaternary 80 MHz, wherein based on the 4 bits being 0110, the bandwidth of the PPDU is 240 MHz or 160+80 MHz related to a combination of the primary 80 MHz and the secondary 160 MHz or a combination of the tertiary 80 MHz and the quaternary 80 MHz, wherein based on the 4 bits being 0111, the bandwidth of the PPDU is 240 MHz or 160+80 MHz related to a combination of the primary 160 MHz and the tertiary 80 MHz or a combination of the primary 80 MHz, secondary 80 MHz and the tertiary 80 MHz, wherein based on the 4 bits being 1000, the bandwidth of the PPDU is 240 MHz or 160+80 MHz related to a combination of the primary 160 MHz and the quaternary 80 MHz or a combination of the primary 80 MHz, secondary 80 MHz and the quaternary 80 MHz, wherein based on the 4 bits being 1001, the bandwidth of the PPDU is 320 MHz or 160+160 MHz, wherein based on the 4 bits being 1010 to 1111, the information on the bandwidth of the PPDU include information on a band that is processed with preamble puncturing or is reserved, wherein the 320 MHz or 160+160 MHz includes the primary 160 MHz and the secondary 160 MHz, wherein the primary 160 MHz includes the primary 80 MHz and the secondary 80 MHz, and wherein the secondary 160 MHz includes the tertiary 80 MHz and the quaternary 80 MHz.

9. The method of claim 8, wherein the primary 80 MHz includes primary 40 MHz and secondary 40 MHz, wherein the primary 40 MHz includes primary 20 MHz and secondary 20 MHz.

10. The method of claim 9, further comprising:

performing, by the transmitting STA, channel sensing, wherein the PPDU is transmitted based on a result of the channel sensing, and wherein the channel sensing result is obtained based on whether or not the secondary 20 MHz, secondary 40 MHz, secondary 80 MHz, and secondary 160 MHz channels are idle during a Point Coordination Function (PCF) Inter-frame Space (PIFS) immediately before a start of a transmission opportunity (TXOP).

11. The method of claim 8, wherein, based on the PPDU being a Single User (SU) PPDU, the information on the bandwidth of the PPDU is configured of 3 bits, wherein based on the 3 bits being 000, the bandwidth of the PPDU is 20 MHz, wherein based on the 3 bits being 001, the bandwidth of the PPDU is 40 MHz, wherein based on the 3 bits being 010, the bandwidth of the PPDU is 80 MHz, wherein based on the 3 bits being 011, the bandwidth of the PPDU is 160 MHz or 80+80 MHz related to a combination of the primary 80 MHz and the secondary 80 MHz, wherein based on the 3 bits being 100, the bandwidth of the PPDU is 160 MHz or 80+80 MHz related to a combination of the primary 80 MHz and the tertiary 80 MHz or a combination of the primary 80 MHz and the quaternary 80 MHz, wherein based on the 3 bits being 101, the bandwidth of the PPDU is 240 MHz or 160+80 MHz related to a combination of the primary 160 MHz and the tertiary 80 MHz or a combination of the primary 80 MHz, secondary 80 MHz and the tertiary 80 MHz, wherein based on the 3 bits being 110, the bandwidth of the PPDU is 240 MHz or 160+80 MHz related to a combination of the primary 160 MHz and the quaternary 80 MHz or a combination of the primary 80 MHz, secondary 80 MHz and the quaternary 80 MHz, wherein based on the 3 bits being 111, the bandwidth of the PPDU is the 320 MHz or the 160+160 MHz.

12. The method of claim 8, wherein the PPDU includes a first field in which a first WLAN system is supported and a second field in which a second WLAN system is supported, wherein the first WLAN system is an 802.11be or Extremely High Throughput (EHT) WLAN system, wherein the second WLAN system is a legacy WLAN system, and wherein the first field includes the first and second SIG fields.

13. The method of claim 12, wherein the first SIG field is a Universal-Signal (U-SIG) field, wherein the second SIG field is an EHT-SIG field, and wherein the second SIG field includes information on a preamble puncturing pattern of the bandwidth of the PPDU.

* * * * *